United States Patent
Willis et al.

(10) Patent No.: US 11,455,435 B2
(45) Date of Patent: Sep. 27, 2022

(54) CONVERSION OF GEOMETRY TO BOUNDARY REPRESENTATION WITH FACILITATED EDITING FOR COMPUTER AIDED DESIGN AND 2.5-AXIS SUBTRACTIVE MANUFACTURING

(71) Applicant: Autodesk, Inc., San Francisco, CA (US)

(72) Inventors: Karl Darcy Daniel Willis, San Bruno, CA (US); Nigel Jed Wesley Morris, Toronto (CA); Andreas Linas Bastian, Oakland, CA (US); Adrian Adam Thomas Butscher, Toronto (CA); Daniele Grandi, London (GB); Suguru Furuta, Cambridge (GB); Joseph George Lambourne, London (GB); Tristan Ward Barback, Cambridge (GB); Martin Cvetanov Marinov, Cambridge (GB); Marco Amagliani, Cambridge (GB); Jingyang John Chen, Novi, MI (US); Michael Andrew Smell, Oakdale, PA (US); Brian M. Frank, Lunenburg, MA (US); Hooman Shayani, Longfield (GB); Christopher Michael Wade, Birmingham (GB); Nandakumar Santhanam, Ithaca, NY (US)

(73) Assignee: Autodesk, Inc., San Francisco, CA (US)

(*) Notice: Subject to any disclaimer, the term of this patent is extended or adjusted under 35 U.S.C. 154(b) by 203 days.

(21) Appl. No.: 16/679,065

(22) Filed: Nov. 8, 2019

(65) Prior Publication Data
US 2020/0151286 A1 May 14, 2020

Related U.S. Application Data

(60) Provisional application No. 62/758,454, filed on Nov. 9, 2018.

(51) Int. Cl.
*G06F 30/00* (2020.01)
*G06T 17/20* (2006.01)
*G06F 119/18* (2020.01)

(52) U.S. Cl.
CPC .............. *G06F 30/00* (2020.01); *G06T 17/20* (2013.01); *G06F 2119/18* (2020.01)

(58) Field of Classification Search
CPC ........ G06F 30/00; G06F 2119/18; G06T 17/20
See application file for complete search history.

(56) References Cited

U.S. PATENT DOCUMENTS

| | | | |
|---|---|---|---|
| 6,680,735 B1 | 1/2004 | Seiler et al. | |
| 7,451,013 B2 * | 11/2008 | Coleman | G05B 19/40937 700/173 |

(Continued)

FOREIGN PATENT DOCUMENTS

| | | | |
|---|---|---|---|
| CN | 103984285 A | * | 8/2014 |
| CN | 105269052 A | * | 1/2016 |

(Continued)

OTHER PUBLICATIONS

Apr. 25, 2017 Update—What's New; Keqing Song; https://www.autodesk.com/products/fusion-360/blog/april-19-2017-update-whats-new/ (Year: 2017).*

(Continued)

*Primary Examiner* — Rehana Perveen
*Assistant Examiner* — Nupur Debnath
(74) *Attorney, Agent, or Firm* — Fish & Richardson P.C.

(57) ABSTRACT

Methods, systems, and apparatus, including medium-encoded computer program products, for computer aided design of physical structures using data format conversion (e.g., of output(s) from generative design processes) and user interface techniques that facilitate the production of 3D models of physical structures that are readily usable with (Continued)

2.5-axis subtractive manufacturing, include: modifying smooth curves, which have been fit to contours representing discrete height layers of an object, to facilitate the 2.5-axis subtractive manufacturing; preparing an editable model of the object using a parametric feature history, which includes a sketch feature, to combine extruded versions of the smooth curves to form a 3D model of the object in a boundary representation format; reshaping a subset of the smooth curves responsive to user input with respect to the sketch feature; and replaying the parametric feature history to reconstruct the 3D model of the object, as changed by the user input.

19 Claims, 23 Drawing Sheets

(56) References Cited

U.S. PATENT DOCUMENTS

| | | | |
|---|---|---|---|
| 9,081,920 | B2 | 7/2015 | Yamada et al. |
| 9,789,651 | B2 | 10/2017 | Musuvathy et al. |
| 10,467,807 | B1 | 11/2019 | Strater et al. |
| 2004/0024472 | A1* | 2/2004 | Evans ............... G05B 19/4097 700/2 |
| 2009/0112354 | A1 | 4/2009 | El-Wardany et al. |
| 2010/0085357 | A1 | 4/2010 | Sullivan et al. |
| 2011/0270587 | A1 | 11/2011 | Yamada et al. |
| 2013/0124149 | A1* | 5/2013 | Carr ...................... G06T 19/20 703/1 |
| 2014/0005819 | A1 | 1/2014 | Garaas et al. |
| 2014/0297021 | A1 | 10/2014 | Aggarwal et al. |
| 2015/0294034 | A1 | 10/2015 | Liao et al. |
| 2018/0239334 | A1 | 8/2018 | Tramel, Jr. et al. |
| 2018/0345647 | A1 | 12/2018 | Morris et al. |
| 2018/0349531 | A1 | 12/2018 | Morris et al. |
| 2019/0138670 | A1 | 5/2019 | Bandara et al. |

FOREIGN PATENT DOCUMENTS

| | | |
|---|---|---|
| WO | WO 2015/127271 | 8/2015 |
| WO | WO 2017/186786 | 11/2017 |
| WO | PCT/US2019/034221 | 5/2019 |
| WO | PCT/US2019/060089 | 11/2019 |
| WO | PCT/US2019/060589 | 11/2019 |

OTHER PUBLICATIONS 2 5 Axis Machining CAM; Autodesk Fusion 360; https://www.youtube.com/watch?v=b4cjD6_X1yU (Year: 2016).*

Zhao et al. "DSCarver: Decompose-and-Spiral-Carve for Subtractive Manufacturing"; ACM Transactions on Graphics, vol. 37, No. 4, Article 1. Publication date: Aug. 2018 (Year: 2018).*

Roby Lynn et al. Direct Digital Subtractive Manufacturing of a Functional Assembly Using Voxel-Based Models; Journal of Manufacturing Science and Engineering (Year: 2018).*

PCT International Preliminary Report on Patentability in International Appln. No. PCT/US2019/060639, dated May 20, 2021, 11 pages.

Allaire et al., "Shape Optimization by the Homogenization Method," Numerische Mathematik, 76(1):27-68, 1997.

Allaire et al., "Structural Optimization Using Sensitivity Analysis and a Level-set Method," J. Comput. Phys., Feb. 2004, 194(1):363-393.

Aremu et al., "A Voxel-based Method of Constructing and Skinning Conformal and Functionally Graded Lattice Structures Suitable for Additive Manufacturing," Additive Manufacturing, 13:1-13, 2017.

Arisoy et al., "Design and Topology Optimization of Lattice Structures Using Deformable Implicit Surfaces for Additive Manufacturing," Proceedings of the ASME 2015 International Design Engineering Technical Conferences & Computers and Information in Engineering Conference, Aug. 2-5, 2015, Boston, MA, 11 pages.

Bendsoe, "Optimal Shape Design as a Material Distribution Problem," Structural Optimization, 1(4):193-202, 1989.

Bendsøe and Kikuchi, "Generating Optimal Topologies in Structural Design Using a Homogenization Method," Computer Methods in Applied Mechanics and Engineering, 71(2):197-224, 1988.

Chen et al., "Topology Optimization for Manufacturability Based on the Visibility Map," Computer-Aided Design and Applications, 13(1):86-94, 2016.

Cheng et al., "Coupling Lattice Structure Topology Optimization with Design-dependent Feature Evolution for Additive Manufactured Heat Conduction Design," Computer Methods in Applied Mechanics and Engineering, 332:408-439, 2018.

Cheng et al., "Efficient Design Optimization of Variable-density Cellular Structures for Additive Manufacturing: Theory and Experimental Validation," Rapid Prototyping Journal, 23(4):660-677, 2017.

Chu et al., "Design for Additive Manufacturing of Cellular Structures," Computer-Aided Design and Applications, 5(5):686-696, 2008.

Cignoni et al., "A Comparison of Mesh Simplification Algorithms," Computers & Graphics, 22(1):37-54, 1998.

Dakshnannoorthy, "Automated Lattice Optimization of Hinge Fitting with Displacement Constraint," Diss. 2016, https://rc.library.uta.edu/uta-ir/handle/10106/26381 (Year: 2016).

Deshpande et al., "Effective Properties of the Octet-truss Lattice Material," Journal of the Mechanics and Physics of Solids, 49(8):1747-1769, 2001.

Eschenauer et al., "Bubble Method for Topology and Shape Optimization of Structures," Structural Optimization, 8(1):42-51, 1994.

Eschenauer and Olhoff, "Topology Optimization of Continuum Structures: a Review," Applied Mechanics Reviews, 54(4):331, 2001.

Frémond, "Shape Change and Deformation," Meccanica, 2016, 51:2949-2955.

Gallagher, "Fully Stressed Design," Optimum Structural Design, © 1973 John Wiley & Sons Ltd., pp. 19-32.

Gardan and Schneider, "Topological Optimization of Internal Patterns and Support in Additive Manufacturing," Journal of Manufacturing Systems, 2015, 37:417-425.

Gibou et al., "A Review of Level-set Methods and Some Recent Applications," Journal of Computational Physics, 353:82-109, 2018.

Guest and Zhu, "Casting and Milling Restrictions in Topology Optimization via Projection-based Algorithms," Proceedings of the ASME 2012 International Design Engineering Conferences & Computers and Information in Engineering Conference, Aug. 12-15, 2012, Chicago, IL, U.S.A., 8 pages.

Heckbert and Garland, "Survey of Polygonal Surface Simplification Algorithms," Technical Report, Carnegie Mellon University, 1997, 32 pages.

Ikeya et al., "Multi-objective Free-form Optimization for Shape and Thickness of Shell Structures with Composite Materials," Jun. 2015, [online] (retrieved from http://web.aeromech.usyd.edu.au/WCSMO2015/papers/1084_paper.pdf), 6 pages.

James et al., "Stress-based Topology Optimization Using an Isoparametric Level Set Method," Finite Elements in Analysis and Design, 2012, 58:20-30.

Jin et al., "Support Generation for Additive Manufacturing Based on Sliced Data," International Journal of Advanced Manufacturing Technology, 2015, 80:2041-2052.

Jin et al., "Optimization of Process Planning for Reducing Material Consumption in Additive Manufacturing," Journal of Manufacturing Systems, 2017, 44:65-78.

Lavars, "Under Armour's 3D-printed Shoes Bring Computer Designer to Heel," (Mar. 7, 2016) [online] (retrieved from https://newatlas.com/under-armour-3d-printed-shoes/42193/), 3 pages.

Liu and Ma, "3D Level-set Topology Optimization: a Machining Feature-based Approach," Structural and Multidisciplinary Optimization, 52(3):563-582, 2015.

Liu and Ma, "A Survey of Manufacturing Oriented Topology Optimization Methods," Advances in Engineering Software, 100:161-175, 2016.

(56) References Cited

OTHER PUBLICATIONS

Liu et al., "Current and Future Trends in Topology Optimization for Additive Manufacturing," (Apr. 13, 2018) [online] (retrieved from https://www.researchgate.net/profile/Andrew_Gaynor/publication/324932012_Current_and_future_trends_in_topology_optimization_for_additive_manufacturing/links/5af49b46a6fdcc0c030af548/Current-and-future-trends-in-topology-optimization-for-additive-manufacturing.pdf), 28 pages.
Lu et al., "Build-to-Last: Strength to Weight 3D Printed Objects," (Oct. 11, 2018) [online] (retrieved from http://citeseerx.ist.psu.edu/viewdoc/download?doi=10.1.1.704.6282&rep=rep1&type=pdf) 10 pages.
McMillan et al., "Programmatic Lattice Generation for Additive Manufacture," Procedia Technology, 2015, 20:178-184.
Merriam Webster Dictionary, Accessed online on Oct. 8, 2019, Definition of "Define" (Year: 2019), 12 pages.
Merriam Webster Dictionary, Accessed online on Oct. 8, 2019, Definition of "Express" (Year: 2019), 15 pages.
Merriam Webster Dictionary, Accessed online on Oct. 8, 2019, Definition of "in accordance with" (Year: 2019), 8 pages.
Mirzendehdel et al., "Strength-based Topology Optimization for Anisotropic Parts," Additive Manufacturing, 2018, 19:104-113.
Munteanu et al., "Structural Optimization of Space Components Adapted for 3D Printing," Annals of DAAAM & Proceedings (2018) 821-826.
Museth, "VDB: High-resolution Sparse Volumes with Dynamic Topology," ACM Transactions on Graphics (TOG), 32(3)(27):1-22, 2013.
Nakayama and Shimoda, "Shape-topology Optimization for Designing Shell Structures," In VII European Congress on Computational Methods in Applied Sciences and Engineering, Jun. 2016, 10 pages.
Nocedal and Wright, "Numerical Optimization," table of contents and pp. 339-341, 490-527, and 539-544, © 1999 Springer-Verlag New York, Inc.
Osher and Fedkiw, "Level Set Methods and Dynamic Implicit Surfaces," Applied Mathematical Science, vol. 153, Chapters 1-10, Springer, New York, N.Y., 2003.
Osher and Sethian, "Fronts Propagating with Curvature-dependent Speed: Algorithms Based on Hamilton-Jacobi Formulations," Journal of Computational Physics, 79(1):12-49, 1988.
Panesar et al., "Strategies for Functionally Graded Lattice Structures Derived Using Topology Optimisation for Additive Manufacturing," Additive Manufacturing, 19:81-94, 2018.
Patnaik and Hopkins, "Optimality of a Fully Stressed Design," May 1998, National Aeronautics and Space Administration, (Nov. 7, 2018) [online] (retrieved from https://ntrs.nasa.gov/archive/nasa/casi.ntrs.nasa.gov/19980148007.pdf), 16 pages.
Pérez, "Level Set Method Applied to Topology Optimization," Feb. 2012, Grupo de Optimización Estructural (GOE), 24 pages.
Rhodes, "So Algorithms are Designing Chairs Now," (Oct. 3, 2016) [online] (retrieved from https://www.wired.com/2016/10/elbo-chair-autodesk-algorithm/), 4 pages.
Schumacher et al., "Microstructures to Control Elasticity in 3D Printing," ACM Transactions on Graphics (TOG), Aug. 2015, 34(4):136, 15 pages.
Sethian and Wiegmann, "Structural Boundary Design via Level Set and Immersed Interface Methods," Journal of Computational Physics, 163(2):489-528, 2000.
Sigmund and Maute, "Topology Optimization Approaches: a Comparative Review," Structural and Multidisciplinary Optimization, 48(6):1031-1055, 2013.
Song, "Autodesk Fusion 360 Blog, Apr. 23, 2019 Product Update—What's New," (Nov. 14, 2019) [online] (retrieved from https://www.autodesk.com/products/fusion-360/blog/author/keqingsong/), 27 pages.
Svanberg, "The Method of Moving Asymptotes—a New Method for Structural Optimization," International Journal for Numerical Methods in Engineering, 24(2):359-373, 1987.
Tamburrino et al., "The Design Process of Additive Manufactured Mesoscale Lattice Structures: a Review," Journal of Computing and Information Science in Engineering, 18:040801-1-040801-16, 2018.
Tang et al., "Bidirectional Evolutionary Structural Optimization (BESO) Based Design Method for Lattice Structure to be Fabricated by Additive Manufacturing," Computer-Aided Design, 69:91-101, 2015.
Toussaint, "Solving Geometric Problems with the Rotating Calipers," In Proceedings IEEE MELECON '83, Athens, Greece, May 1983, 8 pages.
Van Dijk et al., "Level-set Methods for Structural Topology Optimization: a Review," Structural and Multidisciplinary Optimization, 2013, 48:437-472.
Vatanabe et al., "Topology Optimization with Manufacturing Constraints: a Unified Projection-based Approach," Advances in Engineering Software, 100:97-112, 2016.
Wang et al., "A Level Set Method for Structural Topology Optimization," Computer Methods in Applied Mechanics and Engineering, 192:227-246, 2003.
Wang et al., "Cost-effective Printing of 3D Objects with Skin-frame Structures," (2013) [online] (retrieved from http://staff.ustc.edu.cn/~lgliu/Projects/2013_SigAsia_3DPrinting/default.htm), 6 pages.
Wang et al., "Cross Section-based Hollowing and Structural Enhancement," (May 16, 2017) [online] (retrieved from http://staff.ustc.edu.cn/~lgliu/Publications/Publications/2017-TVC-CGI2017-CrossSection.pdf), 12 pages.
Wang et al., "Design of Graded Lattice Structure with Optimized Mesostructures for Additive Manufacturing," Materials and Design, 142:114-123, 2018.
Wang et al., "Support-free Hollowing," IEEE Transactions on Visualization and Computer Graphics, Oct. 2018, 24(10):2787-2798.
Wang and Kang, "Structural Shape and Topology Optimization of Cast Parts Using Level Set Method," International Journal for Numerical Methods in Engineering, 111(13):1252-1273, 2017.
Wu et al., "Infill Optimization for Additive Manufacturing—Approaching Bone-like Porous Structures," (Nov. 19, 2016) [online] (retrieved from https://arxiv.org/pdf/1608.04366.pdf), 14 pages.
Xia et al., "A Level Set Based Method for the Optimization of Cast Part," Structural and Multidisciplinary Optimization, 41(5):735-747, 2010.
Zegard and Paulino, "Bridging Topology Optimization and Additive Manufacturing," Structural and Multidisciplinary Optimization, 53(1):175-192, 2016.
U.S. Appl. No. 62/758,053, filed Nov. 9, 2018, Martin Cvetanov Marinov.
U.S. Appl. No. 62/758,404, filed Nov. 9, 2018, Konara Mudiyanselage Kosala Bandara.
U.S. Appl. No. 16/256,954, filed Jan. 24, 2019, Konara Mudiyanselage Kosala Bandara.
U.S. Appl. No. 16/388,771, filed Apr. 18, 2019, Martin Cvetanov Marinov.
Authorized officer Katarzyna Nesciobelli, International Search Report and Written Opinion in PCT/US2019/060639, dated May 4, 2020, 18 pages.
Liu et al., "Topology Optimization for Hybrid Additive-Subtractive Manufacturing", Structural and Multidisciplinary Optimization, Aug. 29, 2016, 55(40:1281-1299).
Morris et al., "A Subtractive Manufacturing Constraint for Level Set Topology Optimization", Structural and Multidisciplinary Optimization, Jul. 3, 2019, 1-16.

\* cited by examiner

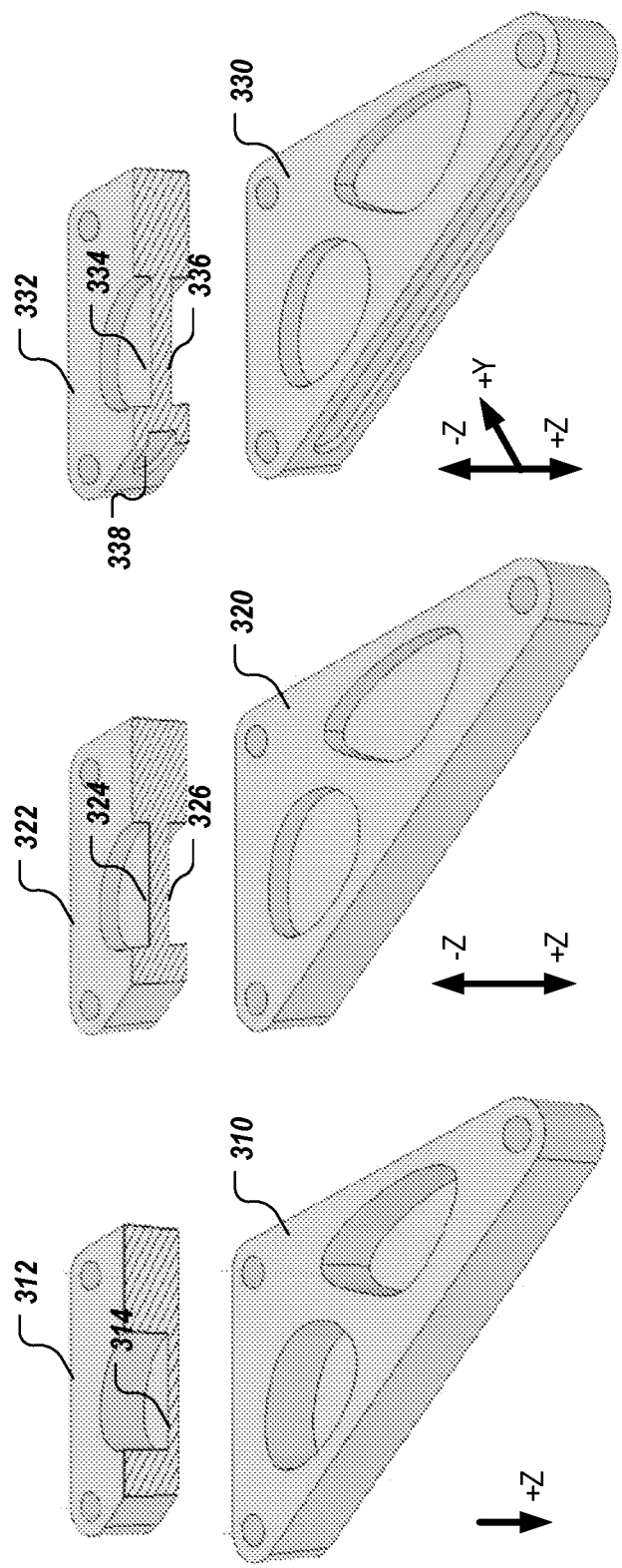

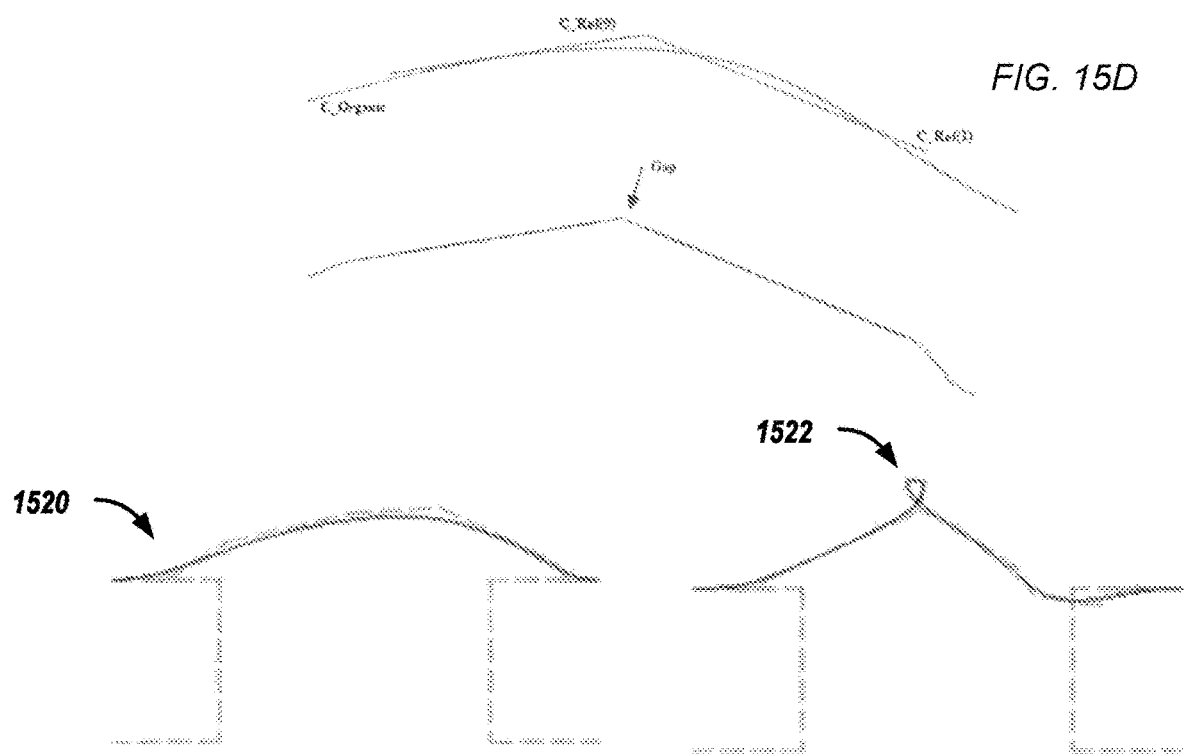
FIG. 15D
FIG. 15E
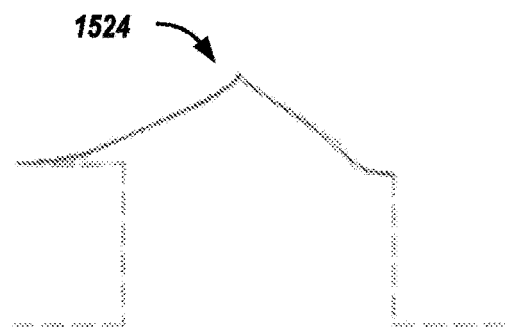
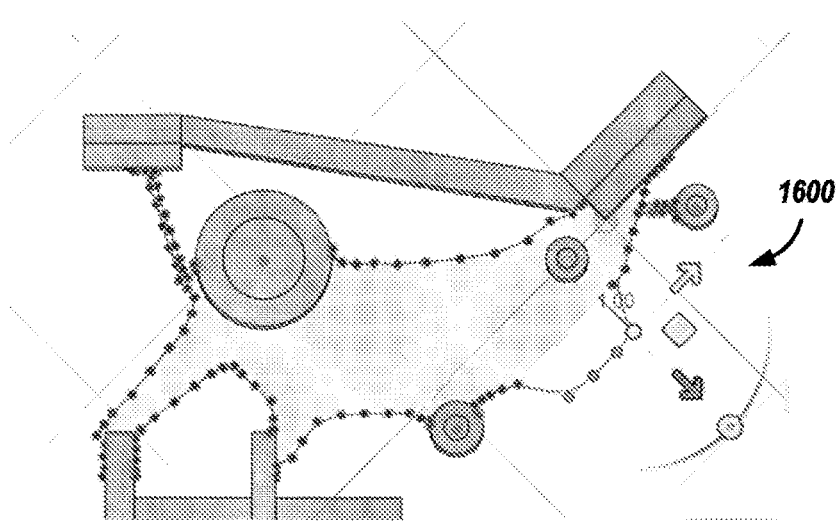
FIG. 16

CONVERSION OF GEOMETRY TO BOUNDARY REPRESENTATION WITH FACILITATED EDITING FOR COMPUTER AIDED DESIGN AND 2.5-AXIS SUBTRACTIVE MANUFACTURING

CROSS-REFERENCE TO RELATED APPLICATIONS

This application claims the benefit under 35 U.S.C. § 119(e) of U.S. Patent Application No. 62/758,454, entitled "BOUNDARY BASED GENERATIVE DESIGN WITH 2.5-AXIS SUBTRACTIVE MANUFACTURING CONSTRAINT FOR COMPUTER AIDED DESIGN AND MANUFACTURING", filed Nov. 9, 2018, which is incorporated herein by reference in its entirety.

BACKGROUND

This specification relates to computer aided design of physical structures, which can be manufactured using subtractive manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

Further, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, the inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver.

In addition, CAD programs have been used in conjunction with subtractive manufacturing systems and techniques. Subtractive manufacturing refers to any manufacturing process where 3D parts are created from stock material (generally a "blank" or "workpiece" that is larger than the 3D part) by cutting away portions of the stock material. Such manufacturing processes typically involve the use of multiple CNC machine cutting tools in a series of operations, starting with a roughing operation, an optional semi-finishing operation, and a finishing operation. During roughing operation(s), large portions of the workpiece are cut away quickly (relative to semi-finishing and finishing operations) using cutting tool(s) of the CNC machining system in order to approximate the final shape of the part being manufactured. Then, optional semi-finishing operation(s) and finishing operation(s) are used to complete the manufacturing of the part.

SUMMARY

This specification describes technologies relating to computer aided design of physical structures using generative design processes, where the three-dimensional (3D) models of the physical structures are produced so as to facilitate manufacturing of the physical structures using 2.5-axis subtractive manufacturing systems and techniques.

In general, one or more aspects of the subject matter described in this specification can be embodied in one or more methods (and also one or more non-transitory computer-readable mediums tangibly encoding a computer program operable to cause data processing apparatus to perform operations), including: obtaining, by a computer aided design program, a design space for an object to be manufactured and one or more design criteria including at least one manufacturability constraint for the object; performing, by the computer aided design program, a boundary-based generative design process to produce a generative model for the object using the one or more design criteria, wherein the at least one manufacturability constraint causes at least one shape derivative used during the boundary-based generative design process to guide shape changes for the generative model toward discrete height layers corresponding to a 2.5-axis subtractive manufacturing process; and providing, by the computer aided design program, a three dimensional model in accordance with the generative model, for use in manufacturing a physical structure corresponding to the object using one or more computer-controlled manufacturing systems that employ the 2.5-axis subtractive manufacturing process, wherein the three dimensional model includes flat areas resulting from the discrete height layers.

The generative model can include a level-set representation of a three dimensional topology for the object, and the boundary-based generative design process can employ a level-set method of topology optimization. The at least one shape derivative used during the boundary-based generative design process can guide the shape changes for the generative model toward side walls for the discrete height layers that are parallel to a milling direction of the 2.5-axis subtractive manufacturing process. The design space can include a bounding volume containing an initial specification of one or more outer shapes of the three dimensional topology for the object, and performing the boundary-based generative design process can include extending the one or more outer shapes of the three dimensional topology to fill the bounding volume in the milling direction.

The milling direction can include two or more milling directions, and performing the boundary-based generative design process can include iteratively modifying the one or more outer shapes of the three dimensional topology for the object. Each iteration can include: performing physical simulation of the object to produce a physical assessment of a current iteration of the one or more outer shapes of the three dimensional topology for the object; computing shape change velocities for the one or more outer shapes of the three dimensional topology in the current iteration in accordance with the physical assessment and the at least one shape derivative; updating the one or more outer shapes of the three dimensional topology for the object using the shape change velocities; extending the one or more outer shapes of the three dimensional topology to fill the bounding volume in each of the two or more milling directions, thereby forming two or more sets of one or more extended shapes; and changing the one or more outer shapes to be a Boolean intersection of the two or more sets of one or more extended shapes for a next iteration.

The at least one manufacturability constraint can include (i) a number of the discrete height layers, the number being determined by user input or by automatic detection, and (ii) two or more available milling directions for the 2.5-axis subtractive manufacturing process, the two or more milling directions being determined by user input or by automatic detection, and the two or more milling directions optionally including at least one off-axis milling direction. The at least one manufacturability constraint can include: an internal corner of the generative model having a radius equal to a tool corner radius of a milling tool used in the 2.5-axis subtractive manufacturing process.

The one or more design criteria can include a setup for physical simulation of the object, at least one design objective for the object, e.g., structural performance and/or mass minimization objectives, and at least one design constraint for the object, e.g., volume and/or manufacturing time constraints. The performing can include performing the boundary-based generative design process to produce two or more generative models in accordance with the one or more design criteria and variations in the discrete height layers, milling directions, or both. The method (or operations performed by the data processing apparatus in accordance with the computer program tangibly encoded in one or more non-transitory computer-readable mediums) can include preparing and presenting an analysis of trade-offs between or among the two or more generative models based at least in part on the variations in the discrete height layers, the milling directions, or both. The 2.5-axis subtractive manufacturing process can be used to manufacture the physical structure directly, the three dimensional model being a model of the object, or to manufacture a mold for the physical structure, the three dimensional model being a model of the mold. The providing can include saving the three dimensional model to a permanent storage device for use in manufacturing the physical structure corresponding to the object using the one or more computer-controlled manufacturing systems.

The providing can include converting (i) a polygon mesh, which is output by the boundary-based generative design process, or (ii) generative design data obtained directly from the boundary-based generative design process, e.g., level-set distance fields data, into a boundary representation model or a parametric feature model, to form the three dimensional model, wherein the parametric feature model is editable as sketch geometry. The providing can include: generating toolpath specifications for a 2.5-axis subtractive manufacturing machine using the three dimensional model; and manufacturing at least a portion of the physical structure corresponding to the object, or a mold for the physical structure, with the 2.5-axis subtractive manufacturing machine using the toolpath specifications.

One or more aspects of the subject matter described in this specification can also be embodied in one or more systems including: a non-transitory storage medium having instructions of a computer aided design program stored thereon; and one or more data processing apparatus configured to run the instructions of the computer aided design program to perform any of the one or more methods described above. The one or more systems can further include a 2.5-axis subtractive manufacturing machine.

This specification also describes technologies relating to computer aided design of physical structures using data format conversion (e.g., of output(s) from generative design processes) and user interface techniques that facilitate the production of 3D models of physical structures that are readily usable with 2.5-axis subtractive manufacturing systems and techniques.

One or more aspects of the subject matter described in this specification can be embodied in one or more methods, including: obtaining, by a computer aided design (CAD) program, a first model of an object to be manufactured using a 2.5-axis subtractive manufacturing process, wherein the first model includes smooth curves fit to contours representing discrete height layers of the object to be manufactured using the 2.5-axis subtractive manufacturing process; modifying, by the CAD program, at least one of the smooth curves to facilitate the 2.5-axis subtractive manufacturing process, wherein the modifying includes detecting at least a portion of a first smooth curve for a first of the discrete height layers that is almost coincident with at least a portion of a second smooth curve for a second of the discrete height layers, and replacing the at least a portion of the first smooth curve for the first of the discrete height layers with the at least a portion of the second smooth curve for the second of the discrete height layers; preparing, by the CAD program, an editable model of the object, the editable model includes a series of construction steps represented in a parametric feature history, wherein the series of construction steps includes combining extruded versions of the smooth curves to form a solid three dimensional (3D) model of the object in a boundary representation format, and the parametric feature history includes a sketch feature associated with at least one of the discrete height layers; rendering, by the CAD program, a user interface element showing the sketch feature in relation to the editable model; receiving, by the CAD program, user input via the user interface element; and reshaping, by the CAD program responsive to the user input, a subset of the smooth curves in the at least one of the discrete height layers to change the solid 3D model; and replaying, by the CAD program, the series of construction steps represented in the parametric feature history to construct the solid 3D model of the object in the boundary representation format, as changed by the user input.

One or more aspects of the subject matter described in this specification can be embodied in one or more non-transitory computer-readable mediums encoding a computer aided design program operable to cause one or more data processing apparatus to perform operations including: obtaining a first model of an object to be manufactured using a 2.5-axis subtractive manufacturing process, wherein the first model includes smooth curves fit to contours representing discrete height layers of the object to be manufactured using the 2.5-axis subtractive manufacturing process; modifying at least one of the smooth curves to facilitate the 2.5-axis subtractive manufacturing process, wherein the modifying including detecting at least a portion of a first smooth curve for a first of the discrete height layers that is almost coincident with at least a portion of a second smooth curve for a second of the discrete height layers, and replacing the at least a portion of the first smooth curve for the first of the discrete height layers with the at least a portion of the second smooth curve for the second of the discrete height layers; preparing an editable model of the object, the editable model including a series of construction steps represented in a parametric feature history, wherein the series of construction steps includes combining extruded versions of the smooth curves to form a solid three dimensional (3D) model of the object in a boundary representation format, and the parametric feature history includes a sketch feature associated with at least one of the discrete height layers; rendering a user interface element showing the sketch feature in relation to the editable model; receiving user input via the user interface element; and reshaping, responsive to the user input, a subset of the smooth curves in the at least one of the discrete height layers to change the solid 3D model; and replaying the series of construction steps represented in the parametric feature history to construct the solid 3D model of the object in the boundary representation format, as changed by the user input.

Both the method and the non-transitory computer-readable medium aspects of the subject matter described in this specification can include the following features. The first model can include one or more modelled solids, which are to be preserved in the solid 3D model of the object; the modifying can include detecting at least a portion of another smooth curve for the first of the discrete height layers that is almost coincident with at least a portion of the one or more modelled solids, and aligning the at least a portion of the another smooth curve for the first of the discrete height layers with the at least a portion of the one or more modelled solids; wherein the reshaping includes constraining changes to the at least a portion of the another smooth curve to maintain tangency and contact with the at least a portion of the one or more modelled solids; and wherein the series of construction steps includes combining the extruded versions of the smooth curves with the one or more modelled solids to form the solid 3D model of the object in the boundary representation format.

The obtaining can include: receiving shape data corresponding to the object to be manufactured using the 2.5-axis subtractive manufacturing process; processing the shape data to produce polylines matching the contours representing the discrete height layers of the object; fitting the smooth curves to the polylines; and replacing at least one segment of at least one of the smooth curves to reduce a curvature of the at least one segment to be less than or equal to a curvature of a smallest milling tool available for use in the 2.5-axis subtractive manufacturing process for at least one of the discrete height layers. Replacing the at least one segment of the at least one of the smooth curves can include, for each set of smooth curves within one of the discrete height layers: offsetting outward the set of smooth curves by an amount that is based on the curvature of the smallest milling tool available; and offsetting inward the set of smooth curves by the amount, while closing any produced gaps using circular arcs.

The shape data can include a level-set distance field output by a generative design process that employs a level-set based topology optimization method, and processing the shape data can include, for each of the discrete height layers: resampling the level-set distance field to produce a two dimensional (2D) level-set grid at a slice plane corresponding to a current one of the discrete height layers, the slice plane being perpendicular to a milling direction to be used in the 2.5-axis subtractive manufacturing process (note that the milling direction can be arbitrarily aligned, and not necessarily parallel with any of the level set 3D coordinate system axes); and extracting a current layer polyline from the 2D level-set grid, the current layer polyline matching a current layer contour of the object at the slice plane.

Receiving the shape data can include receiving a mesh representation of the object, or receiving a level-set representation of the object from a generative design process and processing the shape data can include converting the level-set representation of the object into a mesh representation of the object; wherein processing the shape data to produce the polylines includes slicing the mesh representation of the object with planes located within respective ones of the discrete height layers along a milling direction, each of the planes being perpendicular to the milling direction; and wherein the obtaining can include: segmenting the polylines into a first set of segments assigned to the one or more modelled solids and a second set of segments not assigned to the one or more modelled solids, wherein the segmenting uses a tolerance value when assigning polyline vertices to segments that errs on assignment to the one or more modelled solids, and extending one or more segments in the second set of segments that are connected with one or more segments in the first set of segments until the one or more segments in the second set of segments meet at an intersection point or at a tangent point of at least one of the one or more modelled solids, while also checking to align intersections of any extended segments that intersect a same at least one of the one or more modelled solids.

The obtaining can include: receiving a level-set representation of the object, or receiving a mesh representation of the object and converting the mesh representation into a level-set representation of the object; modifying one or more level-set values in the level-set representation of the object, in each of one or more milling directions specified for the 2.5-axis subtractive manufacturing process, to remove undercuts; modifying one or more additional level-set values in the level-set representation of the object to move one or more planar faces of the object up to a height level of that planar face's corresponding one of the discrete height layers; and converting the modified level-set representation of the object into an output mesh representation of the object; wherein the first model includes the output mesh representation of the object.

The method/operations can include, for each modelled solid of the one or more modelled solids: for each layer of the discrete height layers along a milling direction, intersecting the layer with the modelled solid to produce a portion of the modelled solid, moving the portion of the modelled solid completely under the layer in the milling direction, sweeping the portion of the modelled solid upward, opposite the milling direction, through the layer to produce a swept solid, and intersecting the layer with the swept solid with to produce a replacement for the portion of the modelled solid; and sweeping one or more upside faces of the modelled solid upward, opposite the milling direction, to a top most level of the discrete height layers along the milling direction to produce one or more upside swept solids; sweeping any downside faces of the modelled solid downward, in the milling direction, to a bottom most level of the discrete height layers along the milling direction to produce one or more downside swept solids; intersecting the one or more upside swept solids with the one or more downside swept solids to produce one or more undercut filling solids; and combining the one or more undercut filling solids with the modelled solid.

One or more aspects of the subject matter described in this specification can be embodied in one or more systems including: a display device; one or more data processing apparatus coupled with the display device; and a non-transitory storage medium coupled with the one or more data processing apparatus, the non-transitory storage medium encoding: program code that causes the one or more data processing apparatus to obtain a first model of an object to be manufactured using a 2.5-axis subtractive manufacturing process, wherein the first model includes smooth curves fit to contours representing discrete height layers of the object to be manufactured using the 2.5-axis subtractive manufacturing process; program code that causes the one or more data processing apparatus to modify at least one of the smooth curves to facilitate the 2.5-axis subtractive manufacturing process, including program code to detect at least a portion of a first smooth curve for a first of the discrete height layers that is almost coincident with at least a portion of a second smooth curve for a second of the discrete height layers, and program code to replace the at least a portion of the first smooth curve for the first of the discrete height layers with the at least a portion of the second smooth curve for the second of the discrete height layers; program code that causes the one or more data processing apparatus to prepare an editable model of the object, the editable model including a series of construction steps represented in a parametric feature history, wherein the series of construction steps includes combining extruded versions of the smooth curves to form a solid three dimensional (3D) model of the object in a boundary representation format, and the parametric feature history includes a sketch feature associated with at least one of the discrete height layers; program code that causes the one or more data processing apparatus to render to the display screen a user interface element showing the sketch feature in relation to the editable model; program code that causes the one or more data processing apparatus to receive user input via the user interface element; program code that causes the one or more data processing apparatus to reshape, responsive to the user input, a subset of the smooth curves in the at least one of the discrete height layers to change the solid 3D model; and program code that causes the one or more data processing apparatus to replay the series of construction steps represented in the parametric feature history to construct the solid 3D model of the object in the boundary representation format, as changed by the user input.

The non-transitory storage medium of the system(s) can encode program code that causes the one or more data processing apparatus to perform any of the operations of the non-transitory computer-readable medium aspects of the subject matter described in this specification. For example, the non-transitory storage medium can encode program code that causes the one or more data processing apparatus to perform a boundary-based generative design process to produce a generative model for the object using one or more design criteria, wherein the at least one manufacturability constraint causes at least one shape derivative used during the boundary-based generative design process to guide shape changes for the generative model toward discrete height layers corresponding to the 2.5-axis subtractive manufacturing process. In some implementations, the system(s) include a subtractive manufacturing machine, and the non-transitory storage medium encodes program code that causes the one or more data processing apparatus to generate one or more toolpath specifications for the solid 3D model and manufacture at least a portion of a physical structure using the one or more toolpath specifications with the subtractive manufacturing machine.

Particular embodiments of the subject matter described in this specification can be implemented to realize one or more of the following advantages. A three dimensional model of a physical structure can be produced that includes flat areas resulting from discrete height layers enforced by at least one manufacturability constraint used during topology optimization in a generative design process, where the discrete height layers can facilitate reduced CAM programming time, machining time, less need for custom fixtures for clamping, or a combination of the foregoing during machining of the physical structure in a 2.5-axis subtractive manufacturing process. A trade-off analysis of design variations enables a sufficient number of design variations for the user to perform further analysis between the designs. The subject matter described can provide the possibility to evaluate production cost of a 3D model and to perform a final precise simulation of the production of the 3D model.

Particular embodiments of the subject matter described in this specification can also be implemented to realize one or more of the following advantages. Geometry can be produced that is both easy to edit in a CAD application, and easy and efficient to manufacture using 2.5-axis capable subtractive manufacturing methods (e.g., with 3-axis milling machines). The output geometry produced includes flat regions perpendicular to the 2.5D axis that can be quickly cleared using a flat-end mill. Undercuts that are not reachable by a 2.5-axis constrained tool path can be avoided, either by not creating them in the first instance and/or by healing them during conversion to boundary representation format. Thin shelves can be prevented from being produced in the final output geometry, as thin shelves can unnecessarily increase milling time for a part. Regions of high curvature, which a tool of a given radius would be unable to access and cut, can also be prevented from being produced in the final output geometry.

The algorithm can work with various forms of input, including a 3D polygonal mesh, polyline contours for each 2.5D layer of the object, and levels (if provided, or the levels can be detected from the 2.5 axis direction). The algorithm can be robust to imperfect inputs, such as geometry that is not 2.5D everywhere (the algorithm can force the shape to be 2.5D everywhere), geometry that has rounded edges where there should be sharp edges (the algorithm can create sharp edges), and geometry that has undercuts, either in preserve geometry or in organic (generatively designed) geometry (the algorithm can fill the undercuts).

An easy to use editor interface can be created for the user working with a 3D model of an object that is to be manufactured using a 2.5-axis subtractive manufacturing process. A sketch user interface element associated with the contours of the object in a parametric feature history allows quick changes to the 3D model, while also ensuring that the 3D model reconstructed after each edit will remain manufacturable using the 2.5 axis subtractive manufacturing process. Produced construction geometry can be assembled as a feature recipe in a parametric CAD application, which facilitates user editing while also maintain the 2.5-axis subtractive manufacturability.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3A shows a graphical representation of an example of a design with a single milling direction.

FIG. 3B shows a graphical representation of an example of a design with two opposing milling directions.

FIG. 3C shows a graphical representation of an example of a design with three milling directions.

FIGS. 15A-15E show graphical representations of curve alignment.

FIG. 16 shows an example of a 2D sketch user interface element for a parametric editable model.

Like reference numbers and designations in the various drawings indicate like elements.

DETAILED DESCRIPTION

A method for enforcing a manufacturability constraint in generated parts such that they may be fabricated using a 2.5-axis subtractive approach is described. Multi-axis CNC milling is enhanced by allowing material removal from the flank of the machining tool. A shape derivative that enforces a user specified number of discrete height layers is added, which can produce large flat regions that can be easily machined. The discrete height layers and milling directions can be set manually by the user or automatically detected. A post processing stage can be applied, which forces the surface to conform to the discrete height layers and optionally adds an internal fillet that allows support for "bull-nose" type machine tools. The final geometry can be exported as a mesh with additional meta data for conversion into CAD/CAM friendly geometry. In some implementations, boundary-based generative design processes (e.g., level-set methods) are used, but can be modified as described below. In some implementations, the systems and techniques described in U.S. Patent Application No. 62/758,404, filed Nov. 9, 2018, and PCT/US2019/060089, filed Nov. 6, 2019, titled "MACROSTRUCTURE TOPOLOGY GENERATION WITH PHYSICAL SIMULATION FOR COMPUTER AIDED DESIGN AND MANUFACTURING", and published on May 14, 2020, as WO-2020/097216, which application is hereby incorporated by reference, are used.

Figure 1A:
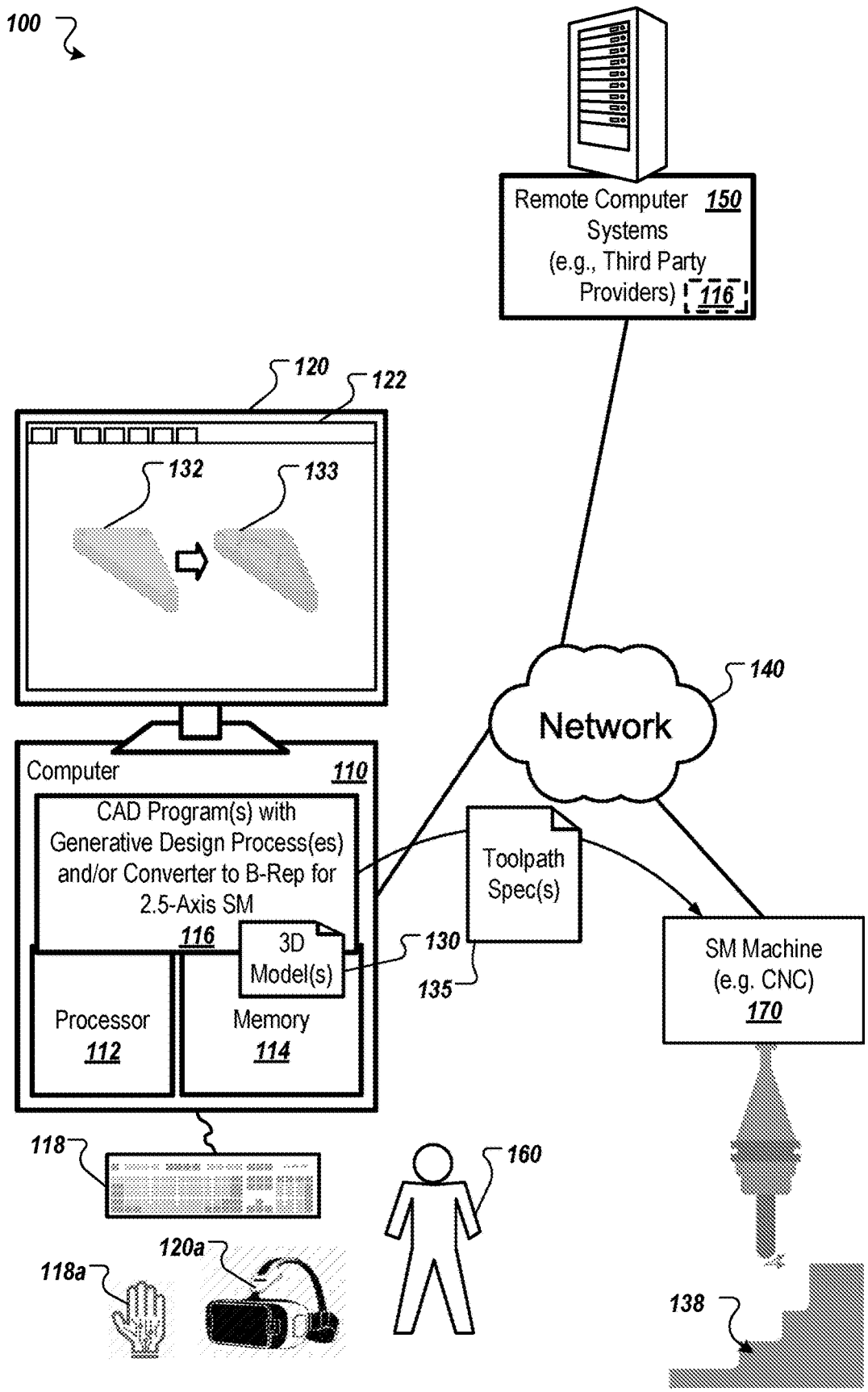
FIG. 1A shows an example of a system usable to design and manufacture physical structures with a 2.5-axis subtractive manufacturing constraint.

FIG. 1A shows an example of a system 100 usable to design and manufacture physical structures with a 2.5-axis subtractive manufacturing constraint. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for topology optimization (e.g., using at least one level-set method as described) with physical simulation. The physical simulation performed by the systems and techniques described in this document can simulate one or more physical properties and can use one or more types of simulation. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electro-magnetic flux, and/or material solidification (which is useful for phase changes in molding processes) simulations.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

An initial 3D model 132 can be an input to a generative design process. The user 160 can define a topology optimization problem for a generative design process to operate on to produce a desired 3D model 133 from a starting 3D model 132, or the input can be a design space without a specific starting 3D model 132 (note that the generative design process itself can produce starting geometry within the design space). In addition, the starting model 132 can be input preserve geometry, which can be unconnected modelled solids, where the generative design process is used to produce new 3D geometry that connects the input solids. As described herein, the CAD program(s) 116 implement at least one generative design process, which enables the CAD program(s) 116 to generate one or more portions of the 3D model(s) automatically (or the entirety of a 3D model) based on design objective(s) and constraint(s), where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources.

The design constraints can be defined by the user 160, or by another party and imported into the CAD program(s) 116. For 2.5-axis subtractive manufacturing, the design constraints can include manufacturability constraint(s) in generated 3D objects such that the generated 3D objects can be manufactured using 2.5-axis subtractive manufacturing. Additionally or in combination, the design constraints can include both structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and topology of at least a portion of the 3D model. The optimization of the geometric design of the 3D model(s) by the CAD program(s) 116 involves topology optimization, which is a method of light-weighting where the optimum distribution of material is determined by minimizing an objective function subject to design constraints (e.g., structural compliance with volume as a constraint). There are two primary categories of topology optimization, density-based approaches and boundary-based approaches. Density-based approaches discretize the volume of the part, and assign a density to each discrete cell. Then the densities are driven toward solid and empty while supporting the specified boundary conditions. Boundary-based approaches instead track the shape of the external interface of the solid part and move the boundary such that the constraints are satisfied. In order to enforce the 2.5-axis manufacturability constraint(s), boundary-based approaches can be chosen because boundary-based approaches have the advantage of providing precise knowledge of the boundary. The boundary-based approaches can use an implicit method known as a level set method to track the boundary. This level set method has the advantage of allowing topological changes as the surface evolves without the need for re-meshing.

Once the user 160 is satisfied with a generatively designed 3D model, the 3D model can be stored as a 3D model document 130 and/or used to generate another representation of the model (e.g., toolpath specifications for a 2.5-axis subtractive manufacturing). This can be done upon request by the user 160, or in light of the user's request for another action, such as sending the 3D model 132 to a subtractive manufacturing (SM) machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

The CAD program(s) 116 can provide a document 135 (having toolpath specifications of an appropriate format) to the SM machine 170 to create a complete structure 138, which includes the optimized topology and shape (e.g., a staircase-like design generated for 2.5-axis milling). The SM machine 170 can employ one or more subtractive manufacturing techniques, e.g., a Computer Numerical Control (CNC) milling machine, such as a multi-axis, multi-tool milling machine. In addition, the user 160 can save or transmit the 3D model for later use. For example, the CAD program(s) 116 can store the document 130 that includes the generated 3D model.

In various implementations, the CAD program(s) 116 of the system 100 can implement one or more generative design processes as described in this document.

Generative design processes seek an optimal geometric shape, topology, or both. For example, generative design processes seek an optimal geometric shape among alternative designs by minimizing a performance-related objective function subject to constraints:

$$\text{minimize } J(s, u(s)) s \in \mathbb{R}^{n_s} \quad (1)$$

$$\text{such that } g_i(s, u(s)) = 0 \; i=1, \ldots, n_g \quad (2)$$

where s is a vector of design variables related to a geometric shape of the domain, and u is a vector of state variables (e.g., displacement) that depend on s. Additional constraints (e.g., equilibrium) are denoted by a set $g_i$. For simplicity, equality constraints are assumed here. Mathematical programming methods used to minimize (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \quad (3)$$

which is a derivative of the performance-related objective function with respect to the design variables. In level-set based topology optimization methods, s represents a boundary of a solid region.

Figure 1B:
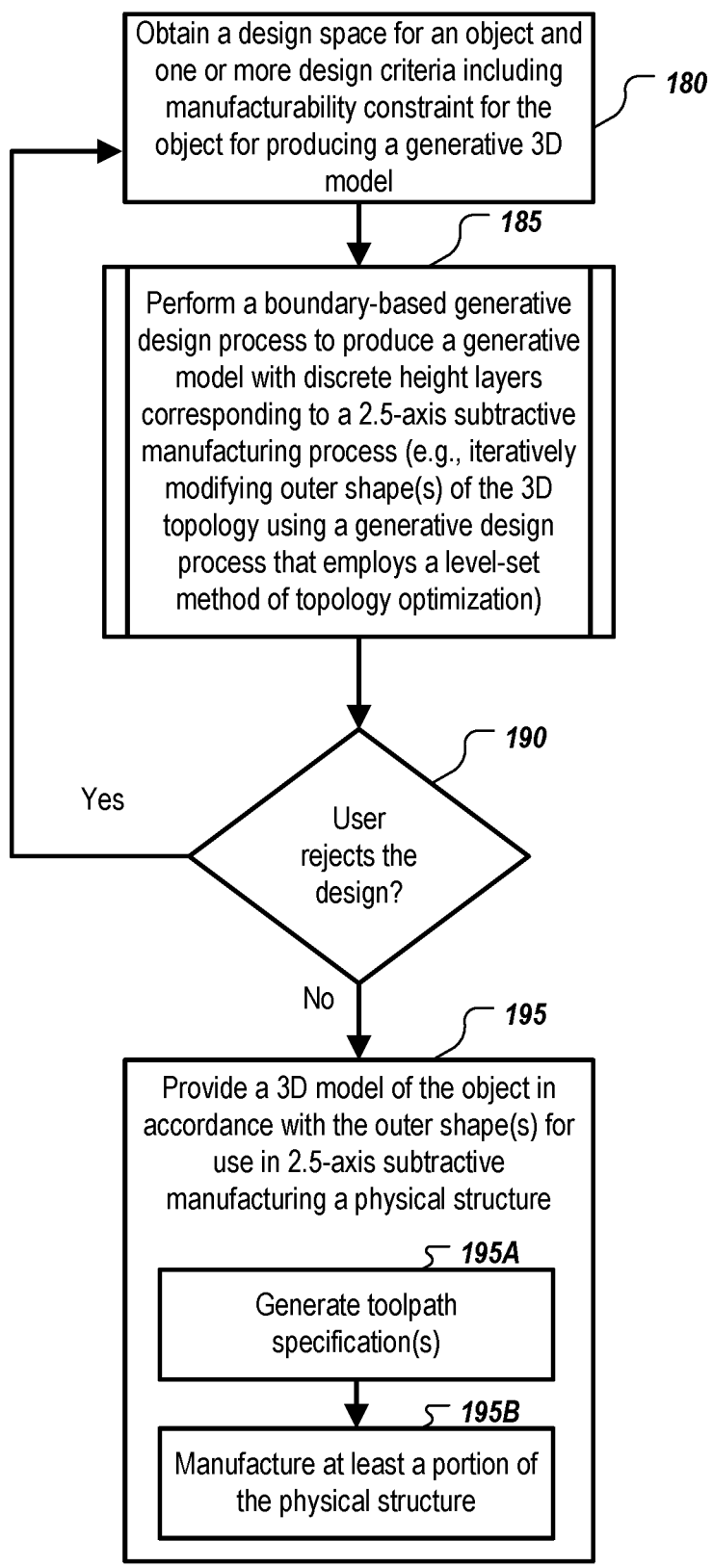
FIG. 1B shows an example of a process of designing and manufacturing physical structures with a 2.5-axis subtractive manufacturing constraint.

FIG. 1B shows an example of a process of designing and manufacturing physical structures with a 2.5-axis subtractive manufacturing constraint. Design space for an object and one or more design criteria are obtained 180, e.g., by CAD program(s) 116, for use in producing a generative 3D model. The design criteria can include manufacturability constraint(s) for the object, e.g., 2.5-axis subtractive manufacturability constraint(s). Different generative design processes can be formulated by using different combinations of design variables, e.g., level-sets. In some implementations, the design variables can include various types of inputs, received through UI 122, such as selection among different generative design synthesis methods made available by CAD program(s) in the system 100. In some implementations, the available generative design synthesis methods can include a level-set-based topology optimization that provides a basic level-set method for topology optimization.

Design space is obtained for subtractive manufacturing processes, which typically begin with a solid block of stock material and gradually remove material from the block. In some implementations, the obtained design space can include (1) a design space for generative design geometry production, e.g., a boundary representation (B-Rep) 3D model designed or loaded into CAD program(s) 116 that serves as a sub-space of an optimization domain of a described generative design process, and/or (2) a set of input solids that specify boundary conditions for generative design geometry production, e.g., B-Reps selected using UI 122 to specify sub-space(s) that are preserved for use as connection point(s) with other component(s) in a larger 3D model or separate 3D model(s). For example, the obtained design space can include obstacles, e.g., B-Reps used to remove a volume from a design space. Different combinations of design variables can be used, e.g., by CAD program(s) 116 in response to input from the user 160. For example, a user 160 may select different generative design synthesis methods to use within respective different design spaces within a single 3D model.

One or more design criteria can include a setup for physical simulation, e.g., densities of elements in an FEA model to be used with an optimized 3D topology of the part being generatively designed. The one or more design criteria can include various design objectives and manufacturability constraints, such as described in this document. Furthermore, functions can be provided, e.g., by CAD program(s) 116, that assist the user in specifying the one or more design criteria.

With the generative design space and design criteria specified, one or more 3D model(s) are produced 185, e.g., by CAD program(s) 116, using one or more generative design processes. A boundary-based generative design process is performed, e.g., by CAD program(s) 116, to produce a generative model with discrete height layers corresponding to a 2.5-axis subtractive manufacturing process. The discrete height layers result in flat areas in the one or more 3D model(s), which facilitate manufacturing of the corresponding physical structure(s). In some implementations, outer shape(s) of the 3D topology of a 3D model are iteratively modified using one or more generative design processes that employ a level-set method of topology optimization. More details about iteratively optimizing a topology for a 3D model of an object for 2.5-axis subtractive manufacturing are described below in connection with FIG. 4 and FIG. 8.

In some implementations, the one or more generative design processes can use the described level-set methods, where s, from equations (1), (2) and (3), represents a boundary of a solid region that is implicitly represented using one or more level-sets, which are signed distance values computed on a Cartesian background grid. In a level-set-based topology optimization method, the outer shape of a structure is represented by a one-dimensional high-level level set function, and a change in shape and configuration is replaced by a change in the level set function value, so as to obtain an optimum structure. The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a predetermined value between a value representing the material domain and a value representing the void domain represents the boundary between the material domain and the void domain.

As shown in FIG. 1B, the generative design method described in this document, can be implemented, e.g., in CAD program(s) 116, to provide both (1) substantial user control over the generative design process, as well as post-processing of the generative design output to form a final, acceptable 3D model of an object, and (2) control functions for providing the generatively designed 3D model for use in manufacturing a physical structure corresponding to the object.

In some implementations, at least one shape derivative is used during the boundary-based generative design process. The shape derivative can guide the shape changes for the generative model toward side walls for the discrete height layers that are parallel to a milling direction of the 2.5-axis subtractive manufacturing process. More details about the shape derivative are described below in connection to FIG. 4.

In some implementations, performing 185 the boundary-based generative design process can include shape initialization. The design space can include a bounding volume containing an initial specification of one or more outer shapes of the three dimensional topology for the object. Performing 185 the boundary-based generative design process can include extending the one or more outer shapes of the three dimensional topology to fill the bounding volume in a direction that is inaccessible to the milling direction (absent a new fixture for the part during manufacturing). More details about shape initialization are described below in connection to FIGS. 7A-7D.

The result of generative design processing can be presented to the user, e.g., in UI 122 on display device 120, along with an option 190 to accept or reject the design. For example, a 3D model 133 produced by the generative design processing can be presented to the user 160 in UI 122. In some implementations, two or more 3D models resulting from the generative design process (e.g., the process of iteratively modifying outer shape(s) of the 3D topology) can be presented to the user along with trade-off analysis of design complexity versus cost of manufacturing. The trade-off analysis can assist a user 160 to accept or reject one or more 3D models among the presented 3D models. More details about design variations for trade-off analysis are described below in connection with FIG. 5.

If the design is rejected, the process of FIG. 1B can return to obtain 180, e.g., by CAD program(s) 116, new design space and/or new design criteria for use in producing a new generative 3D model. Once a design in not rejected 190, the process of FIG. 1B can provide 195, e.g., by CAD program(s) 116, the 3D model of the object in accordance with the outer shape(s) for use in 2.5-axis subtractive manufacturing a physical structure. The providing 195 can involve sending or saving the 3D model to a permanent storage device for use in manufacturing the physical structure corresponding to the object using the SM manufacturing systems. In some implementations, the providing 195 involves generating 195A, e.g., by CAD program(s) 116, toolpath specifications for the computer-controlled SM manufacturing system(s) using the 3D model, and manufacturing 195B, e.g., by CAD program(s) 116, at least a portion of the physical structure corresponding to the object with the computer-controlled SM manufacturing system(s) using the toolpath specifications generated for the 2.5-axis SM machine. In some implementations, the providing 195 can include manufacturing a mold for a physical structure with the 2.5-axis subtractive manufacturing machine using the toolpath specification generated 195A.

The 3D model that is provided 195 can be the 3D model produced 185 by a generative design synthesis method or a post-processed version of the generative design output. In some implementations, a polygon mesh, which is the output by the boundary-based generative design process, or generative design data obtained directly from the boundary-based generative design process can be converted into a boundary representation (B-Rep) model and/or a parametric feature model, e.g., by CAD program(s) 116. For example, generative design data can be level-set distance field data obtained directly from the boundary-based generative design process. The boundary representation model or the parametric feature model can be editable as sketch geometry. For example, in some implementations, a 3D mesh model produced by a generative design synthesis method can be converted into a watertight B-Rep 3D model, as described in further detail below, before being provided 195.

Figure 8:
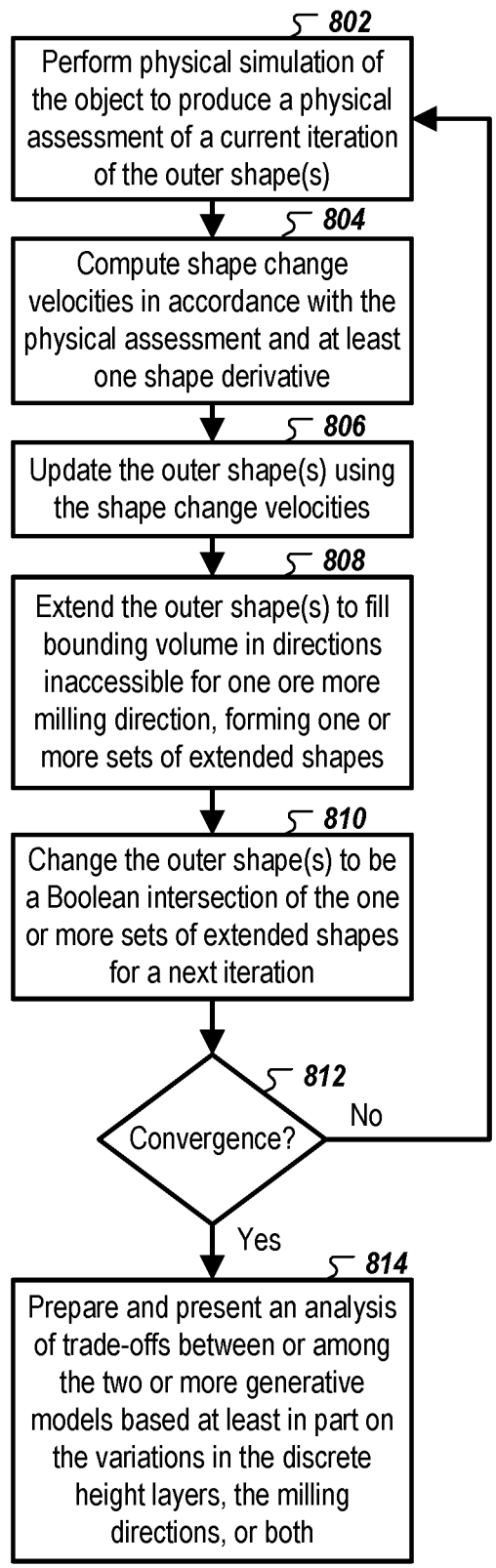
FIG. 8 shows an example of a process that iteratively optimizes a topology using formal constraints and access fix for one or more portions of a 3D model of an object being generatively designed for 2.5-axis subtractive manufacturing.
Figure 8:
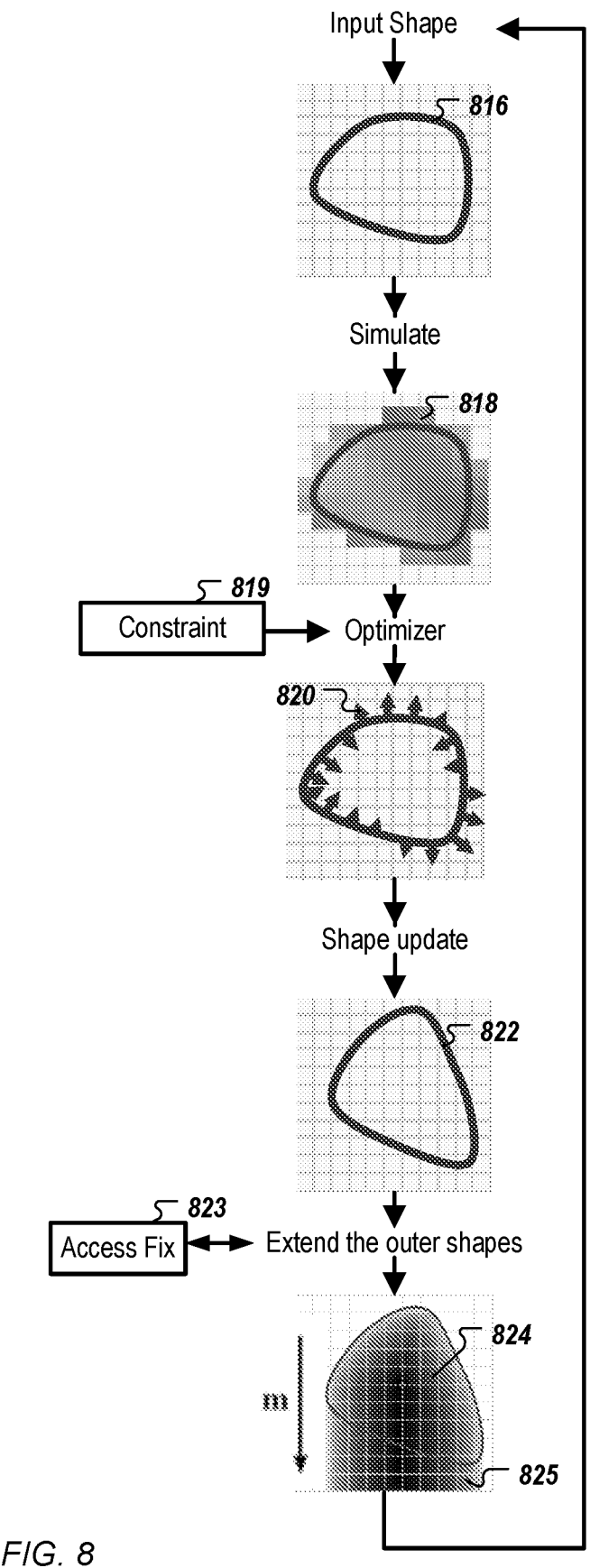

The generative design processes described below in connection with FIG. 4 and FIG. 8 can also be implemented to use the post-processing, editing, and/or provisioning 195 systems and techniques described above. While described in the context of a CAD program providing multiple options for generative design, each of the generative design processes described in this document can be implemented as a standalone generative design process in a CAD program. Thus, not all of the generative design processes described below in connection with FIG. 4 and FIG. 8 need be implemented together in any given implementation. In any case, the goal is to produce a 3D model of an object that facilitates 2.5-axis subtractive manufacturing of the object.

Subtractive manufacturing processes typically begin with a solid block of stock material and gradually remove material from the stock. One of the common subtractive approaches is milling, which uses rotary cutters, also known as "tools" or "bits", to remove the material. The milling process can limit the types of shapes that can be manufactured because the milling machine must be able to hold the part rigidly and the rotary bit must be able to access the material surface without interference. Other important considerations that should to be taken into account are vibration of the part during material removal and stresses on the bit itself by the milling process.

Figure 2A:
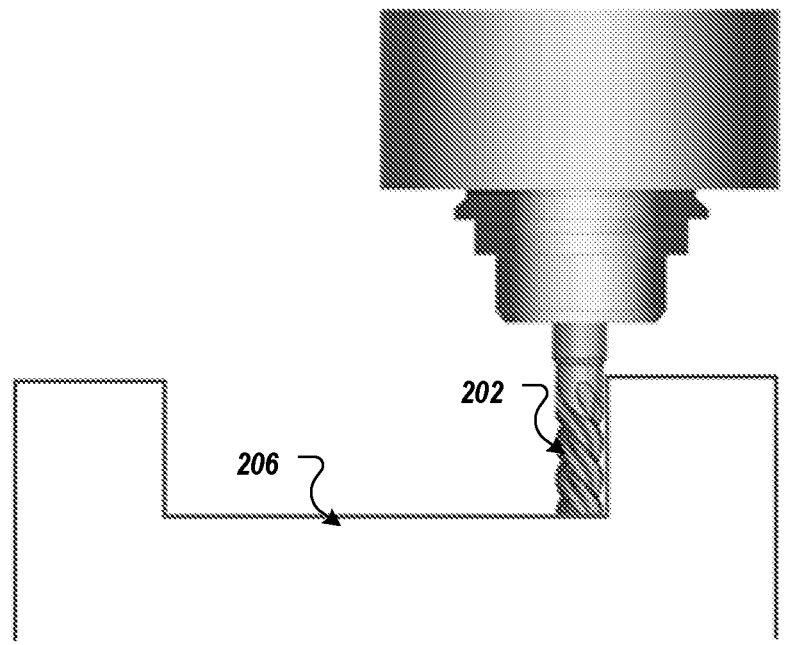
FIG. 2A shows a graphical representation of an example of 2.5-axis subtractive manufacturing.
Figure 2B:
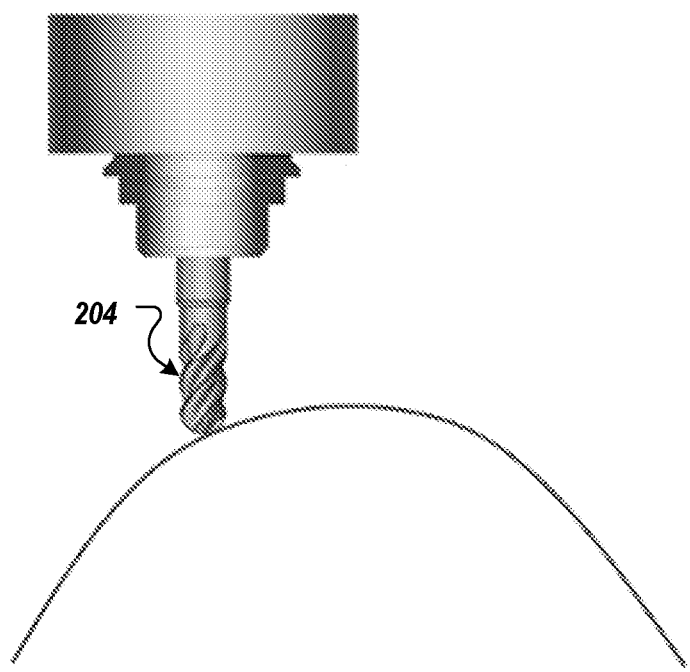
FIG. 2B shows a graphical representation of an example of 3-axis subtractive manufacturing.

Subtractive manufacturing techniques can include 2-axis milling, 2.5-axis milling or 3-axis milling. 2-axis milling can cut through a stock without the ability to adjust the height level of the milling head. 3-axis milling can cut through a stock while moving the milling tool in three separate dimensions. 2.5-axis milling uses a 3-axis milling machine, as the milling tool (or combination of the milling tool and the fixture support) can be moved in all three separate dimensions, but during most of the cutting operations, the milling tool is only moved in 2 axes with respect to the workpiece, which results a more efficient manufacturing process. FIGS. 2A-2B illustrate the difference between 2.5-axis subtractive manufacturing and 3-axis subtractive manufacturing. FIG. 2A shows a graphical representation of an example of 2.5-axis subtractive manufacturing. In the example of a 2.5-axis milling, the subtractive process occurs with continuous movement in the plane perpendicular to the milling tool 202 but in discrete steps parallel to the milling tool 202. FIG. 2B shows a graphical representation of an example of 3-axis subtractive manufacturing. The example of 3-axis milling can have continuous movement in the plane perpendicular to the milling tool 204, and can also have continuous movement parallel to the milling tool 204. In other words, the 3-axis milling can have continuous movement in all three directions. Compared with 3-axis subtractive manufacturing, the 2.5-axis subtractive manufacturing process can rapidly remove layers of material in sequence, and create parts that often have a series of "pockets" at varying depths. Targeting 2.5-axis subtractive manufacturing means the geometry should have a layered shape, which allows for much more rapid programming of the subtractive machine toolpaths as well as much shorter machining time.

In some implementations, the 2.5-axis subtractive manufacturing process is used to manufacture a physical structure directly, where the 3D model can be a model of the object to be manufactured. In some implementations, the 2.5-axis subtractive manufacturing process is used to manufacture a mold for a physical structure, where the three dimensional model can be a model of the mold. For example, the 3D model 206 in FIG. 2A can be a model of a mold for manufacturing a physical structure, where the mold is going to be manufactured using a 2.5-axis subtractive manufacturing process.

In some implementations, the manufacturability constraint in the generative design process can include (i) a number of the discrete height layers, and (ii) two or more available milling directions for the 2.5-axis subtractive manufacturing process. The number of discrete height layers can be determined by user input or by automatic detection. The two or more milling directions can be determined by user input or by automatic detection. In some implementations, the two or more milling directions can optionally include at least one off-axis milling direction.

FIGS. 3A-3C show three examples of design with different milling directions in a 2.5-axis subtractive manufacturing process. Milling direction is the direction in which the milling tool 202 moves towards the milling stock. Milling direction can also be called "setup orientation". It is typical for 2.5-axis parts to limit the number of milling directions used to simplify 2.5-axis subtractive manufacturing. FIG. 3A shows a graphical representation of an example of a design outcome with a single milling direction (+Z). FIG. 3A shows both a perspective view 310 and a perspective cutaway view 312 of the same 3D model to be manufactured. A single milling direction (+Z) can produce a region 314 in the middle of the stock. FIG. 3B shows a graphical representation of an example of a design outcome with two opposing milling directions (−Z, +Z). FIG. 3B shows both a perspective view 320 and a perspective cutaway view 322 of the same 3D model to be manufactured. Milling direction +Z can produce a region 324 and an opposite milling direction −Z can produce a region 326 in the stock. FIG. 3C shows a graphical representation of an example of a design outcome with three milling directions (−Z, +Z, +Y). FIG. 3B shows both a perspective view 330 and a perspective cutaway view 332 of the same 3D model to be manufactured. Milling direction +Z can produce a region 334 and an opposite milling direction −Z can produce a region 336 in the stock. Additionally, milling direction +Y can produce a region 338 in the stock. Milling direction is an important design constraint and design criterion when setting up a generative design process.

Milling direction(s) can be specified in a number of different ways. In some implementations, milling direction(s) can be manually specified by a user through the user interface. The user can define a given number of orientations by defining a three dimensional vector indicating the desired milling direction(s). In some implementations, milling direction(s) can be detected from user supplied preserve geometry. Preserve geometry provided by a user can be added to the optimized geometry and can be interfaces that connect to other components in an assembly. Given a set of user provided preserve geometry, milling directions can be automatically extracted to infer user design intent. Geometric feature detection can be performed to extract three dimensional vector(s) from features that would require a given milling direction. For example, in the case of a hollow cylinder feature used to represent a bolt hole interface, a vector along the axis of the cylinder can be extracted for use as a milling direction. This approach can potentially reduce the number of milling directions required by leveraging the existing required milling directions defined by preserve geometry. In some implementations, milling direction(s) can be determined based on an optimization. In this approach, a topology optimization is followed by a clustering algorithm that can find the minimum number of milling directions for a set of performance criteria.

Figures 3D, 3E, 3F:
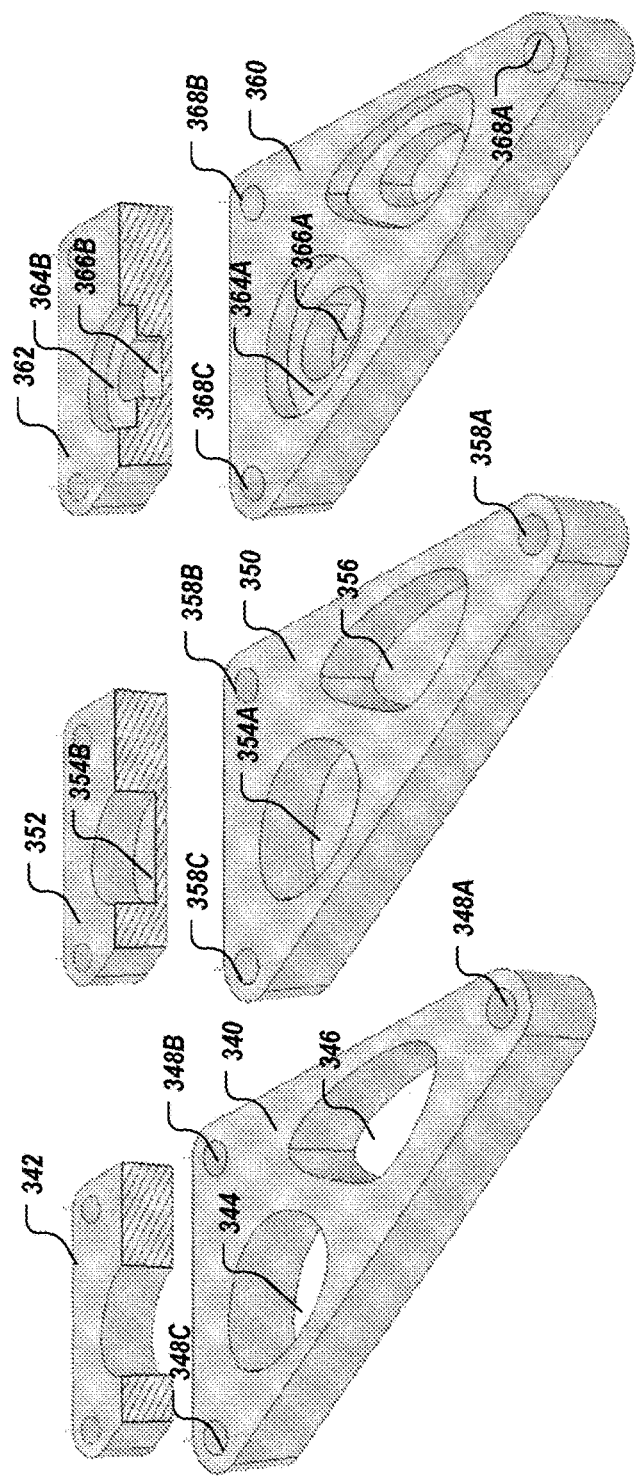
FIG. 3D shows a graphical representation of an example of a design with a single height level.
FIG. 3E shows a graphical representation of an example of a design with two height levels.
FIG. 3F shows a graphical representation of an example of a design with three height levels.

FIGS. 3D-3F show three examples of design with different number of height levels in a 2.5-axis subtractive manufacturing process. A height level is a discrete step taken along the milling direction where material is removed to align with a set number of levels. Larger numbers of height levels can enable more complex geometry to be defined, but may affect manufacturing time. FIG. 3D shows a graphical representation of an example of a design outcome with a single height level. FIG. 3D shows both a perspective view 340 and a perspective cutaway view 342 of the same 3D model to be manufactured. A single height level can produce regions 344, 346, and 3 holes 348A, 348B, and 348C in the stock. The SM machine can cut through the stock with this single height level. FIG. 3E shows a graphical representation of an example of a design outcome with two height levels. FIG. 3E shows both a perspective view 350 and a perspective cutaway view 352 of the same 3D model to be manufactured. A first height level can produce both region 354A and region 356 in the stock shown in the perspective view 350. The first height level can be seen more clearly in the perspective cutaway view 352 which shows a region 354B that is the same as the region 354A. A second height level can produce regions 358A, 358B, and 358C, where the SM machine can cut through the stock with the second height level. FIG. 3F shows a graphical representation of an example of a design outcome with three height levels. FIG. 3F shows both a perspective view 360 and a perspective cutaway view 362 of the same 3D model to be manufactured. A first height level can produce a region 364A and a second height level can produce a region 366A. In the perspective cutaway view 362, a region 364B (same as the region 364A) and a region 366B (same as the region 366A) show the two height levels. Similar to FIG. 3E, a third height level is needed to produce the regions 368A, 368B, and 368C in the stock. Height level is an important design constraint and design criterion when setting up a generative design process.

Figure 3G:
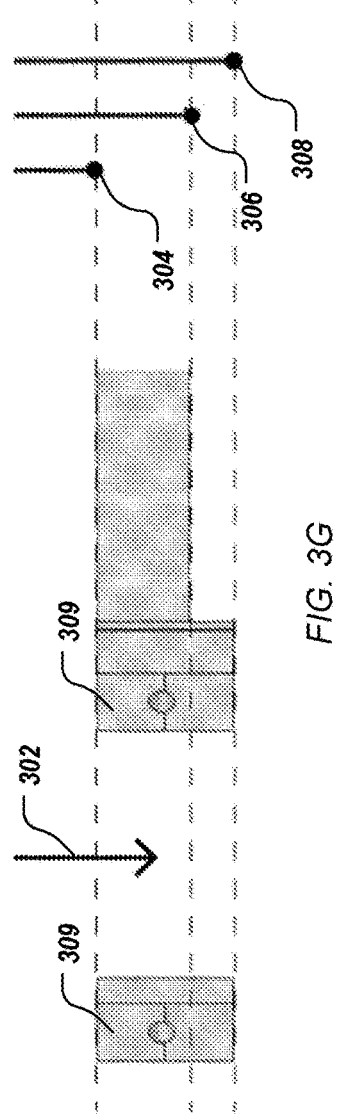
FIG. 3G shows a graphical representation of an example of a design with three height levels that can be automatically extracted from preserve geometry surfaces perpendicular to the milling direction.

Height levels can be specified in several different ways. In some implementations, height level(s) can be manually specified by a user with a user interface. A user can specify a set number of height levels, or specify a ratio to derive the location and number of height levels, or explicitly set the number and location of the height levels either via a user interface or programmatically. In some implementations, height level(s) can be automatically detected from user supplied preserve geometry. For each given milling direction, height levels can be extracted from the height of preserve geometry surfaces that are perpendicular to the milling direction. FIG. 3G shows an example of a set of height levels derived from user supplied preserve geometry. In this example, three height levels 304, 306 and 308 are extracted from surfaces perpendicular to the milling direction 302 at the top, middle, and bottom of the preserve geometry 309. In some implementations, height level(s) can be automatically obtained based on an optimization. In this approach, a topology optimization is followed by a clustering algorithm to find an appropriate number and location of height levels for a set of performance criteria.

For example, if the desired set of height layers G for a particular milling direction are not known a priori, an automatic detection algorithm can include that the elements of G are determined by a weighted k-means approach. The set of surface points which satisfy −n(x)·m>0 are used in this clustering, where m is the milling direction and n(x) refer to an outward-pointing unit normal vector field of the level set of ϕ containing part x. The heights of these surface points from the near plane are clustered together and the clusters are updated dynamically every n iterations. Because the 2.5-axis constraint is not strongly enforced early in the optimization, this allows the surface of Ω to roughly form the surface's final shape allowing useful height layers to be clustered by the time the constraint is strongly enforced.

Figure 4:
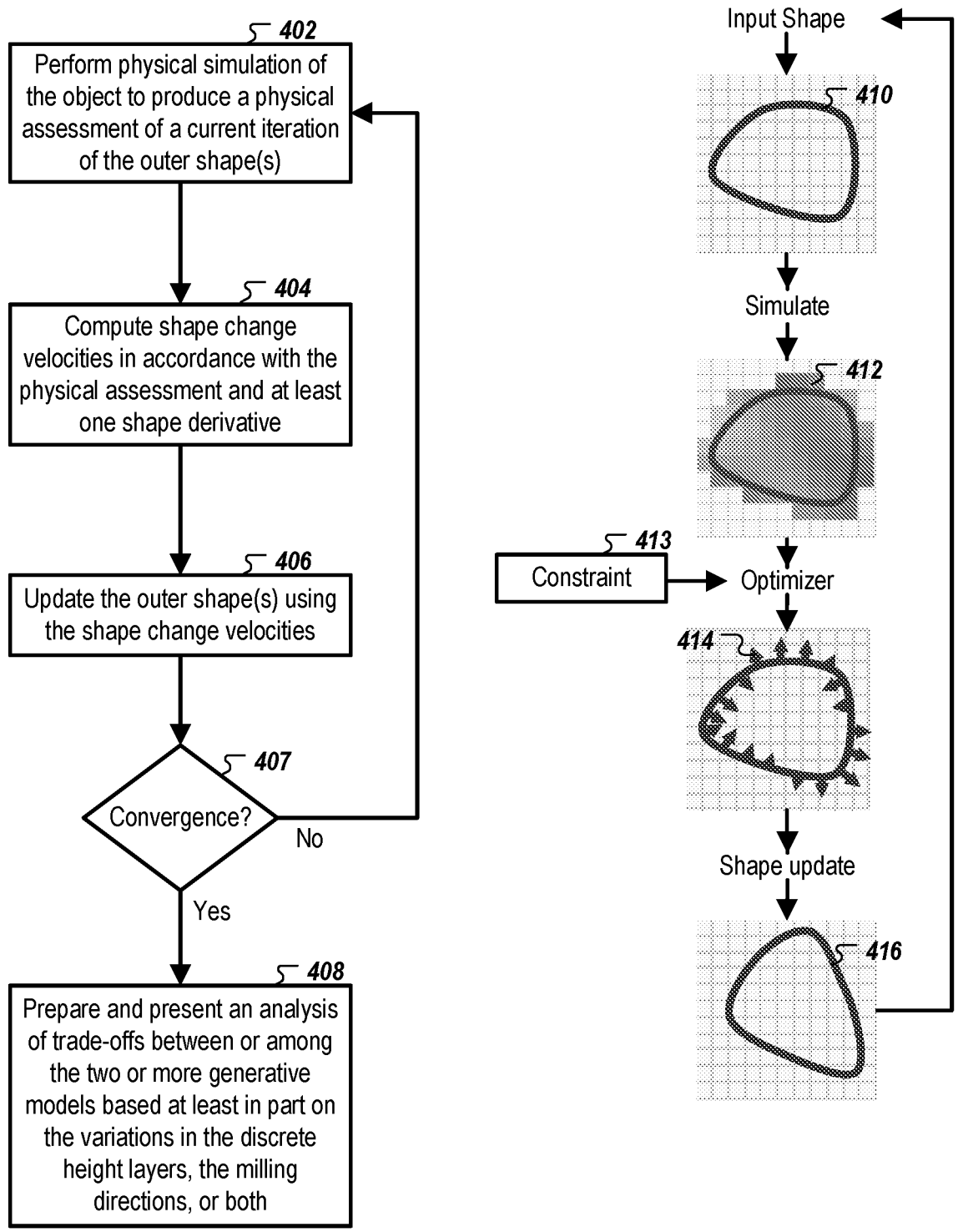
FIG. 4 shows an example of a process that iteratively optimizes a topology using formal constraints for one or more portions of a 3D model of an object being generatively designed for 2.5-axis subtractive manufacturing.

FIG. 4 shows an example of a process (e.g., as performed by the CAD program(s) 116 of FIG. 1A) that generates one or more portions of a 3D model of an object to be manufactured with 2.5-axis subtractive manufacturing, where the process includes iteratively optimizing a topology using formal constraint(s). This 2.5-axis shape optimization can enforce discrete height layers by a shape derivative method that can both enforce vertical walls (parallel to the milling direction) and discrete height layers. The advantage of the shape derivative method is that it is not applied as a filter on the velocity during advection, but the shape derivative defines the velocity required to satisfy the constraint. The shape derivative can be applied to a shape during level set based topology optimization. The constraint once met can help to ensure that the resulting geometry can be manufactured by a 2.5-axis milling process from a given set of milling directions.

The generative design process to be used employs a level-set method for topology optimization. Design criteria, design space and/or other design variables are previously obtained, e.g., by the CAD program(s) 116. This can involve receiving user input, e.g., via UI 122 on display device 120, importing information from another program or a third party source, and/or one or more of these inputs can be predefined in a given implementation.

An input shape is obtained as an initial 3D model or one or more portions of an initial 3D model to be used as a starting geometry. For example, the input shape 410 is a two-dimensional (2D) representation of an example of a starting geometry. Physical simulation of the object is performed 402, to produce a physical assessment of a current iteration of the outer shape(s). The physical assessment is produced with respect to design objective(s) and design constraint(s), which include 2.5-axis manufacturability constraint(s). Various types of physical simulations can be used, and thus various types of physical assessments can be produced. In some implementations, performing 402 the physical simulation involves performing finite element analysis simulation using a body-fitted mesh based solver, and the constitutive model is changed by mapping geometric field data and finite element simulation data between voxel grid points of the level-set representation of the generative model and elements of a solid mesh model used by the finite element analysis simulation. In some implementations, a solid mesh based simulation can be non-body fitted, e.g., solved using voxel solvers. For example, after physical simulation, physical assessment 412 of the input shape 410 is produced.

Shape change velocities are computed 404, in accordance with the physical assessment and at least one shape derivative. Shape change velocities are computed in consideration of effects of different objectives and constraints. In some implementations, computing 404 the shape change velocities involves using an augmented Lagrangian method to compute advection velocities, such as when multiple shape derivatives are present. For example, in accordance with one or more formal constraint(s) 413 and physical assessment 412, the optimizer can compute shape change velocities 414 for the outer shape(s) of a current input geometry 410.

Note that there can be several constraints on the shape of a generatively designed part so that the part can be produced by a 2.5-axis milling technique. FIG. 6B shows a graphical representation of an example of shape constraints for 2.5-axis subtractive manufacturing. The milling process involves moving the end mill in discrete increments along the milling direction. Therefore, the surface of the part should be divided up into a series of height layers, with "walls" perpendicular to the height layers connecting each layer. As shown in FIG. 6B, a 2.5-axis model has milling direction m and discrete height layers labeled as $g_0$, $g_1$, $g_2$ and $g_3$. These layers may include concave regions that are known as "pockets". For example, FIG. 6B shows two concave regions 606 and 608 in the part. The shape and size of these concave regions are related to the shape of the tool itself.

Figure 6A:
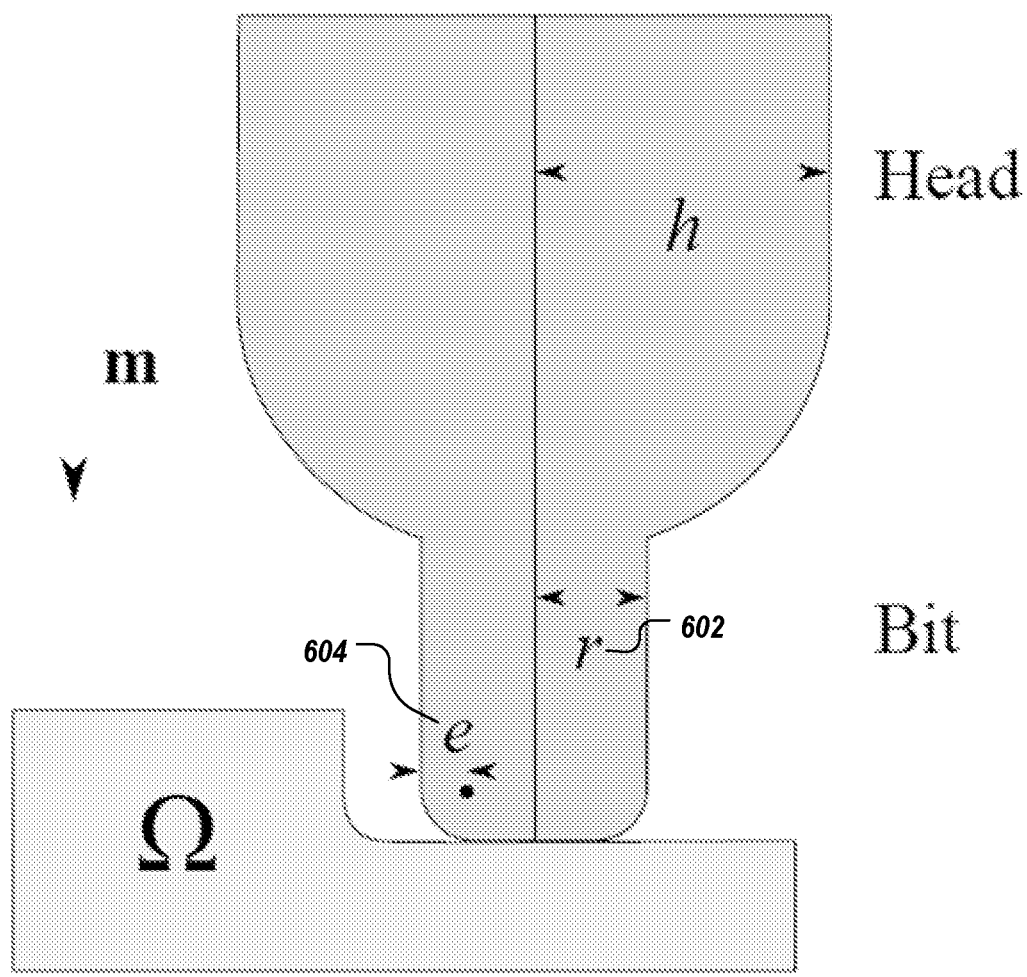
FIG. 6A shows a graphical representation of an example of a milling head geometry definition.
Figure 6B:
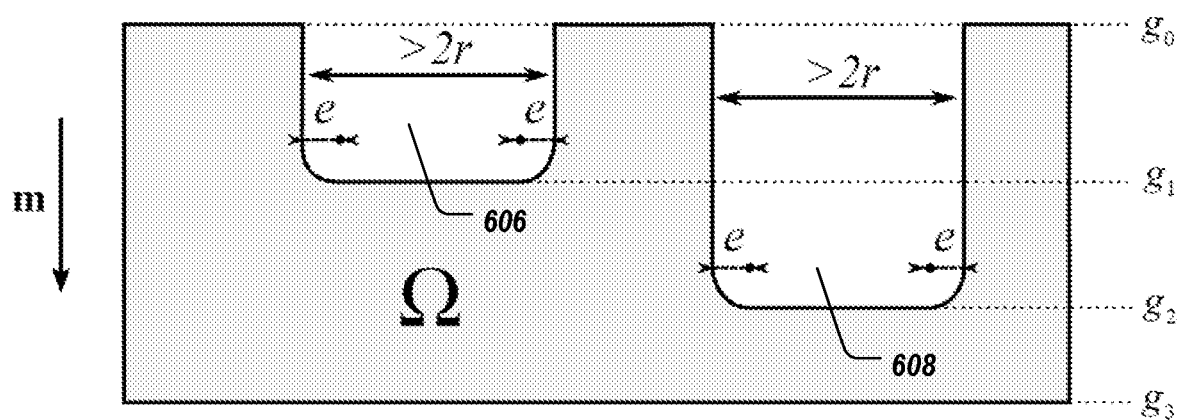
FIG. 6B shows a graphical representation of an example of a shape constraints for 2.5-axis subtractive manufacturing.

FIG. 6A shows a graphical representation of an example of a milling head geometry definition. An end mill (i.e., tool bit) is defined using the following parameters: corner radius e 604, and bit radius r 602. Bit length defines the shape of the tool bit known as "bull-nose" represented by a round cylinder oriented in the milling direction m. The head radius h defines another cylinder capped with a hemisphere that represents the tool holder and head. It is assumed that the end of the head cylinder extends far away from the surface.

Returning back to FIG. 6B, the shape of the tool itself as defined in FIG. 6A can affect the output shape of the part because the concave regions (i.e., "pockets") must be accessible to the tool. In other words, the tool should be able to contact every part of the surface without an intersection between the tool and Ω. This also means that internal corners of the part should have a radius equal to the tool corner radius e 604. For example, in FIG. 6B, the side walls of the concave region 606 are parallel to milling direction m with an internal radius e 604. The pocket sizes are wider than twice the tool radius r 602.

A detailed example of formal constraints in the iterative topology optimization process is now described. As discussed above, formal constrains can include (1) height layer shape derivative constraints for 2.5-axis manufacturability, (2) tool head and/or tool bit accessibility constraints, and (3) multiple milling directions.

A penalty term is defined to penalize part shapes that do not conform to the 2.5-axis constraints. Given a set of discrete height layers G, a penalty function for each point on the surface is formed as a product of exponentials. This results in a penalty of zero when x lies on a height layer $g_j \in G$ and a penalty of up to 1 when far from any $g_j$:

$$E(x,m) = \Pi_j (1 - e^{-\gamma(x \cdot m - g_j)^2}), \quad (4)$$

where γ defines how tight the fall-off of the exponential is. γ is defined as follows:

$$\gamma = 100 N_g \sqrt{\frac{1}{t_1 - t_0}}, \quad (5)$$

where $t_0$ and $t_1$ are the starting and ending extents of level set $\Omega$ in the milling direction m.

The next term of the penalty function ensures that surface points whose normal is perpendicular to m are not penalized:

$$f(x,m)^2 = (n(x) \cdot m)^2, \quad (6)$$

and taking the square of this so that sign does not impact the penalty. The final penalty function is formed as the product of (4) and (6), integrated over the surface:

$$j(x,m) = f(x,m)^2 E(x,m),$$

$$J(\partial\Omega) = f_{\partial\Omega} j(x,m) dj. \quad (7)$$

This penalty function (7) has a lower bound of 0 and an upper bound of 1 and thus no further normalization is required. This penalty function can be used in the Augmented Lagrangian framework for enforcing the equality constraint $S(\partial\Omega)=0$ as part of a structural topology optimization problem. In order to be applied during shape update, the shape gradient $D_\Omega J$ of the penalty function is computed, by:

$$D_\Omega J = div^{\|}(2fm^{\|}) - f^2 H, \quad (8)$$

$$D_\Omega J = div^{\|}(2fEm^{\|}) + f^2\left(\frac{\partial E}{\partial n} - EH\right), \quad (9)$$

where $div^{\|}$ and $m^{\|}$ are the divergence and component of the milling direction parallel to the surface, and H is the mean curvature. A regularization term of the form $-vH$ can be further added, which amounts to additionally penalizing a small multiple v of the surface area of the part (e.g., v=0.02).

In order to take into account the accessibility of the surface from the milling direction, $D_\Omega J - vH$ can be further multiplied by a mask term $A(x,m)$ that hides surface points that are not accessible from the milling direction. One type of accessibility constraint is line of sight from x to the bounding box in the direction of $-m$. The minimum value of $\phi$ along the uni-directional ray is measured. $A(x,m):=1$ is set when $\emptyset_{min}^+(x) > -\in_f$ and $A(x,m):=0$ elsewhere. A slightly different version of $\emptyset_{min}$ function is introduced that takes into account the uni-directionality of the ray:

$$\emptyset_{min}^+(x) = \min_{t>0}(x + tm). \quad (10)$$

In order to account for interference with the head, a second ray intersection test can be executed using an offset surface $\Omega^+$ by the head radius h and $A(x,m):=1$ only when no intersection is detected. In order to handle the accessibility of the tool itself, two morphological operations are applied at the end of each shape update step. The first morphological operation can ensure that cavities narrower than tool radius r are eliminated. A velocity field $v_r(x)$ is created as follows:

$$v_r(x) = r[n(x) - m(n(x) \cdot m)], \quad (11)$$

and then Hamilton-Jacobi transport is used to advect the surface of $\Omega$ along $v_r(x)$. Then the level set of $\Omega$, $\phi$ is reinitialized to be a signed distance field. Finally, $-v_r(x)$ is used to restore the surface except where cavities have been filled in. The second morphological operator is similar to the first except the velocity field is chosen to be normal to the surface as follows:

$$v_e(x) = en(x). \quad (12)$$

The effect of this morphological operator is to create the corner fillets in internal cavities as the tool corner radius e in FIG. 6B.

An example of an algorithm is formulated for combing 2.5-axis constraints from multiple milling directions. In this example, the penalty becomes the product of the penalties from the set of milling directions $M_A$ where $A(x,m)=1$.

$$j(x) = \Pi_{i \in M_A} j(x,m_i), \quad (13)$$

and the shape derivative becomes:

$$D_\Omega J_M = \sum_i^{M_A} \left[\left(\prod_{k \neq i}^{M_A} j_k\right)\left(div^{\|}(2f_i E_i m_i^{\|}) + \frac{\partial j_i}{\partial n}\right)\right] - H\left(\prod_i^{M_A} j_i + v\right). \quad (14)$$

$$D_\Omega J_M = \sum_i^{M_A} \left[\left(\prod_{k \neq i}^{M_A} j_k\right) D_\Omega J_i\right] - H\left(\prod_i^{M_A} j_i + v\right). \quad (15)$$

$$\frac{\partial j_i}{\partial n} = f^2\left(\frac{\partial E}{\partial n} - EH\right). \quad (16)$$

If desired, a primary milling direction can be specified such that the height layer penalization only occurs on directions other than the primary milling direction when the surface is not accessible from the primary direction. This can prevent excessive layering when multiple directions are enforced.

Returning to FIG. 4, the outer shape(s) are updated 406 using the shape change velocities. The level-set representation for the object is updated 406 using the shape change velocities before the next iteration. For example, an updated shape 416 is generated according to shape change velocities 414. In some implementations, the updating 406 can use the advection velocities from the augmented Lagrangian method (ALM).

A check 407 is made for convergence. In some implementations, if the update of the outer shape(s) is smaller than a threshold, it can be determined that the iterative topology optimization process has converged. In some implementations, convergence occurs when the shape update has reached the limit of precision supported by the computer or the CAD program. In some implementations, the topology optimization converges when a fixed number of iterations has been performed. The physical simulation 402, the computation 404 of the shape change velocities, the update 406 of the outer shape(s) and the check 407 for convergence then iterates until convergence.

Figure 5:
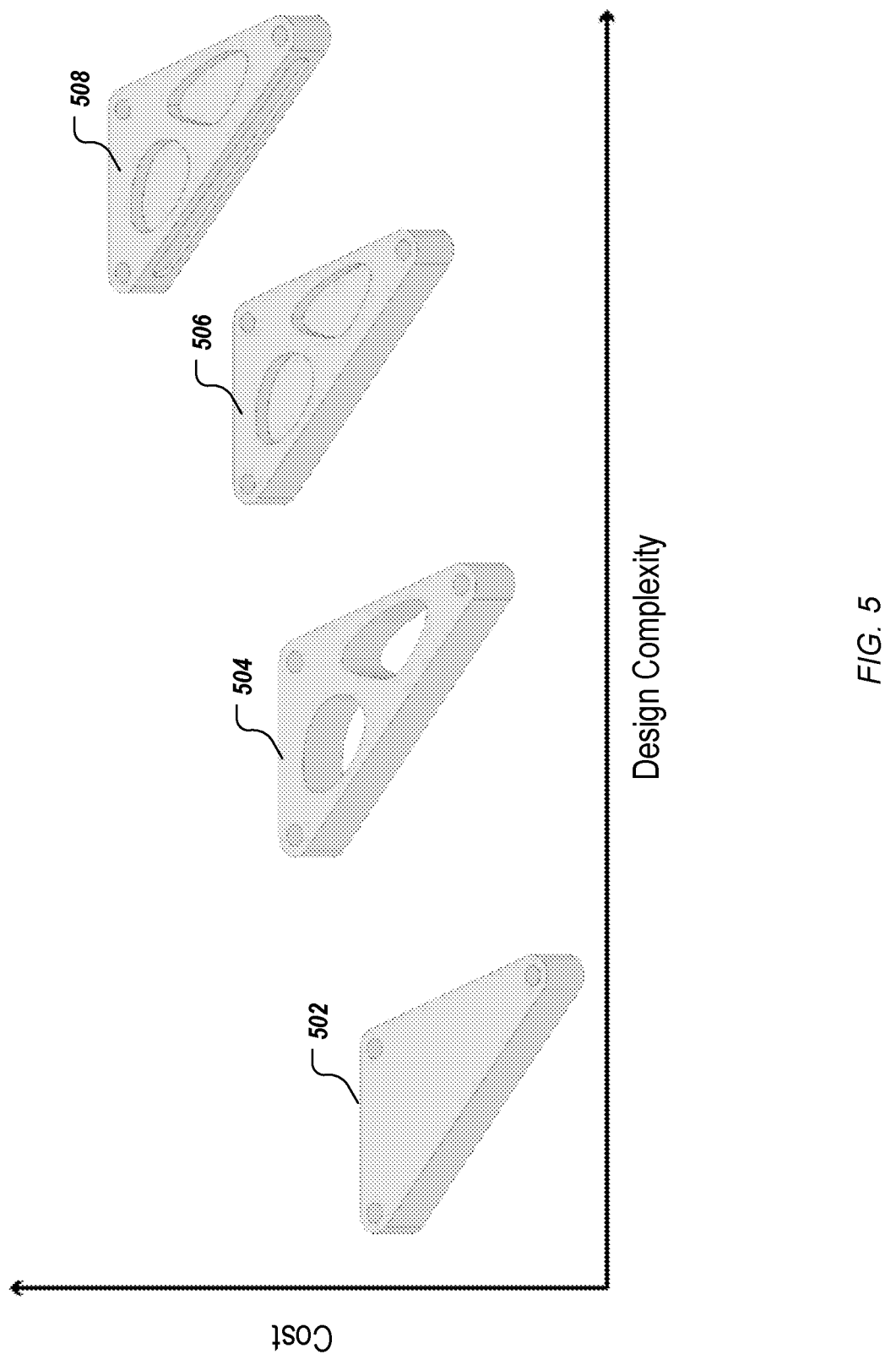
FIG. 5 shows a graphical representation of an example of a result of trade-off analysis.

In some implementations, after convergence, an analysis of trade-off between or among two or more generative design 3D models is prepared and presented 408. The analysis of trade-offs is based at least in part on the variations in the discrete height layers, the milling directions, or both. The analysis of trade-offs can be presented to a user 160 in UI 122. FIG. 5 shows a graphical representation of an example of a result of trade-off analysis. Four generative design 3D models 502, 504, 506, 508 are presented. Design variations between the four models are visualized to compare cost and performance. In the example shown, the X axis of the trade-off analysis is design complexity, and the Y axis of the trade-off analysis is cost. Other axes and/or comparison metrics can be used.

Providing a variety of design variants can be a key tenant of generative design. The trade-off analysis of design variations enables a sufficient number of design variations for the user to perform further analysis between the designs. Milling direction and height level parameters are used to increase potential for design variations. For each parameter, the user is able to specify either a single value, a range of values, or an automatic approach. Based on these parameters, multiple designs can be synthesized that cover a range of different performance, cost, and manufacturing outcomes.

In some implementations, for each 2.5-axis generative design job, three design variations are created as follows, supposing the user specifies "X" as the tool direction:
+X setup with 3 layers,
−X setup with 3 layers,
+X and −X setups with 5 layers.
This design process can create a number of design variations while requiring minimal input from the user. The designs provide one cost/performance trade-off analysis (e.g., single setup vs. two setups) that the user can evaluate. This design process creates different variants with the explicit goal of increasing the trade-off space. In some implementations, a special case of just one layer is provided as "2-axis cutting", in which the only option for tool direction is the direction (x, y, z). For example, exploration options can be:
2.5-axis with 2 layers,
2.5-axis with 3 layers,
2.5-axis with 5 layers,
2-axis cutting.

In addition to design variants, e.g., milling direction and height level parameters, other parameters can include direction x, y, and z, tool diameter, tool length, and other parameters, etc., which can change very often. Usually, a given set up can be used to get solution for generative design for: 3-axis milling machines, 5-axis milling machines, unrestricted, additive or die casting. Another design variant or parameter is material. For example, the same set-up can be used to design generative models for different materials, such as, aluminum or copper. With the consideration of various kinds of possible design variants, including milling direction, height level, tool diameter, tool length, and materials, etc., a single set-up can generate a very large number of design outcomes and possibly the corresponding tradeoff analysis.

Fixturing is an aspect of manufacturing cost, and the generative design process can seek to minimize the number of fixturing steps during manufacturing. For example, in order to manufacture a part by 2.5-axis subtractive manufacturing, the part needs to be held fixed to the table of the machining tool. Working with geometries which are easy to fix to the table greatly simplifies the machining process and the machining cost. Creating parts with a flat base, like the design shown in FIG. 6B, makes the task of clamping the part relatively straightforward. During generative design process, an initial shape may have large inaccessible regions. Therefore, an initialization procedure can be performed to automatically fill in these regions, creating a design with a flat base. This initialization can be called as "access fix". The access fix can also be done once at the end of the process of FIG. 4, or within each iteration of the process of FIG. 8. This access fix procedure can remove the burden from the shape update routine. The access fix takes as input a given shape $\Omega$, a bounding box and the set of milling directions M. For each milling direction $m_i$, a new volume $\Omega_i$ is computed by filling in any inaccessible volume from that milling direction. Then the initialization volume is generated by Boolean intersection of all of these volumes: $\Omega_* = \cap_i^M \Omega_i$. Afterwards, the signed distance field $\phi$ is initialized using $\Omega_*$.

Figures 7A, 7B:
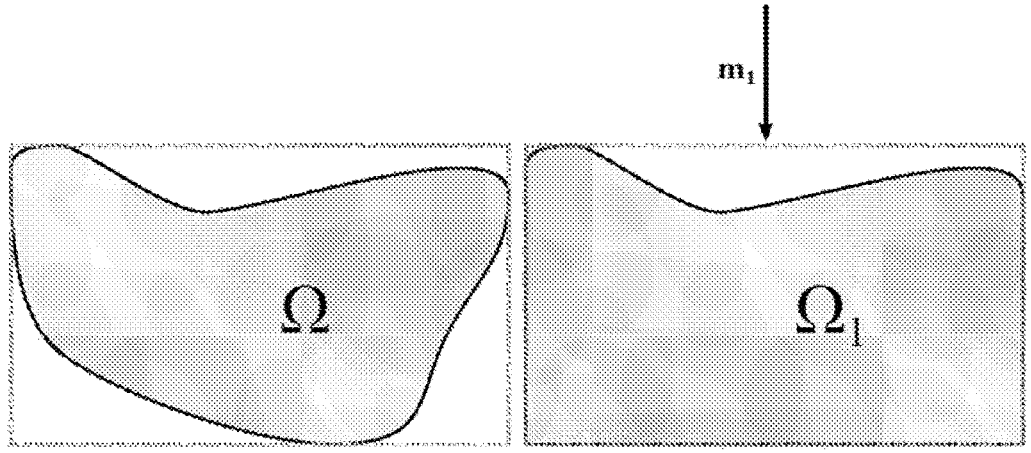
FIGS. 7A, 7B, 7C, 7D show a graphical representation of an example of a shape initialization process for 2.5-axis subtractive manufacturing with two milling directions.
Figures 7C, 7D:
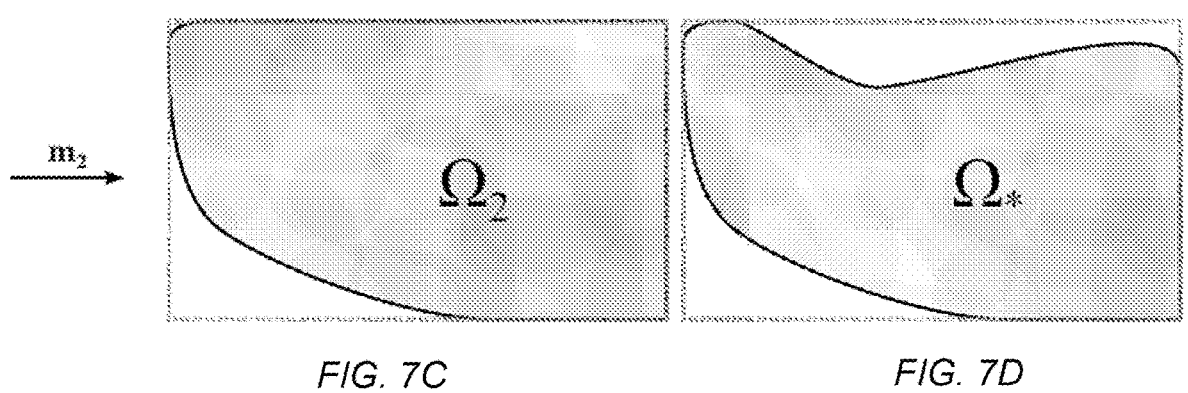

For example, FIGS. 7A-7D show a graphical representation of an example of a shape initialization process for 2.5-axis subtractive manufacturing with two milling directions. In FIG. 7A, the initialization takes as input a given shape $\Omega$, a bounding box and the set of milling directions $m_1$ and $m_2$. In FIG. 7B, a new volume $\Omega_1$ is computed by filling in inaccessible volume for milling direction $m_1$. In FIG. 7C, a new volume $\Omega_2$ is computed by filling in inaccessible volume for milling direction $m_2$. In FIG. 7D, the initialization volume is generation by Boolean intersection of these volumes: $\Omega_* = \Omega_1 \cap \Omega_2$.

In some implementations, an access fix procedure can be performed within the boundary-based generative design process that includes iteratively modifying the one or more outer shapes of the 3D topology for the object. FIG. 8 shows an example of a process that iteratively optimizes a topology using formal constraints and access fix for one or more portions of a 3D model of an object being generatively designed for 2.5-axis subtractive manufacturing.

Physical simulation of the object is performed 802, to produce a physical assessment of a current iteration of the one or more outer shapes of the 3D topology for the object. For example, a result of the physical simulation 818 for a current iteration of input shape 816 is shown in FIG. 8. Shape change velocities are computed 804 for the one or more outer shapes of the 3D topology in the current iteration in accordance with the physical assessment and at least one shape derivative. For example, shape change velocities 820 are computed in consideration of the physical assessment result 818 and constraints 819. The one or more outer shapes are updated 806 using the shape change velocities. For example, an updated shape 822 is obtained after the update based on shape change velocities 820. Note that the operations 802, 804, and 806 in FIG. 8 that correspond to the operations 402, 404 and 406 in FIG. 4 can use the same process, i.e., the same constraints described above in connection with FIG. 4.

The one or more outer shapes are extended 808 to fill bounding volume in each of one or more respective directions inaccessible for the one or more milling directions. This results in one or more sets of one or more extended shapes. For example, an access fix 823 is performed to the updated shape 822 by extending the outer shape of the shape 822. A new shape 824 (e.g., the dark region) is computed by filling in the inaccessible region 825 for milling direction m. In some implementations, (e.g., the example in FIGS. 7A-7D), two or more sets of extended shapes are computed in directions inaccessible for two or more milling directions. The one or more outer shapes are changed 810 to be a Boolean intersection of the two or more sets of extended shapes. The final extended shape after the Boolean intersection (e.g., the example of a shape $\Omega_*$ in FIG. 7D), is used for the next iteration. After access fix, the operations 812 and 814 in FIG. 8 that correspond to the operations 407 and 408 in FIG. 4 can use the same process described above in connection with FIG. 4.

Figure 9:
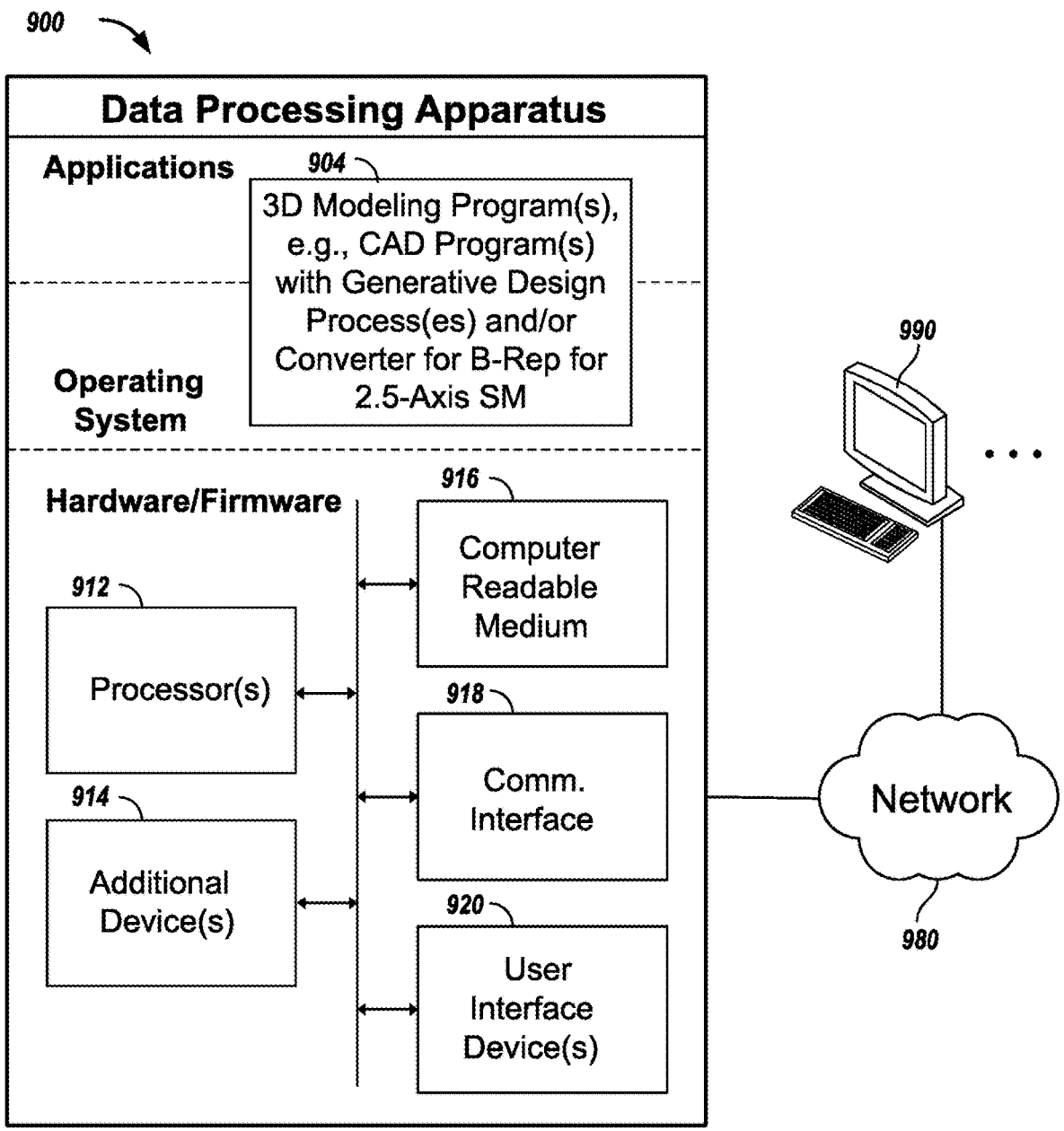
FIG. 9 is a schematic diagram of a data processing system including a data processing apparatus, which can be programmed as a client or as a server.

FIG. 9 is a schematic diagram of a data processing system including a data processing apparatus 900, which can be programmed as a client or as a server. The data processing apparatus 900 is connected with one or more computers 990 through a network 980. While only one computer is shown in FIG. 9 as the data processing apparatus 900, multiple computers can be used. The data processing apparatus 900 includes various software modules, which can be distributed between an applications layer and an operating system. These can include executable and/or interpretable software programs or libraries, including tools and services of one or more 3D modeling programs 904 that implement the systems and techniques described above. Thus, the 3D modeling program(s) 904 can be CAD program(s) 904 and can implement (1) one or more generative design processes (e.g., using level-set based method(s) for generative design) for topology optimization and physical simulation operations (finite element analysis (FEA) or other), and/or (2) conversion of a polygon mesh (e.g., output from a generative design process or from a scanner) and/or generative design data obtained directly from the boundary-based generative design process into a boundary representation model and/or a parametric feature model. Further, the program(s) 904 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 900 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 900. In some implementations, the processor 912 is a single or multi-threaded processor. Each processor 912 is capable of processing instructions stored on the computer readable medium 916 or on a storage device such as one of the additional devices 914. The data processing apparatus 900 uses the communication interface 918 to communicate with one or more computers 990, for example, over the network 980. Examples of user interface devices 920 include a display, a camera, a speaker, a microphone, a tactile feedback device, a keyboard, a mouse, and VR and/or AR equipment. The data processing apparatus 900 can store instructions that implement operations associated with the program(s) described above, for example, on the computer readable medium 916 or one or more additional devices 914, for example, one or more of a hard disk device, an optical disk device, a tape device, and a solid state memory device.

Figure 10:
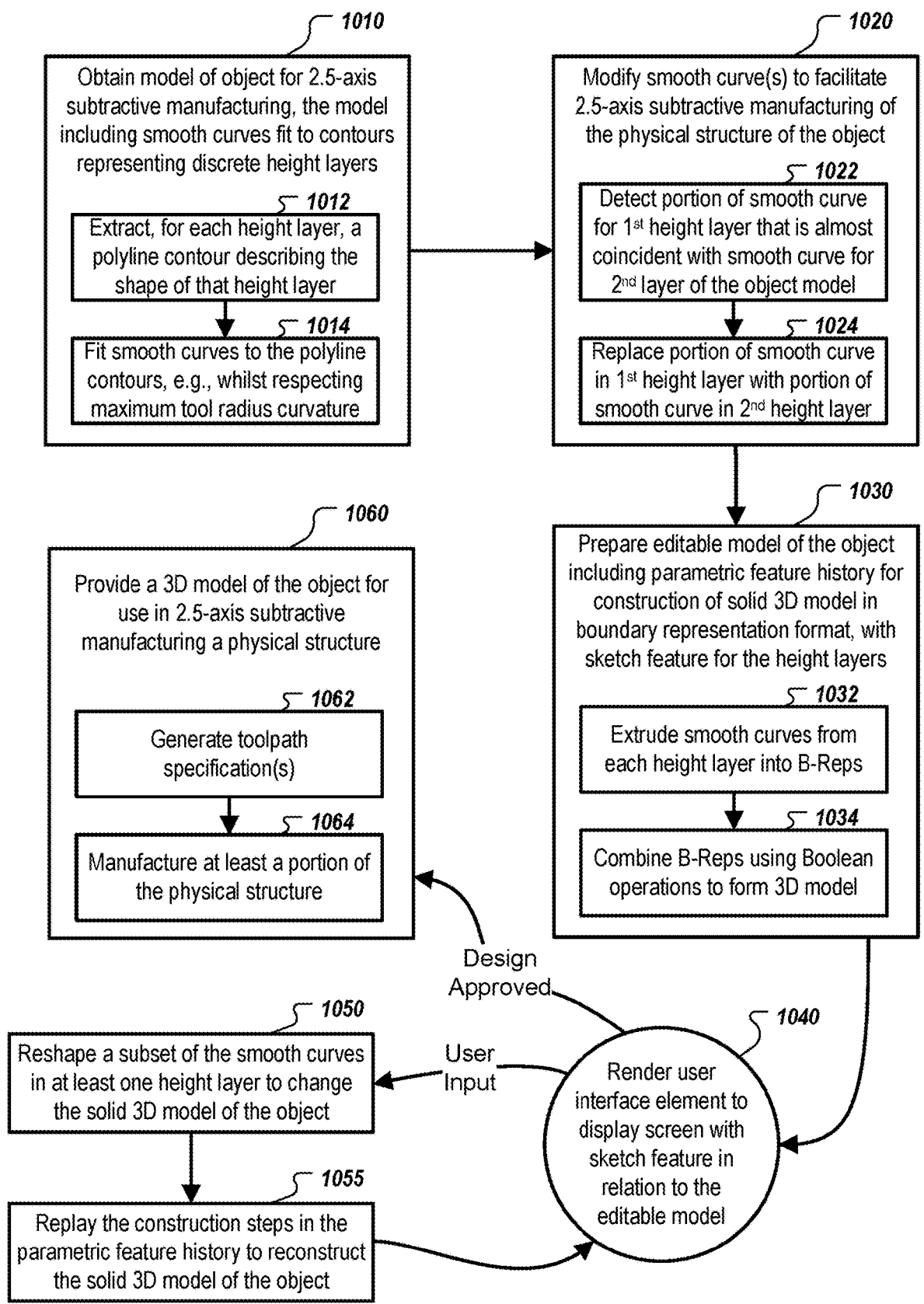
FIG. 10 shows an example of a process to convert received shape data (e.g., mesh geometry) to a watertight boundary representation for an object to be manufactured using a 2.5-axis subtractive manufacturing process.

FIG. 10 shows an example of a process to convert received shape data (e.g., mesh geometry) to a watertight boundary representation for an object to be manufactured using a 2.5-axis subtractive manufacturing process. A first model of the object is obtained 1010, e.g., by program(s) 116, 904, where the first model includes smooth curves fit to contours representing discrete height layers of the object to be manufactured using the 2.5-axis subtractive manufacturing process. The curves are smooth in the computer modelling sense in that each curve is stored in the computer using a precise mathematical definition (e.g., a spline curve) that has derivatives of all orders everywhere in the domain of the function defining the curve. In addition, the first model can include a 3D model, such as one or more modelled solids associated with the smooth curves.

The received shape data can be output data from a generative design process, such as one or more of the generative design processes described above, and the received shape data can be a mesh representation of the object or another representation (e.g., a level-set representation) of the object from the generative design process. In some implementations, the received shape data includes a polygon mesh, which can be a triangle mesh, either originally or by conversion thereto. Various types of mesh formats can be used, including tetrahedral or hexahedral meshes. Further, the one or more modelled solids are in a boundary representation format (e.g., B-Reps) and can be regular geometric shapes that have been fit to a scanned mesh or be modelled solid(s) used as input to a generative design process that employs a volumetric mesh method or a level set method to create a generative design for the object, such as described above.

Thus, the polygon mesh can be the output from one or more generative design processes employing the one or more modelled solids (i.e., preserve bodies) as one or more sub-spaces of an optimization domain of the generative design process. For example, an initial 3D model of the object can be a triangular mesh (or level-set geometry, such as level-set voxel data) produced by a generative design solver, which has been constrained to produce 2.5 axis millable shapes, where this output from the generative design solver needs to be converted into editable B-Rep bodies. This initial 3D model of the object can be processed to extract 1012, for each height layer of the object, a polyline contour describing the shape of that layer. Then, smooth curves can be fit 1014 to the polyline contours, e.g., whilst respecting the maximum curvature allowed by the tool radius, in order to produce the smooth curves of the first model.

The obtaining 1010 can involve receiving or generating the initial 3D model, e.g., any polygonal mesh geometry or level-set geometry which can be sliced by planes to produce closed polyline loops. The obtaining 1010 can also include receiving or determining other information associated the object to be manufactured and thus the first 3D model, such as one or more milling directions for the 2.5-axis subtractive manufacturing process, B-Rep bodies for one or more preserve regions and potentially one or more obstacle regions (sub-spaces to be excluded from the design space or optimization domain of the generative design process), milling height layer positions, and at least one milling tool radius, e.g., a minimum milling tool radius or the radius of the smallest milling tool available when cutting the part to form the object during manufacturing. Note that larger tool(s) are typically used to remove the bulk of the stock material, and smaller tool(s) are typically used to get into the corners that the bigger tools cannot reach. The received milling tool radius information can be provided per layer, but the algorithm can be designed to operate without receiving any milling tool radius information, in which case, a default minimum tool radius (or no minimum tool radius) can be used during the conversion process.

Further, a milling direction is also referred to as an attack direction, as this is the direction in which the milling tool approaches the stock material, namely the vector from the base of the tool to the tip of the tool. The algorithm can be designed to operate without receiving the 2.5D levels in the input shape relative to a selected origin. However, the algorithm should receive the 2.5D extrusion direction in some form, e.g., the 2.5D axis that is biparallel with the normal to each level, or planar region of the input geometry. Thus, in some implementations, the process automatically determines the levels in accordance with the received 2.5D axis information, and then divides the input shape into layers (the material between two adjacent levels) as determined by those levels.

Figure 11A:
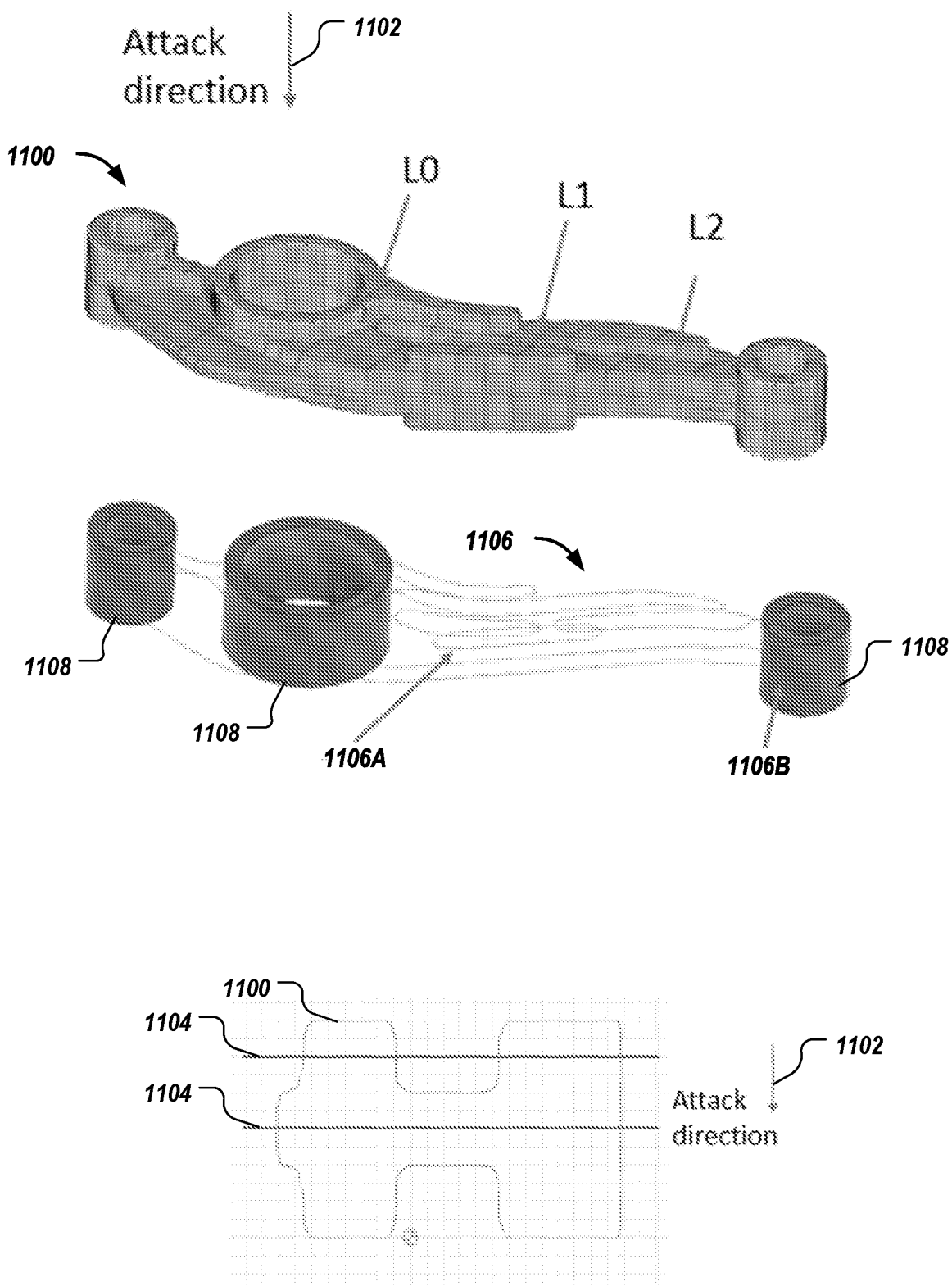
FIG. 11A shows an example of a 3D mesh model from a generative design solver, contours for different height levels of this example of a 3D mesh model, and placement of cross sections to produce the contours.

FIG. 11A shows an example of a 3D mesh model 1100 from a generative design solver, where the 3D mesh model 1100 has height levels L0, L1, L2 that are perpendicular to an attack direction 1102, which is the milling direction for 2.5 axis subtractive manufacturing. In some implementations, the algorithm assumes that all the geometry produced by the generative design solver is 2.5 axis millable from one primary direction or two bi-parallel directions, as shown, and that the preserve bodies are themselves 2.5 axis millable from the same directions. The obstacle regions may be of any shape. In some implementations, the input shape data can be checked to confirm that the input geometry and the preserve and obstacle B-Rep bodies have these characteristics. In some implementations, the algorithm processes any preserve and obstacle B-Rep bodies based on the milling direction(s) for use in ensuring that the input shape data has the correct 2.5 axis millable characteristics after conversion to B-Rep format.

Given such a mesh 1100, to extract 1012 the polyline contours, planar cross sections of the mesh 1100 can be taken to create polyline loops. Standard procedures for reverse engineering meshes to B-Reps can be used, or variations on these standard procedures can be used, as described in this application. Note that due to the rounding of sharp edges that is a natural consequence of the marching cubes algorithm for fitting a mesh to level-set geometry, it can be more reliable to place the cross sections at the midpoint between layers. As shown in FIG. 11A, cross sections 1104 (perpendicular to the attack direction 1102) are placed at the midpoints between layers of the mesh 1100. For example, given a triangular mesh input, the polyline is the union of all intersections of a given infinite plane with the triangular surfaces of the mesh (with special treatment for triangles fully coincident with the plane). By positioning the two cross sectional planes 1104 between the height layers to avoid the rounded regions, the contours 1106 for different height levels of the 3D mesh model 1100 can be improved. Note that the contours 1106 are loops describing the shape of each height layer, and each contour 1106 can have generative contour segments 1106A (or more generally, segments that are separate from any preserve bodies 1108) and keep-in contour segments 1106B, which are adjacent the preserve bodies 1108.

This is but one method for extracting 1012 contours from received shape data, which can potentially introduce shape errors into the final B-Rep conversion due to the fact that the mesh is a noisy approximation to the raw level-set voxel data that the generative solver natively works with, or in the case of a scanned mesh, the mesh can be a noisy approximation of the scanned physical object. Various processing operations can be employed to help avoid introducing shape errors when working with a mesh, such as described in further detail below. Off-axis features such as side-holes can make the cross-sectional extraction method on the mesh inadequate, as side-holes can cause the contours to move into undercut regions or be topologically split into multiple loops. To deal with these off-axis features, such features can be eliminated from the model before extracting the contours. This is challenging to do on the surface triangle mesh, but much more straightforward to do on a level-set voxel representation.

Thus, in some implementations, the mesh itself is not used to extract 1012 the contours 1106. In some implementations, the algorithm selects a technique for extracting 1012 polylines representing planar slices of the input geometry based on the type of input geometry. In some implementations, the contours are extracted 1012 from level-set data, where the level-set input is defined by a set of values on a 3D voxel grid, where each value represents the distance to the implicit level-set surface. A polyline approximation of the planar slice of the level set geometry can be created, where the planes are orthogonal to the milling direction 1102. Thus, each such plane defines a slice of the 3D level-set, and even in cases where the plane is not aligned with the voxel grid, the level-set distance field can be resampled to produce 2D level-set grids for each slicing plane.

The shape data can be a level-set distance field output by a generative design process that employs a level-set based topology optimization method, and processing the shape data to produce polylines matching the contours representing the discrete height layers of the object can include resampling the level-set distance field to produce a two dimensional (2D) level-set grid at a slice plane corresponding to a current one of the discrete height layers, and extracting a current layer polyline from the 2D level-set grid, where the current layer polyline matches a current layer contour of the object at the slice plane. Input level-set voxel data, with the voxel grid in an arbitrary orientation with respect to the slicing plane, can be processed to create a polyline approximation of the planar slice of the level-set geometry, as described in detail below. Each such plane defines a slice of the 3D level-set, and even in cases where the plane is not aligned with the voxel grid, the level-set distance field may be resampled to produce 2D level-set grids for each slicing plane.

Figure 11B:
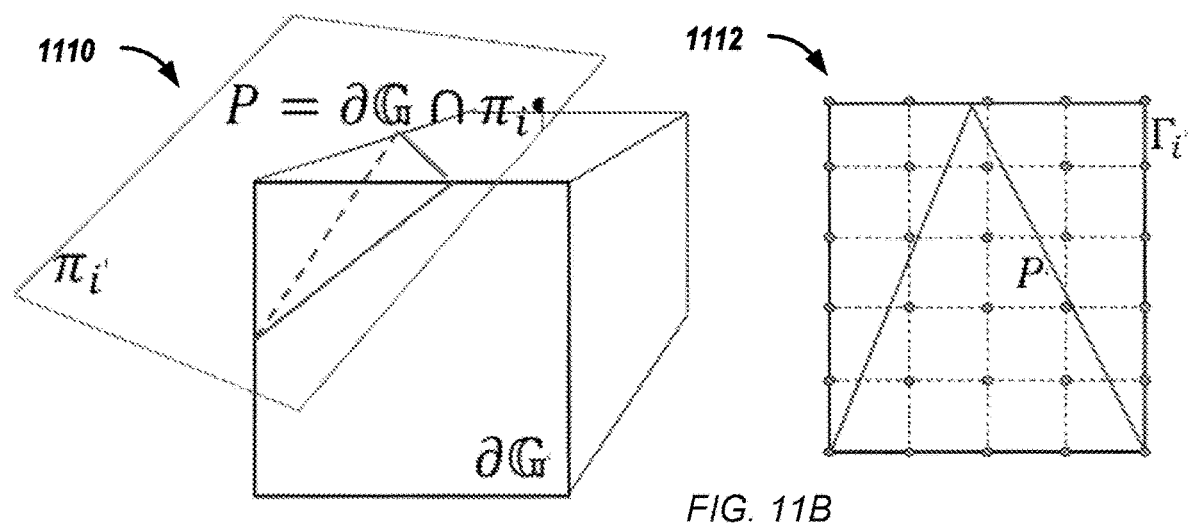
FIG. 11B shows an example of resampling a level-set representation of an object to produce a polyline matching a current layer contour of the object at a slice plane, which is perpendicular to a milling direction to be used in the 2.5-axis subtractive manufacturing process, but is not necessarily aligned with the level set 3D coordinate system.

FIG. 11B shows an example of resampling a level-set representation of an object to produce a polyline matching a current layer contour of the object at a slice plane, which is perpendicular to a milling direction to be used in the 2.5-axis subtractive manufacturing process; the milling direction is not necessarily aligned with the level set 3D coordinate system. A first graphical representation 1110 shows the intersection triangle P between a general step level plane $\pi_i$ and the grid axis-aligned bonding box $\partial \mathbb{G}$. A second graphical representation 1112 shows the 2D level set grid $\Gamma_i$ covering the minimum area bonding rectangle of P. The dots in graphic 1112 represent the grid voxels $\gamma_{st}$. Given is a level set represented by values $\{d_{ijk} \in \mathbb{R}\}$ assigned to the vertices of a uniform, axis-aligned grid $\mathbb{G} \subset \mathbb{R}^3$. Since we can rescale $\mathbb{G}$ with an independent scale factor along each coordinate axis (x, y, z) of the chosen coordinate system in $\mathbb{R}^3$, we can assume, without limitations of generality, that $\mathbb{G}$ is an integer grid. That is, each cell $G_i \subset \mathbb{G}$ is defined as:

$$G_{ijk} = \left\{ p \left| \begin{array}{l} p \in \mathbb{R}^3, (i, j, i) \in \mathbb{Z}^3 \\ i \leq p_x \leq i+1 \\ j \leq p_y \leq j+1 \\ k \leq p_z \leq k+1 \end{array} \right. \right\}.$$

Let $g_0 = (i_0, j_0, k_0) \in \mathbb{Z}^3$ and $g_N = g_0 + N, N \in \mathbb{N}^3$ are correspondingly the min and max points grid points (voxels) of $\mathbb{G}$, i.e., we have:

$$\mathbb{G} = \bigcup G_i = \left\{ p \left| \begin{array}{l} p \in \mathbb{R}^3 \\ i_0 \leq p_x \leq i_N \\ j_0 \leq p_y \leq j_N \\ k_0 \leq p_z \leq k_N \end{array} \right. \right\}.$$

Further, to describe the CNC machine subtraction operation along an axis, let us assume we are given a unit ray $r=(q, \vec{v})$ a where $q \in \mathbb{R}^3$, $q \notin \mathbb{G}^\circ$ is a source point and $\vec{v} \in \mathbb{R}^3$ is an arbitrary milling direction of unit length, not necessarily aligned with the coordinate system. Finally, we assume we are given a set of layer levels $\mathbb{L} =\{l_0, l_1, \ldots l_{M-1}\}$, M≥2, $l_i \in \mathbb{R}$, $l_0 \geq 0$, $l_i < l_{i+1}$ representing "height layers" in the subtraction operation of the CNC machine.

Let $D_r(p)=(p-q)\cdot \vec{v}, p \in \mathbb{R}^3$. $T_i = \{_p | l_i \leq D_r(p) \leq l_{i+1}\}$ be the volume corresponding to each subtractive layer step along r. We extract a 2D slice of G representing each $T_i$ on the "mid-level" plane $\pi_i(p)$: $D_r(p) = (l_i + l_{i+1})/2$. The slice composed of a 2D level set grid $\Gamma_i$ on $\pi_i$ covering $\pi_i \cap \mathbb{G}$. In the common case where $\vec{v}$ is colinear with a coordinate axis direction, $\Gamma_i$ is trivially set as the 2D grid slice of $\mathbb{G}$ orthogonal to $\vec{v}$. Otherwise, we construct $\Gamma_i$ by resampling $\mathbb{G} \cap \pi_i$ as follows.

First, compute the intersection polygon $P = \partial \mathbb{G} \cap \pi_i$ of $\pi_i$ with the (integer) axis aligned box $\partial \mathbb{G}$. Then, compute the minimum area coplanar rectangle $B \supseteq P$. Since P is convex, B can be computed efficiently by applying the rotating callipers algorithm (see Toussaint, G. 1983. Solving Geometric Problems with the Rotating Calipers. In Proceedings IEEE MELECON, 10-17). Then, define a 2D Cartesian coordinate system $(O, \vec{u}, \vec{v})$ on $\pi_i$ by choosing an arbitrary corner point of B as the origin O and aligning the axis unit vectors $\vec{u}$ and $\vec{v}$ with the incident sides of B.

Let a and b be the lengths of the sides of B aligned with $\vec{u}$ and $\vec{v}$ respectively. We set the grid cell lengths $h_u = a/2\lceil a \rceil$ and $h_v = b/2\lceil b \rceil$ along $\vec{u}$ and $\vec{v}$. Since max($h_u, h_v) \leq \frac{1}{2}$ (i.e., half of the grid size of $\mathbb{G}$), this ensures that we have sufficient number of grid points to mitigate the resampling accuracy loss. To cover P, $\Gamma_i$ requires A×B cells, where $A = 2\lceil a \rceil$ and $B = 2\lceil b \rceil$, composed of A+1×B+1 uniformly placed voxel points $\{\gamma_{st} | s \in [0,A], t \in [0,B]\}$, $\gamma_{st} = O + s \cdot h_u \cdot \vec{u} + t \cdot h_v \cdot \vec{v}$. Finally, $\forall \gamma_{st}$ we locate a containing cell $G_{ijk} \ni \gamma_{st}$ and use the standard tri-linear interpolation of the values $\{d_{ijk}\}$ at the corners of $G_{ijk}$ to evaluate the 2D level set value $\{d_{st} = G_{ijk}(\gamma_{st})\}$.

In some implementations, a projection method can be used. If the grid is aligned with one of the milling directions, e.g., along the z-axis, for a given volume representing the region between any two planes (these will be aligned with the height layers), the algorithm can iterate over each grid point and for each z-column of grid points it can project the minimum voxel value (including negative values) onto the xy plane. In practice, only voxel grid points close to the level-set surface have values (positive if outside the solid and negative if inside). Moreover, if the direction is not aligned with one grid direction, the voxel grid can be rotated, and the grid values can be resampled with respect to the original grid.

The algorithm can create a 2D level-set voxel grid with the set of couples (2D point, value), and it is the "shadow" of the 3D shape. By performing a 2D marching cubes algorithm on the 2D level set, a polyline contour of the height layer can be extracted. The important property of this contour is that it is guaranteed to enclose all material inside of it, and any undercuts or internal voids in the 3D shape are naturally eliminated by always projecting the most negative level-set distance value. These undercuts can cause problems for mesh cross sectioning, and should thus be removed, such as by using the projection method described here, or other methods that facilitate extracting contours for each layer, such as the stratification methods described further below.

Figure 11C:
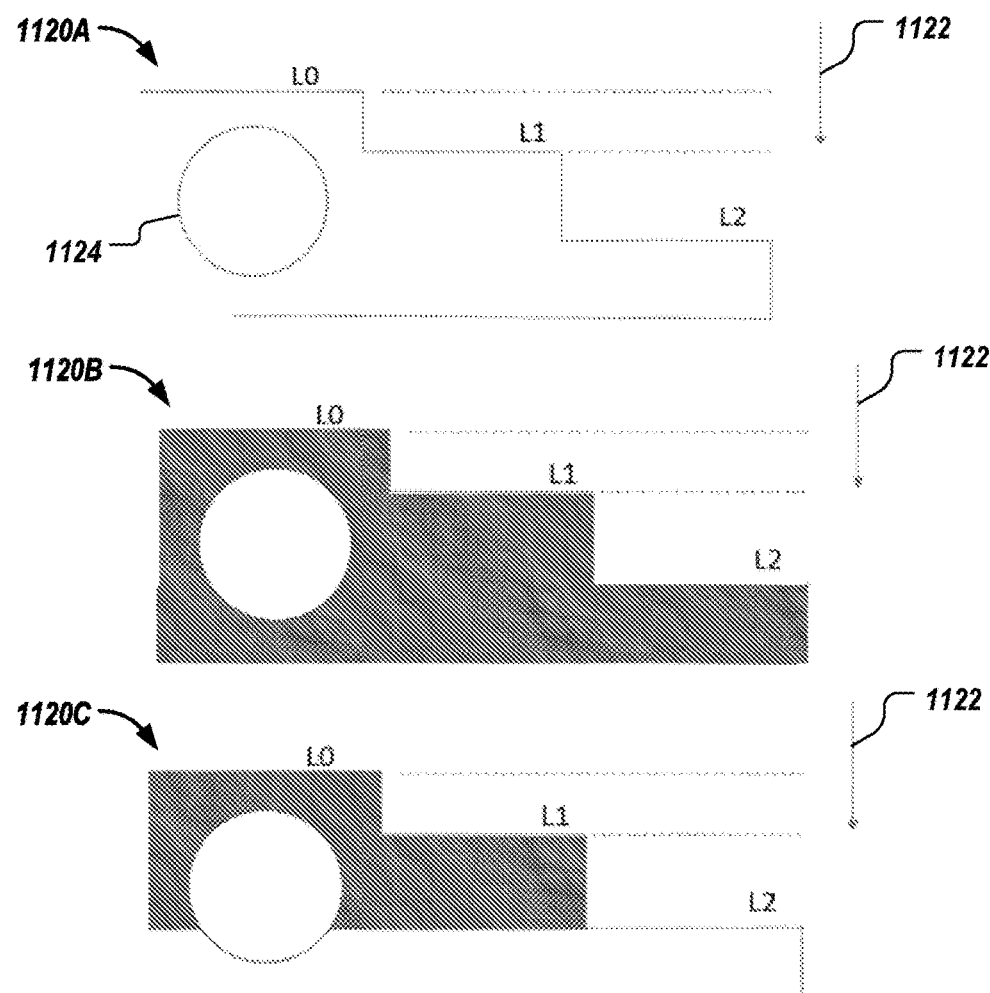
FIG. 11C is a schematic diagram showing a cross-sectional view of an example of a region of a 2.5 axis millable level-set solid.

An example of the projection method is now provided for a 3-level case. FIG. 11C is a schematic diagram showing a cross-sectional view of an example of a region of a 2.5 axis millable level-set solid 1120A. There is a side hole 1124 whose radius is large enough to intersect both the L1 and L2 planes. This is to demonstrate that it can be better to analyze groups of layers rather than one layer at a time. The "stock" contour 1120B, which is the outermost contour of the whole solid, can be extracted by applying the projection method to the whole solid with respect to the milling direction 1122. The deepest layer (L2 in this example) can then be determined, and the solid volume 1120C that lies above L2, with respect to the milling direction 1122, can be identified. The level-set projection method can then be perform to extract the contour for this <L2 region 1120C. This process can then be repeated for the <L1 region, and in general one can continue moving up the layers until one has extracted polyline contours for each layer.

While processing a level-set representation, as described above, is an option for extracting 1012 the contours, this is not required. In some implementations, the mesh itself is used to extract 1012 the contours, and stratification operations are performed (such as described in further detail below) to eliminate off-axis features from the mesh and improve the extracted contours. As noted above, in some implementations, the received shape data is not output from a generative design process but rather is output from another process. For example, the shape data can be output from a 3D scanner that provides a representation of a physical object that has been scanned by the 3D scanner, which can employ contact and/or non-contact (active or passive) based scanning technologies, e.g., laser triangulation, structure light technology, modulated light technology, laser pulse-based 3D scanning, laser phase-shift 3D scanning, coordinate measuring machine (CMM) technology, arm based 3D scanning and probe systems, optically tracked 3D scanners and probe systems, conoscopic holography systems, computed tomography (CT) imaging, magnetic resonance imaging (MRI), etc. Such implementations can also use one or more modelled solids, which are to be preserved in the solid 3D model of the object, e.g., B-Rep bodies for one or more preserve regions and one or more obstacle regions associated with a polygon mesh from a 3D scanner.

When an object has been scanned for manufacture using 2.5-axis milling, and this object needs to be connected with other objects in an assembly, then preserves and obstacles can be produced for the 3D scanned mesh. For example, screw holes may be needed to connect the scanned object with another object. These screw holes may already be present in the scanned mesh, but will not have the precise, circular radius needed for a particular screw or bolt specification. Thus, the program(s) 116, 904 can enable the user to import or directly create the preserve models that represent these precisely defined screw/bolt holes (typically a cylindrical hole), and these preserve models (including obstacles regions) can then be used as input to the algorithms described in this application. These additional modelled objects (e.g., of the screw/bolt holes) can thereby affect the conversion of the mesh to B-Rep, and will also be included in the final 3D model of the object to provide the correctly sized connection points for the larger assembly.

Returning to FIG. 10, regardless of the source of the initial 3D model, and regardless of the techniques used to extract 1012 the polyline contours, fitting 1014 curves to the polyline contours can generate the smooth curves of the first model for subsequent processing. In some implementations, the obtaining 1010 includes processing the received shape data (output data from a generative design process or from a scanner) to produce polylines matching the contours representing the discrete height layers of the object to be manufactured using the 2.5-axis subtractive manufacturing process, fitting 1014 the smooth curves to the polylines, and replacing at least one segment of at least one of the smooth curves to reduce a curvature of the at least one segment to be less than or equal to a curvature of a smallest milling tool available for use in the 2.5-axis subtractive manufacturing process for at least one of the discrete height layers.

In some implementations, the fitting 1014 includes fitting spline curves to polyline points using least squares minimization techniques for computational geometry. However, when the manufacturability constraint associated with the minimum tool radius is applied, the problem becomes more complex. If the contours are fitted with curves which have regions of high curvature in the concave direction that exceed the curvature of the tool, i.e., the minimum tool radius for milling the part is larger than the radius of the curve to be milled, the tool will not be able to mill that region. The problem is further complicated by the need to ensure that contours from adjacent layers are aligned when looking along the direction, to avoid thin shelves appearing between layers, as described in further detail below.

Note that, in addition to the condition that the radius of curvature should be greater than the minimum tool radius, some implementations also use a condition that the distance from any point on the contour to the medial axis of the contour should be bigger than the minimum tool radius. That's the condition where coin fitting can close up narrow necks in the contour. But in some cases, such geometry with these narrow necks is unlikely to be produced by the 2.5D generative algorithm due to the milling constraints. Nonetheless, in some implementations, a check can be made to detect such narrow necks in the contour using the voronoi diagram algorithm used in coin fitting, and then a similar fixing strategy can be used as described below. Then, some points can be pushed outward to widen the narrow neck, as needed.

Figure 11D:
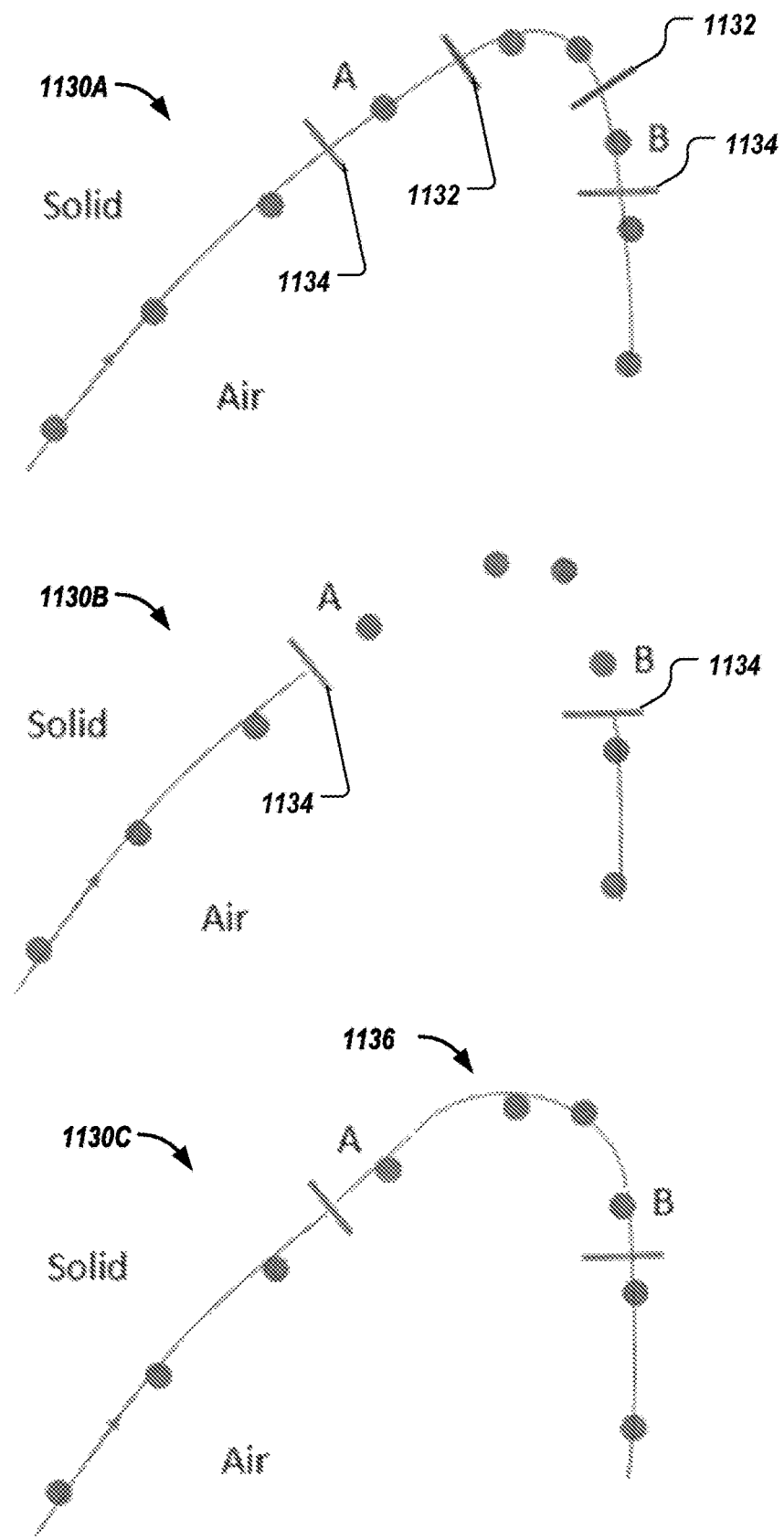
FIG. 11D shows an example of how to enforce concave curvature compliance.

FIG. 11D shows an example of how to enforce concave curvature compliance. Known optimization methods for fitting curves to points that minimize curvature can be used, but the requirement for 2.5 axis millable designs is to fit curves that have a strict upper curvature limit in the concave direction (i.e., nooks and crannies). In some implementations, this requirement is addressed by detecting regions of non-compliance and replacing them with curve segments that are compliant.

For example, each polyline can be segmented such that a polyline subsection with known end points for the fitted curve is produced. A spline 1130A can be fit (with standard linear methods) using an arbitrary but suitable relative tolerance based on a ratio of the bounding box diagonal of the whole model. The curve can then be sampled at a higher density than the polyline vertices. The curvature at each sample point can be evaluated and sections of the curve that are non-compliant 1132 can be detected. Finding the nearest polyline vertices where the curve is compliant (points A and B in spline 1130A), the spline curve can be trimmed back a little further to the midpoints 1134 of the polyline segments that are curve compliant for 2.5 axis manufacturing, forming trimmed curves 1130B.

Several options exist for making the non-compliant section 1132 compliant for the minimum tool radius. The gap can be refit using a spline with a larger fit tolerance to get below the high curvature limit, or a circular arc with a compliant curvature can be fit into the gap. Fitting a circular arc in an optimal way whilst remaining tangent connected to the existing curves is a known problem for which solutions exist. Regardless of the approach used though, at least one segment of at least one of the smooth curves is replaced with a new segment 1136 to reduce a curvature of the at least one segment to be less than or equal to a curvature of a smallest milling tool available, thus forming a new spline 1130C that satisfies the curvature requirement for milling.

Returning again to FIG. 10, regardless of whether or not the obtaining 1010 includes generating the initial model or producing the first model from the initial model, one or more of the smooth curves that are fit 1014 to the extracted 1012 polyline contours are modified 1020, e.g., by program(s) 116, 904. The modification 1020 is done to facilitate the 2.5-axis subtractive manufacturing process and can include detecting 1022 at least a portion of a first smooth curve for a first of the discrete height layers that is almost coincident with at least a portion of a second smooth curve for a second of the discrete height layers. To be almost coincident, the lateral distance (perpendicular to the milling direction) between the portion of the first smooth curve and the portion of the second smooth curve should be less than a threshold determined in accordance with the 2.5-axis subtractive manufacturing process. For example, the threshold can be set to the minimum tool radius available in the 2.5-axis subtractive manufacturing process. In some implementations, a tolerance of 1/1000 of the mesh box size is used. Note that it is desirable to keep the physical properties of the solution, and with this choice of tolerance, the volume of the solution can be expected to change within a given ratio. In some implementations, a basic tolerance for a mesh with size (dx, dy, dz) and z attack direction can be set to a value of sqrt(dx^2+dy^2)/1000. Moreover, note that thin shelves can be detected by computing the perimeter and the area of a planar face.

Each such portion of a first smooth curve in one height layer that is almost coincident with a portion of a second smooth curve in another height layer can be replaced 1024 with the portion from the second smooth curve, thereby removing the thin shelf that would otherwise be produced in the output 3D model. Thus, the contour curves are aligned with each other to at least prevent thin shelves appearing between layers, thereby facilitating the 2.5-axis subtractive manufacturing process. Additional detection and alignment techniques for the contours, which can be performed as part of the modifying 1020, are described in further detail below.

For example, the first model can include one or more modelled solids, which are to be preserved in the solid 3D model of the object. As noted above, these one or more modelled solids can be preserve bodies with obstacle region(s), which were input to a generative design process, or which were created by the user for a scanned object (mesh or level-set representation). In either case, at least one extrude direction (corresponding to at least one milling direction) is obtained (received or determined automatically). The modifying 1020 can include detecting 1022 at least a portion of another smooth curve for the first of the discrete height layers that is almost coincident with at least a portion of the one or more modelled solids, and the modifying 1020 can include aligning the portion of the other smooth curve for the first of the discrete height layers with the at least a portion of the one or more modelled solids (e.g., by replacing 1024 a portion of a curve that doesn't align with it adjacent preserve body).

After the modifying 1020, an editable model of the object is prepared 1030, e.g., by program(s) 116, 904. The editable model can include a series of construction steps represented in a parametric feature history, where the series of construction steps includes combining extruded versions of the smooth curves to form a solid three dimensional (3D) model of the object in a boundary representation format. The smooth curves from each height layer form planar loops, which can be extruded 1032 into solid B-Rep bodies. The bodies from each layer (extruded bodies and any preserve bodies) can then be combined 1034 using B-Rep Boolean operations. Note that the extruding 1032 and the combining 1034 done using the parametric feature history can be done in a positive manner (adding the extruded bodies for each layer together) or in a negative manner (subtracting the extruded bodies for each layer from an extruded stock contour). Moreover, in some implementations, holes whose axes are not parallel to the milling direction can be created on the final body, and/or fillets can be added to concave edges on the final body, using the parametric feature history.

The parametric feature history can also include a sketch feature associated with one or more of the discrete height layers (e.g., a sketch user interface that is available for each height layer contour). A user interface element showing the sketch feature in relation to the editable model can be rendered 1040, e.g., by program(s) 116, 904, to a display screen. This allows the user to readily select a height layer, and edit the contour for that layer using the sketch feature in the user interface, as desired. Upon receipt of user input, a subset of the smooth curves in the at least one of the discrete height layers is reshaped 1050, e.g., by program(s) 116, 904, to change the solid 3D model. After the reshaping 1050, the series of construction steps represented in the parametric feature history are replayed 1055, e.g., by program(s) 116, 904, to construct the solid 3D model of the object in the boundary representation format, as changed by the user input, and the process returns to rendering 1040 the revised sketch user interface element, potentially in combination with rendering a visualization of the updated 3D model.

Thus, the user is free to modify the different contours for respective height layers of the object to be manufactured using the 2.5-axis subtractive manufacturing process, and the parametric feature history automatically reconstructed the modified 3D model in response to these user edits. This creates an easy to use editor interface for the user, which allows quick changes to the 3D model, while also ensuring that the 3D model reconstructed after each edit will remain manufacturable using the 2.5 axis subtractive manufacturing process. Note also that this sketch user interface readily works with preserve bodies (and potentially obstacle regions) being present in the 3D model as well. The reshaping 1050 can include constraining changes to at least a portion of a smooth curve, which is almost coincident with a preserve body, to maintain tangency and contact with the preserve body, and the series of construction steps can include combining the extruded versions of the smooth curves with the preserve body solid(s) to form the solid 3D model of the object in the boundary representation format in response to each user input received.

Once the design is approved, the process of FIG. 10 can provide 1060, e.g., by program(s) 116, 904, the 3D model of the object in accordance with the user's edits for use in 2.5-axis subtractive manufacturing a physical structure. The providing 1060 can involve sending or saving the 3D model to a permanent storage device for use in manufacturing the physical structure corresponding to the object using the SM manufacturing systems. In some implementations, the providing 1060 involves generating 1062 toolpath specifications for the computer-controlled SM manufacturing system(s) using the 3D model, and manufacturing 1064 at least a portion of the physical structure corresponding to the object with the computer-controlled SM manufacturing system(s) using the toolpath specifications generated for the SM machine. In some implementations, the providing 1060 can include manufacturing a mold for a physical structure with the subtractive manufacturing machine using the toolpath specification generated 1062.

Figure 11E:
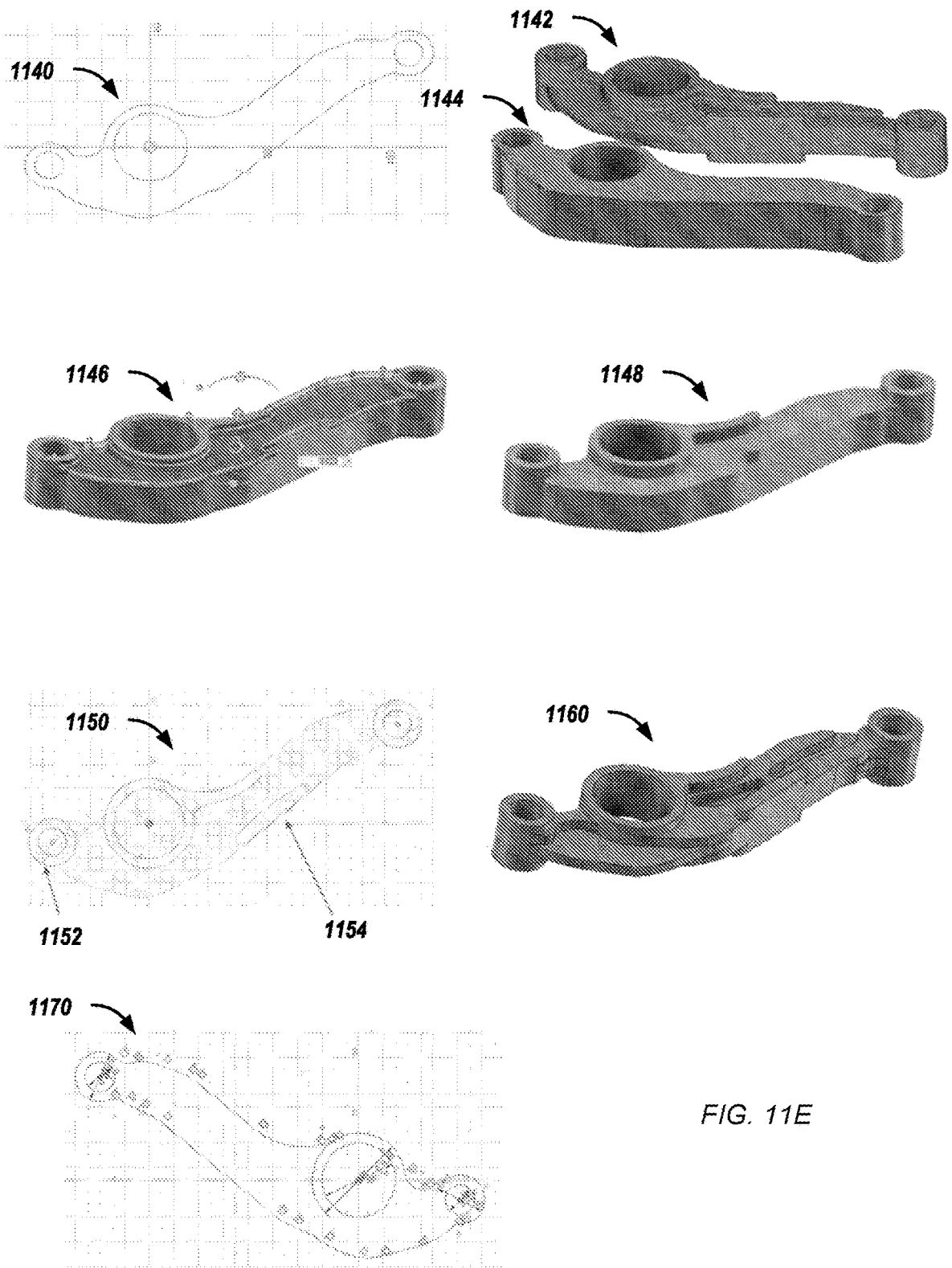
FIG. 11E shows graphical representations of an example of a process of preparing an editable model of an object, receiving user input to a sketch editor user interface element to reshape a layer of the 3D model of the object, and replaying the parametric feature history to reconstruct the 3D model of the object.

FIG. 11E shows graphical representations of an example of a process of preparing 1030 an editable model of an object, receiving user input to a sketch editor user interface element to reshape a layer of the 3D model of the object, and replaying the parametric feature history to reconstruct the 3D model of the object. In this example, the outermost outline of the geometry (when looking at it along the milling direction) is extracted first. In FIG. 11E, an outline 1140 of mesh geometry 1142 (when looking along the milling direction) is shown with the pin holes, which come with the B-Rep preserve bodies, included. This outermost outline 1140 can be understood as the "stock" contour because it represents a stock shape from which material can be subtracted to obtain the final shape.

A B-Rep extrusion 1144 of the stock contour 1140 for the mesh geometry 1142 is also shown in FIG. 11E. The strategy can thus be to simulate how a 2.5 axis machine might proceed to cut out the geometry from the stock. Contours for each height layer can be extracted, and curves can be fit to these contours (as describe in this document). The fitted curves form a loop, and each loop can be made into a face, and each face can be extruded and cut away 1146 from the stock 1144. Thus, as shown in FIG. 11E, layers can be cut from the stock shape using solid extrusions of the fitted contours (i.e., negative combing using the parametric feature history) to construct the 3D model 1148. In some implementations, the solid extrusions of the fitted contours are added together to for the 3D model 1148 (i.e., positive combing using the parametric feature history).

To align the curves, the contours can be snapped to curves previously fitted in the process. For example, when fitting the contours for the first layer 1150, and parts of the contour are identified as coincident (when projected to the same cross-sectional plane) with a) the preserve geometry 1152 which already has precise cross-sectional curves and b) the already fitted contour 1154. Note that using precise keep-in contours for the preserve geometry 1152 and sharing curve geometry with a previously fitted contour 1154 facilitates 2.5 axis subtractive manufacturing. By detecting when the contours become almost coincident with preserve geometry or previously fitted contours, the curves can be reused to ensure that the fitted contours are aligned with other contours or preserve geometry. Continuing with this fit-and-cut strategy for all the layers, produces a final B-Rep conversion model 1160.

Even though this B-Rep output can be edited using traditional direct editing tools, e.g., by program(s) 116, 904, this would involve directly manipulating the edges and faces of the B-Rep to modify its shape. A more editable form of output is can be produced by decomposing the B-Rep model into a series of construction steps and representing these in a parametric feature history. One such construction step can be the extrusion of the stock contour into the initial solid body. This can be represented as a sketch feature 1170 in the parametric feature history, complete with editable curves and constraints to maintain tangency and contact with the preserve bodies. Note that a sketch feature 1170 can be used with any of the contours for the 3D model, and preparing a parametric editable model in this manner facilitates the user making changes to the 3D model by editing the contours without affecting the preserve bodies. When the user edits the sketch, the parametric feature history replays the construction of the entire modified B-Rep. Further, concave fillets that represent the envelope created by the tool shape as it cuts into concave corners can also be added automatically as a parametric fillet feature.

Figure 12:
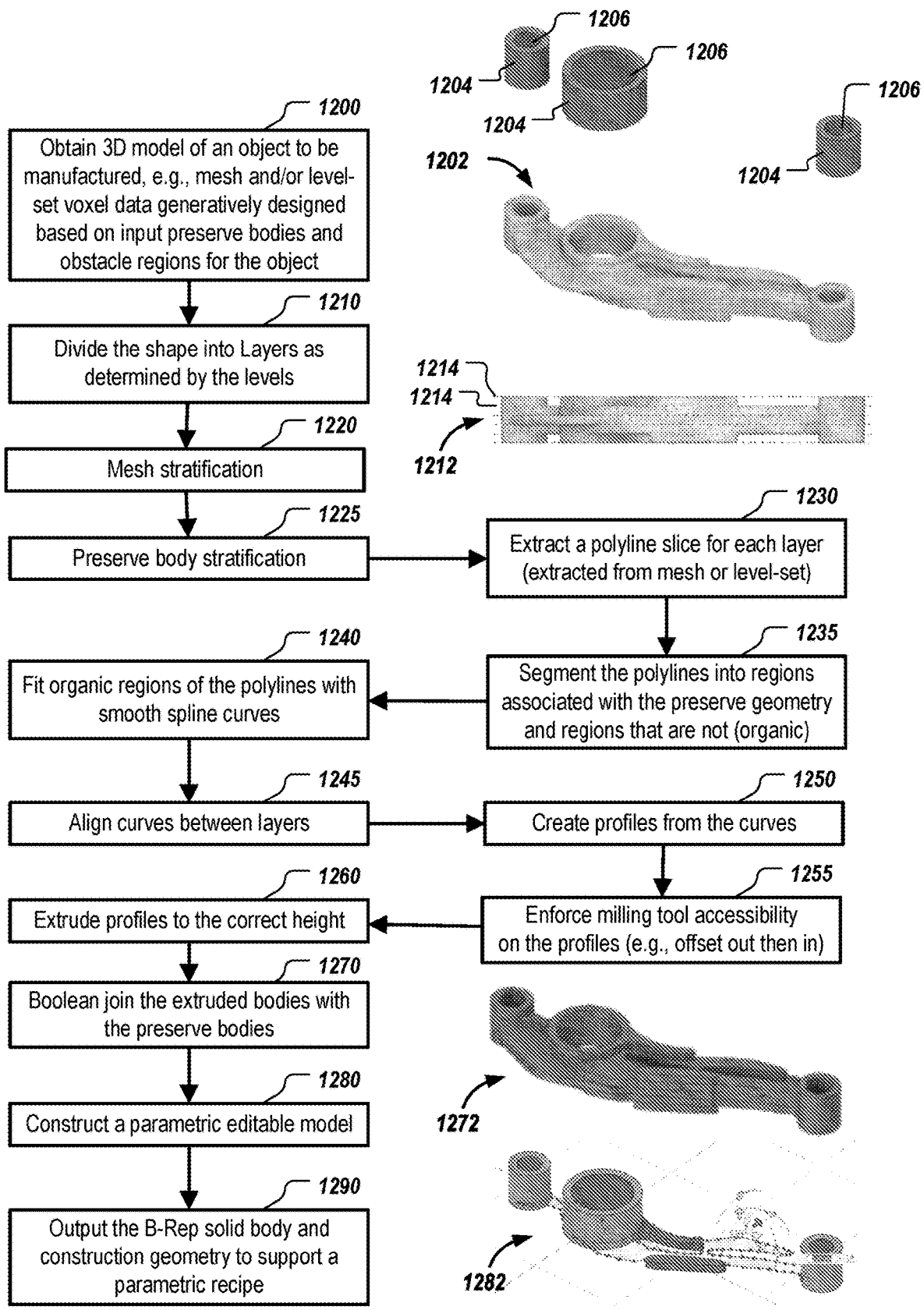
FIG. 12 shows another example of a process to produce a watertight boundary representation for an object to be manufactured using a 2.5-axis subtractive manufacturing process.

FIG. 12 shows another example of a process to produce a watertight boundary representation for an object to be manufactured using a 2.5-axis subtractive manufacturing process. A first 3D model of the object is obtained 1200, e.g., by program(s) 116, 904. The first 3D model can include a mesh of various formats, can be the output from one or more generative design processes or other processes (e.g., from a 3D scanner), can be associated with one or more modelled solids, as described above. For example, the first 3D model can be a triangular mesh 1202 (or level-set geometry, such as level-set voxel data) produced by a generative design solver, which has been constrained to produce 2.5 axis millable shapes, where this output from the generative design solver needs to be converted into editable B-Rep bodies.

The objective can be to take the polygonal mesh representation of a solid body which is 2.5-dimensional (2.5D) and convert it into a boundary representation (B-Rep) format with smooth fitted NURBS (Non-Uniform Rational B-Spline) surfaces. The objective is to produce a B-Rep whose shape is efficiently manufacturable using CNC milling machines capable of 2.5-axis milling. The obtaining 1200 can involve receiving or generating a 3D model, e.g., any polygonal mesh geometry or level-set geometry which can be sliced by planes to produce closed polyline loops. Thus, the input can also include pre-existing B-Rep bodies that represent sub-regions of the input mesh to be included without approximation in the output B-Rep (referred to as "preserve" bodies 1204). The input can also include pre-existing B-Rep bodies representing regions where material must be absent (referred to as "obstacle" bodies 1206). The preserve bodies allow the user to specify precisely the geometry that needs to be present in the final body rather than have the algorithm include an approximation of it. This is important in manufacturing for ensuring that the part being manufactured mates precisely with other parts in the assembly.

The obtaining 1200 can include the generative design process itself, which can employ the systems and techniques described in this application, or other approaches to generating designs that are easier to machine on a 2.5-axis CNC machine. In addition, other sources for the first 3D model are also possible; the input need not come from a 2.5 axis constrained generative design topology optimization process. For example, the input to the conversion process can include depth map output from a machine learning (ML) generative adversarial network (GAN) image (or similar output from another process) or point cloud output (or a converted mesh therefrom) from a 3D scan by an object scanner for reverse engineering. However, the result of the conversion process will nonetheless be 2.5D shapes. 2.5D shapes are a subset of 3D shapes where the geometry is constructible as a union of 3D regions each formed by a linear extrusion of planar faces in a common bi-parallel direction (which is called the 2.5D axis), and where the planar faces have normals that are bi-parallel with the 2.5D axis.

The obtaining 1200 can also include receiving or determining other information associated the object to be manufactured and thus the first 3D model, such as described above for obtaining 1010, e.g., one or more milling directions for the 2.5-axis subtractive manufacturing process, milling height layer positions, and at least one milling tool radius, e.g., a minimum milling tool radius or the radius of the smallest milling tool available when cutting the part to form the object during manufacturing. The received milling tool radius information can be provided per layer, but the algorithm can be designed to operate without receiving any milling tool radius information, in which case, a default minimum tool radius (or no minimum tool radius) can be used during the conversion process.

Regardless of how the 3D model is obtained 1200, the shape defined by this 3D model can be divided 1210, e.g., by program(s) 116, 904, into layers 1212 as determined by the levels (e.g., five layers 1212 as shown in FIG. 12). Every 2.5D shape can be decomposed into a union of layers, each layer being a constant thickness everywhere (but each layer not necessarily being the same thickness). If the layer levels 1214 are provided by the application, the stratification is straightforward. If they are not provided, let the 2.5D axis be in the z direction, then a clustering algorithm on the z-coordinate of mesh vertices yields the layer levels.

Next, a mesh stratification 1220 can be performed, e.g., by program(s) 116, 904. The objective is to produce a shape capable of being manufactured using a 2.5-axis milling toolpath with an attack direction that can be aligned along the z axis. Depending on the set-up, the allowed attack directions can include +z, −z, and +z or −z (bi-directional). The output of the mesh stratification 1220 can be a stratified mesh, in which, any face must be vertical or horizontal, any point of a horizontal face must be visible from an allowed attack direction (no undercuts), and any horizontal face must lie on a predefined and limited set of planes. Note that the last of these conditions is an extra constraint, and it is possible that an input mesh does not respect these constraints.

Figure 13A:
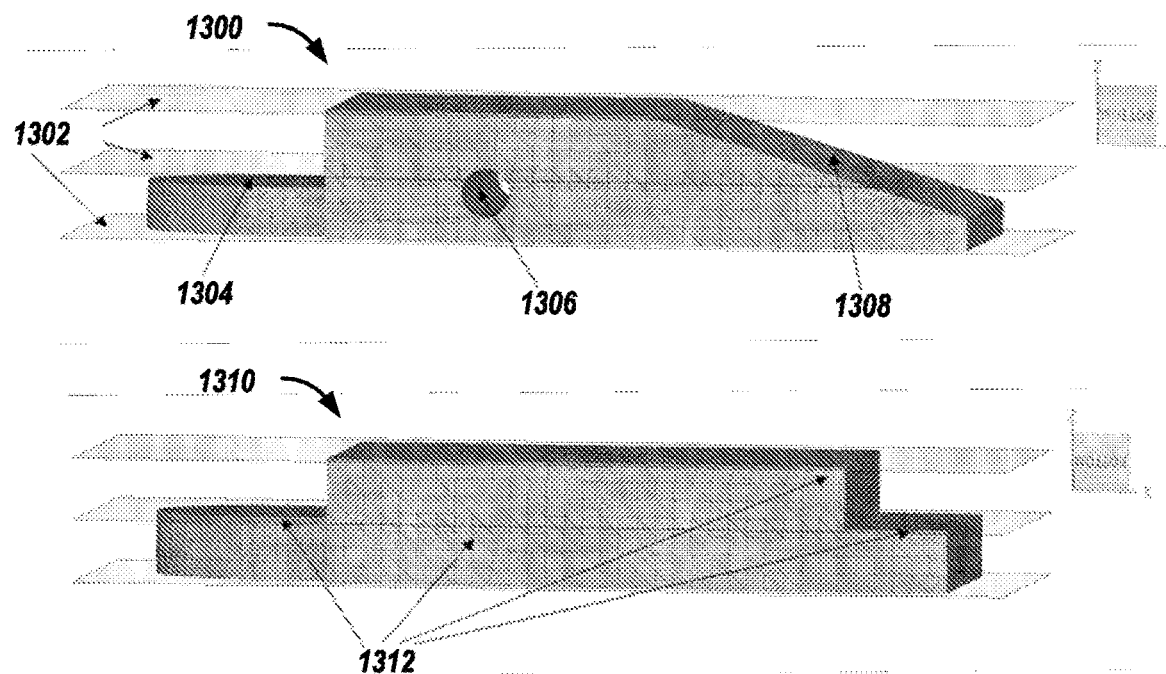
FIG. 13A shows an example of mesh stratification.

FIG. 13A shows an example of mesh stratification. An input mesh 1300 has associated layer levels 1302, a horizontal face 1304 that is not aligned with any layer level, an undercut 1306, and a non-horizontal face 1308. The goal is to transform the input mesh 1300 into an output mesh 1310, which is the smallest mesh that satisfies all the necessary conditions for the rest of the algorithm to work. Note the volumes 1312 that have been filled by the mesh stratification 1220.

The mesh stratification 1220 can receive a level-set representation of the object, or receive a mesh representation of the object (e.g., from the generative design process) and convert the mesh representation into a level-set representation of the object. A level-set representation is a volumetric representation that defines an interior and exterior creating a grid in the space of the mesh and storing at each point of the grid the distance from the mesh surface. For example consider a grid with integer spacings in three dimensions and a sphere of radius R=10 centered at the origin. Any point of the grid (i, j, k) will store the distance $$D_{ijk} = \begin{array}{l} -\sqrt{R^2 - i^2 - j^2 - k^2}, \text{ for points inside the sphere} \\ +\sqrt{i^2 + j^2 + k^2 - R^2}, \text{ for points outside the sphere} \end{array}$$

One or more level-set values in the level-set representation of the object are modified, in each of one or more milling directions specified for the 2.5-axis subtractive manufacturing process, to remove undercuts. For example, the level-set values for each z-column can be modified in order to remove undercuts. An undercut can exist only if along z (that is the milling direction) the distance function has multiple local minima. To avoid undercuts the distance function must have only one global minimum along any z column. The algorithm can pick the global minimum and make the function non-increasing up to that point, and non-decreasing beyond that point. In order to make the function non-increasing for z<z_min, the lower value can be propagated, as follows:

if $(D(z=i)>D(z=i+1))D(z=i+1)=D(z=i)$; // if $i+1 \le i\_min$

And to make the function non-decreasing for z>z_min, the upper value can be propagated:

if $(D(z=i)<D(z=i+1))D(z=i)=D(z=i+1)$; // if $i>i\_min$.

Figure 13B:
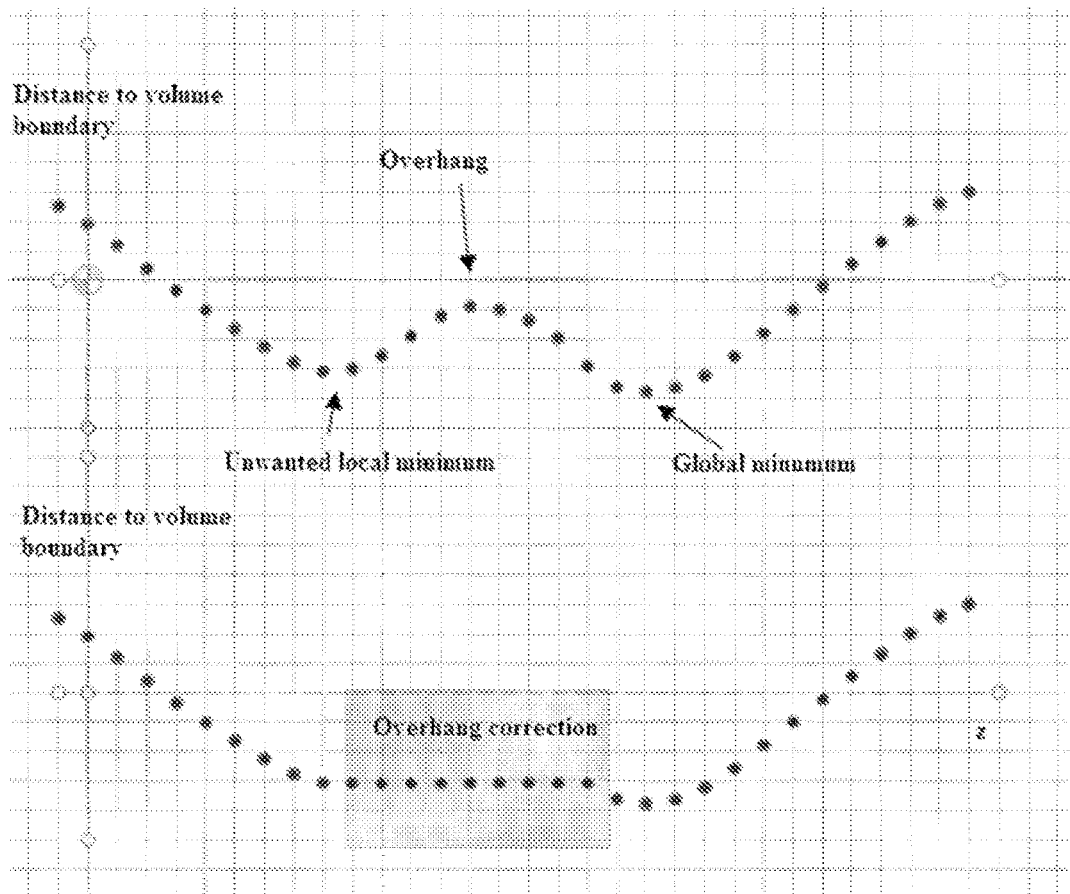
FIG. 13B shows an example of modifying level-set values to remove undercuts in a mesh.

FIG. 13B shows an example of modifying level-set values to remove undercuts in a mesh. As shown, the distances to the volume boundary are modified to remove the unwanted local minimum and the overhang, while keeping the global minimum; compare the distance values in the top portion of FIG. 13B with the distance values in the bottom portion of FIG. 13B, which shows the overhang correction.

Figure 13C:
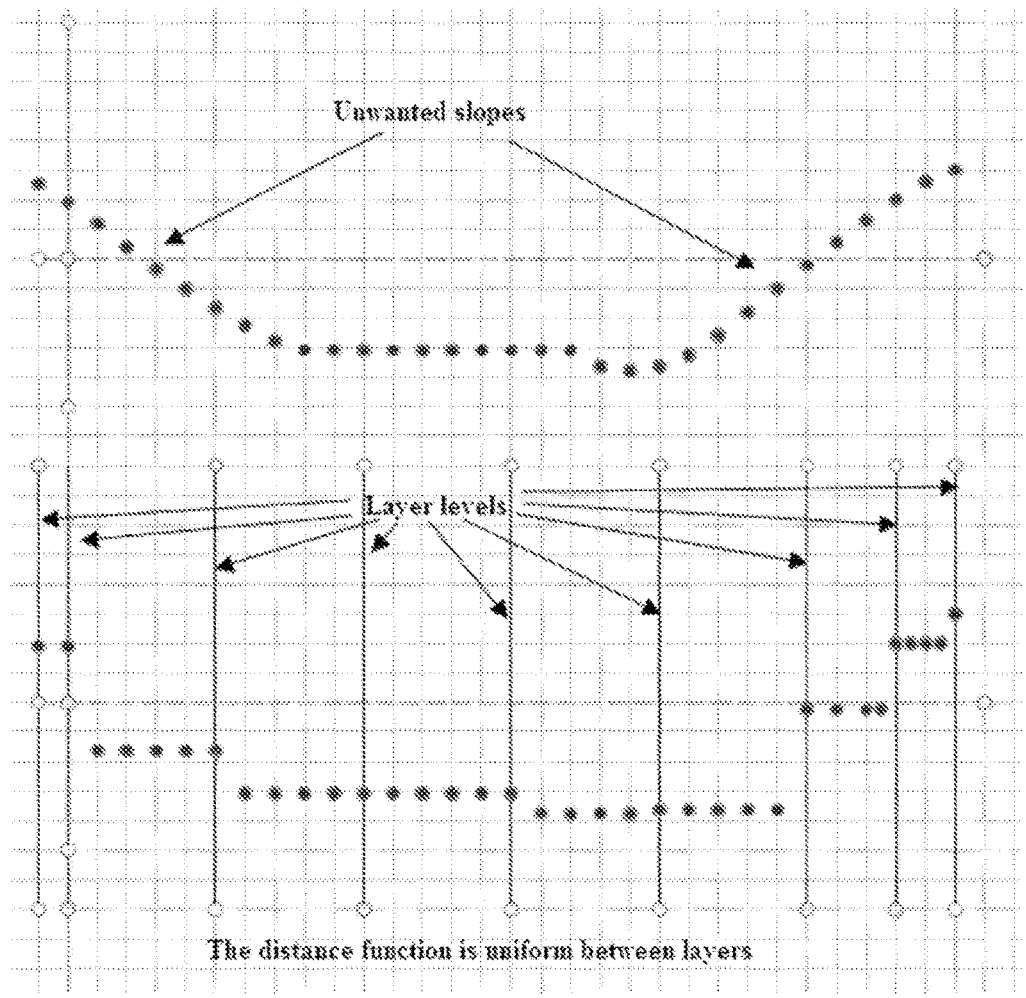
FIG. 13C shows an example of modifying level-set values to move planar faces up to the layer level.

Next, one or more additional level-set values are modified in the level-set representation of the object to move one or more planar faces of the object up to a height level of that planar face's corresponding one of the discrete height layers. For example, considering a column of z distance values, the distance can be required to be uniform between layer levels. This means that the value of the distance function must not change inside a layer and must be kept the minimum value in order to always add material. FIG. 13C shows an example of modifying level-set values to move planar faces up to the layer level. The upper portion of FIG. 13C shows the unwanted slopes created by the distance values. The bottom portion of FIG. 13C shows how the distance values have moved to make the distance function uniform between layers of the layer levels. After this, the modified level-set representation of the object can be converted back into a mesh representation of the object, e.g., using the marching cubes algorithm.

Figure 13D:
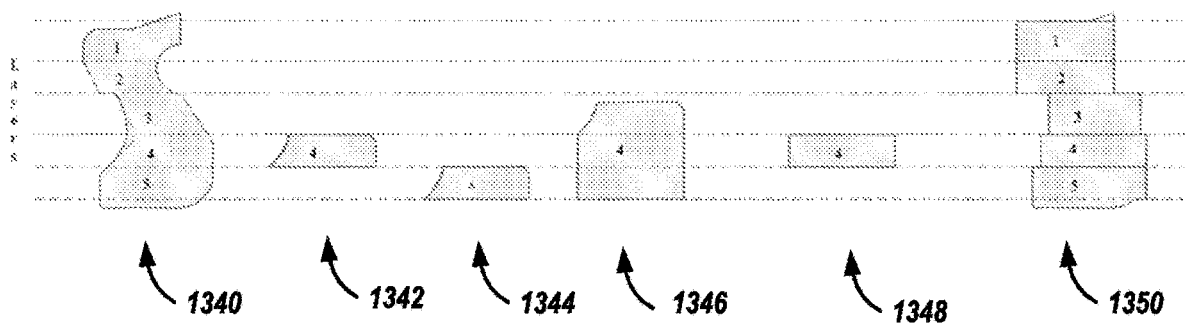
FIG. 13D shows an example of a process to make layers of an input modelled solid for a preserve region uniform.

Returning to FIG. 12, the mesh stratification 1220 can be followed by preserve body stratification 1225, e.g., by program(s) 116, 904. Stratifying 1225 any preserve B-Reps shares the same goal as stratifying 1220 the mesh, but with a B-Rep, precise geometry should be produced, so the same volumetric tools used with meshes cannot be used. The body stratification 1225 can be composed in two parts: first, making layers uniform; and second, removing undercuts. FIG. 13D shows an example of a process to make layers of an input modelled solid for a preserve region uniform. This example of body stratification is shown in 2D for ease of illustration.

Figure 13E:
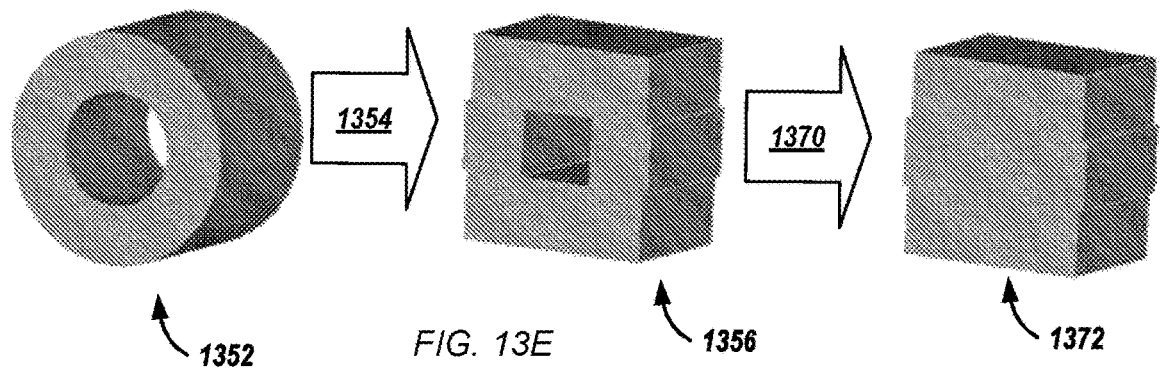
FIG. 13E shows an example of preserve body stratification applied to a 3D preserve body.

For each initial body 1340 (each modelled preserve solid), a layer of the body 1340 is selected 1342 using a Boolean intersection of the body 1340 with the layer (layer 4 in the example shown). This intersection produces a portion of the modelled solid 1340. This portion is then moved 1344 completely under the layer in the milling direction, and then this portion of the body 1340 is swept 1346 vertically (opposite the milling direction) through the layer to produce a swept solid. A layer of this swept solid is selected 1348 using a Boolean intersection of the swept solid with the layer (layer 4 in the example shown). This intersection produces a portion of the swept body that is inside the layer, which serves as a replacement for the portion of the modelled solid 1340 in the layer. These operations can be applied to all the layers and the output bodies can be united to form a replacement solid body 1350. FIG. 13E shows an example of the process of FIG. 13D applied to a 3D preserve body. An input preserve body modelled solid 1352 is made uniform 1354 within three layers, resulting in an output body modelled solid 1356.

Figure 13F:
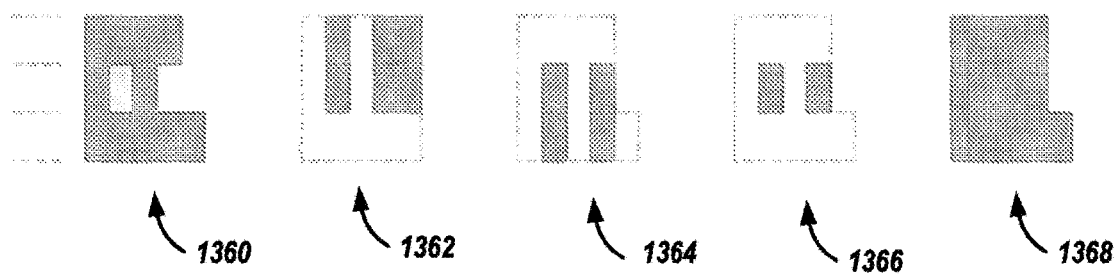
FIG. 13F shows an example of a process to remove undercuts from a preserve body that has been made uniform within defined layers.

After making the layers uniform between layers (body_0), the result can include undercuts, which should be removed. FIG. 13F shows an example of a process to remove undercuts from a preserve body that has been made uniform within defined layers (in 2D for ease of illustration). One or more upside faces of a modelled solid 1360 (with uniform layers) are swept upward 1362, opposite the milling direction, to a top most level of the discrete height layers along the milling direction to produce one or more upside swept solids. Sweeping all top faces of body_0 in the +z direction (upside sweep to layers' end) results in a united (body_1). Any downside faces of the modelled solid are swept downward 1364, in the milling direction, to a bottom most level of the discrete height layers along the milling direction to produce one or more downside swept solids. Sweeping all bottom faces in the −z direction (downside sweep to layers' end) results in a united (body_2). The body with filled undercuts is then the Boolean intersection 1366 of the upside sweeps with the downside sweeps, which is then combined 1368 with the modelled solid 1360: body_0+ (body_1*body_2), where "+" is the Boolean union, and "*" is the Boolean intersection.

FIG. 13E shows an example of the process of FIG. 13F applied to the 3D preserve body that has been made uniform across the layers. The uniform preserve body 1354 has its undercuts removed 1370, resulting in an output body modelled solid 1372. Thus, the preserve body stratification applied to the 3D preserve body is completed when the one or more undercut filling solids (generated by intersecting the upside swept solid(s) with the downside swept solid(s)) are combined with the modelled solid made uniform across the layers.

Returning to FIG. 12, after the mesh stratification 1220 and the preserve body stratification 1225, a polyline slice is extracted 1230, e.g., by program(s) 116, 904, for each layer. This extraction can be done from a mesh or from a level-set representation, as described in detail above, e.g., the description in connection with FIG. 11B. Each of the polylines are then segmented 1235, e.g., by program(s) 116, 904, into regions associated with the preserve geometry and regions that are not (e.g., part of the organic shapes produced by a generative design process). The input shape data can be a mesh representation of the object or a level-set representation of the object, which can be converted into a mesh representation to be processed to produce the polylines, e.g., slicing the mesh representation of the object with planes located within respective ones of the discrete height layers along a milling direction, each of the planes being perpendicular to the milling direction. Note that a stratified mesh and stratified preserve bodies (as describe above) can be used as the input for the profile slicing to generate each polyline.

Figure 14A:
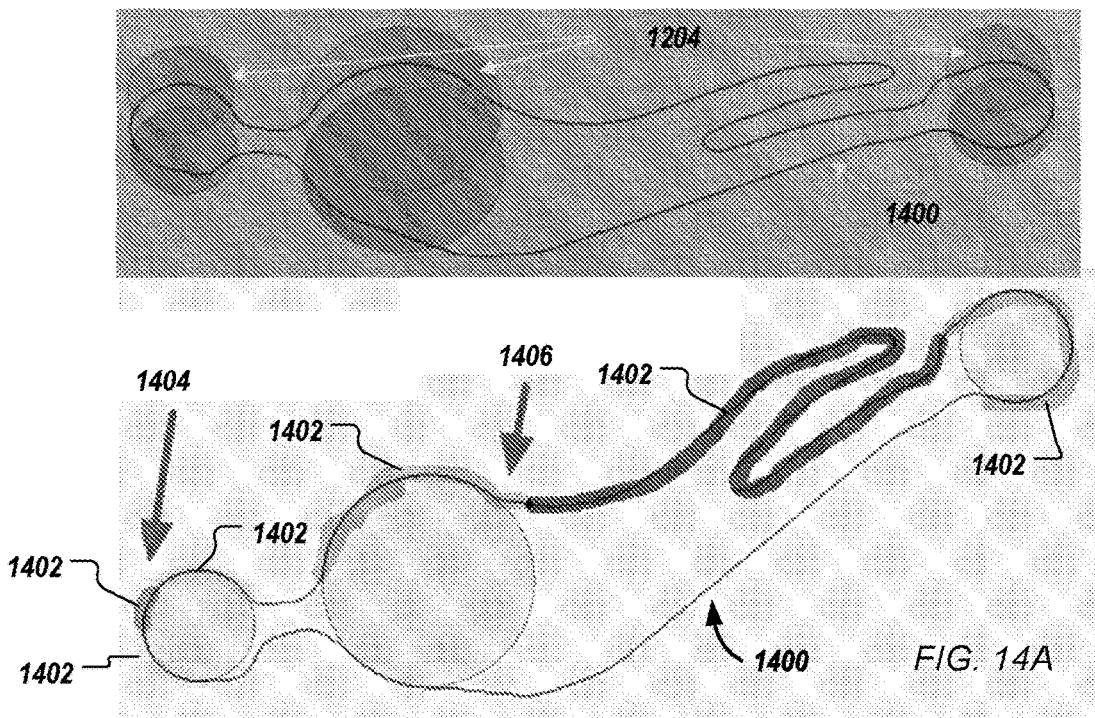
FIG. 14A shows an example of a polyline for a slice of an object, and an initial segmentation of the polyline.

FIG. 14A shows an example of a polyline for a slice of an object, and an initial segmentation of the polyline. One of the layers of the mesh 1202 has been sliced to produce a polyline 1400, shown with reference to the preserve bodies 1204. Note that the final result should have the connection between the organic region and the preserves be completely smooth. To achieve this result, a proper segmentation of the polylines for the layers is needed. By slicing the mesh with planes parallel with the levels and positioned at the midpoint of each layer, a polyline cross section is extracted, as shown in FIG. 14A. The segmentation then splits the polyline 1400 into different regions, with the segments based on their proximity to the preserve bodies. For example, segments 1402 can be created for polyline 1400.

In this example, the segmentation has not satisfied important constraints. At 1404, a small undesirable segment 1402 has been created on the polyline 1400 adjacent a preserve body 1204. Such small regions resulting from mesh noise should be avoided. To do this, a large tolerance can be used during the segmentation to assign polyline vertices and segments to any preserve bodies that are present. For example, if the basic tolerance is tol=diagonal (mesh bounding box)/1000, a large tolerance can be large_tolerance=sqrt(10)*tol. In general, the larger tolerance should be at least some multiple (2, 3, 4, or 5 times) of the basic tolerance used. In addition, in this example, a gap 1406 has been created between the organic region and the preserve body. This is also undesirable, and so the organic regions should be extended until they actually intersect any preserve body or until the polyline becomes tangent to a preserve body.

Figure 14B:
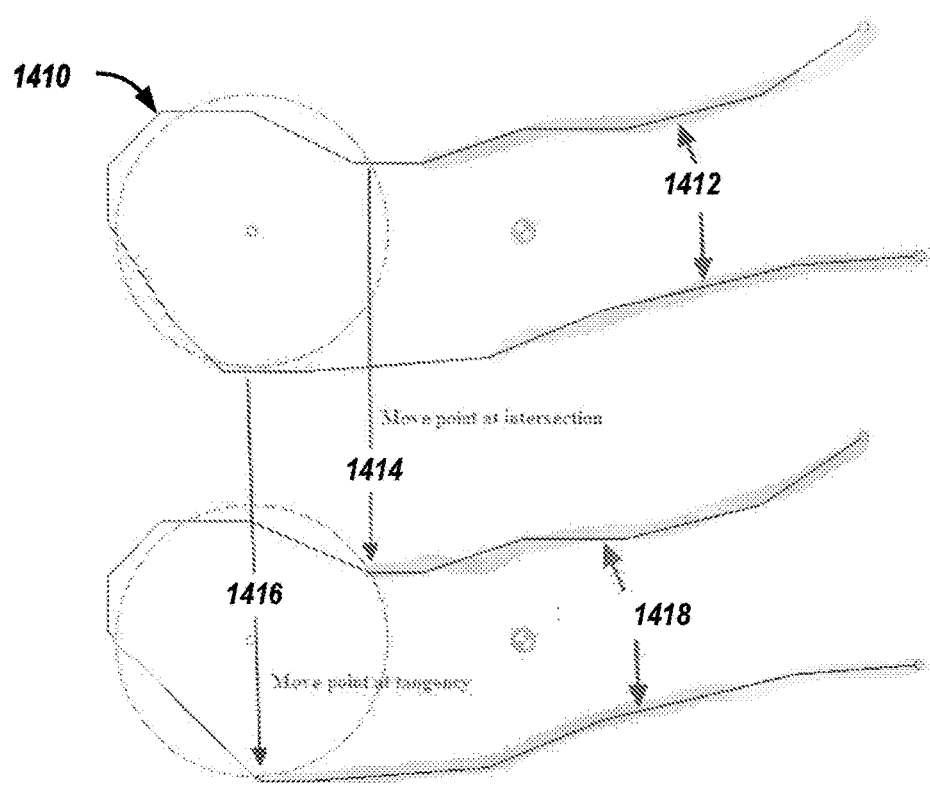
FIGS. 14B and 14C show a process of generating segments of polylines.
Figure 14B:
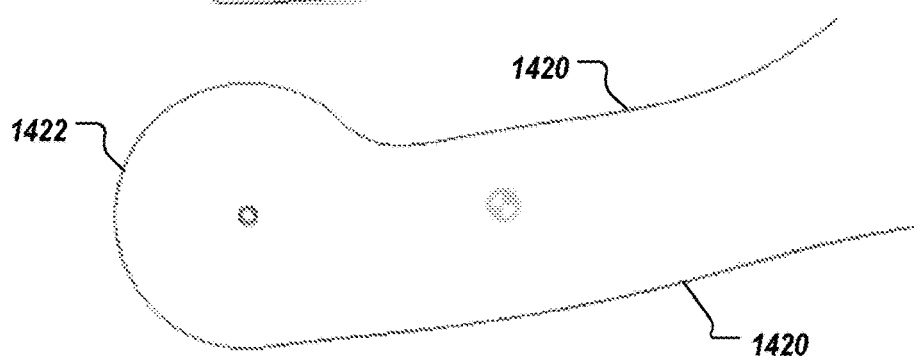
Figure 14C:
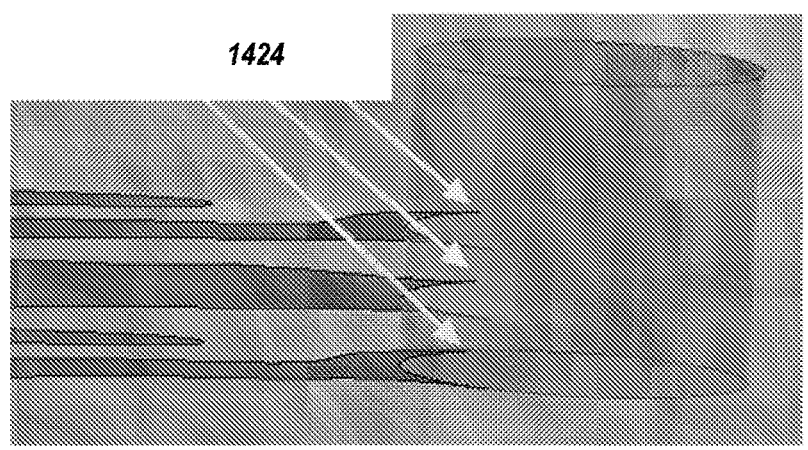

FIGS. 14B and 14C show a process of generating segments of polylines. The polylines are segmented into first segments assigned to the preserve bodies and second segments not assigned to the preserve bodies, wherein the segmenting uses a tolerance value when assigning polyline vertices to segments that errs on assignment to the preserve bodies. Thus, as shown in FIG. 14B, the initial segmentation of the polyline creates a segment region 1410 that can be fully associated with the preserve body even though the slice of the mesh does not closely match the shape of the preserve body, and the initial segmentation of the polyline creates segmented regions 1412 for the organic portion of the mesh that do not get close to the preserve body.

The segments in these regions 1412 are thus extended 1414, 1416 until they intersect the preserve body. In one case shown, the segment extension moves the end point to an intersection 1414 with the preserve body, and in the other case shown, the segment extension moves the end point to a tangency with the preserve body. The organic pieces of the polyline can then be approximated with a polyline, and it is straight forward to add tangency conditions when combining with the profile of the preserve body. The result is a smooth profile overall, where the generated profiles 1420 for the organic regions smoothly meet the profile 1422 of the preserve body (with G1 continuity).

Moreover, during the extension, care can be taken to keep the ends aligned between layers. For example, as shown in FIG. 14C, the points 1424, which meet the preserve body at three different levels, should be on the same vertical. To achieve this result, the algorithm that extends the organic region can check if it has reached a point that was an end point of the profile at the previous layer, and in such a case, the extension process can then stop. Thus, a check can be made to align intersections of any extended segments that intersect a same preserve body. In addition, in some implementations, the organic regions can be reduced in order to snap to endpoints defined by the previous layer, if the change in shape is reasonable.

Figure 15A:
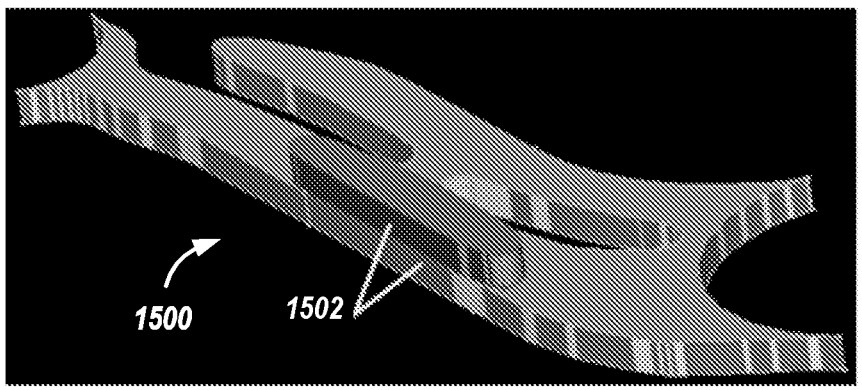

Returning to FIG. 12, after segmenting 1235 the polylines, smooth spline curves can be fit 1240, e.g., by program(s) 116, 904, to the organic regions of the polylines. This can be done using the processes described above in connection with FIG. 10. Then, the smooth curves can be aligned 1245, e.g., by program(s) 116, 904, between the layers. As the extruded bodies for the different layers are going to be combined together to form the final 3D model, if the bodies to be combined share some vertical walls, it is highly desirable for the walls to be perfectly aligned, so that the shape can be machined efficiently with 2.5-axis milling toolpaths. To achieve this, portions of the profile curves that are used to extrude the bodies are aligned with each other. FIG. 15A shows an example of extruded profiles 1500 for the organic portion of the mesh, where the extruded profiles 1500 share side walls 1502.

In some implementations, the curve alignment process begins by identifying one curve as the 'parent' and the other as the 'child'. Note that both curves are planar, and their planes are parallel. The child curve is translated to the parent's plane to make it more convenient for deviation checking. The alignment range between the parent and the child is found by checking their deviations against a reasonable tolerance. For example, the reasonable tolerance can be diagonal(mesh box)/1000.

The child curve is split at the start/end of the alignment range and this will split it into two sub-pieces. The sub-piece corresponding to the alignment range is replaced with a copy of the parent's sub-piece corresponding to the same alignment range. The other sub-piece is then slightly altered near their ends so that the newly copied sub-piece can be smoothly joined in. Note that the parent curve will not change at all in this process, and the smoothness of the child curve is maintained at the end points of the alignment range with tangential continuity.

Figure 15B:
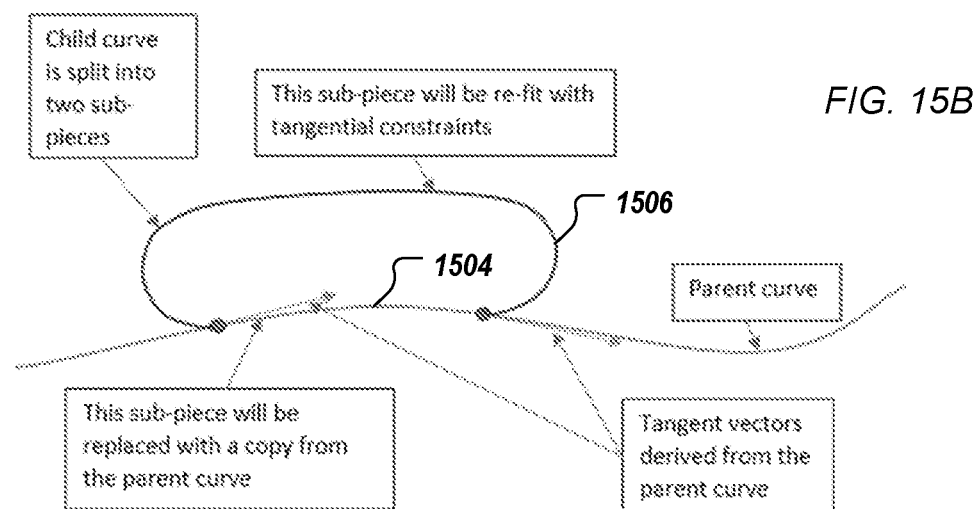
Figure 15C:
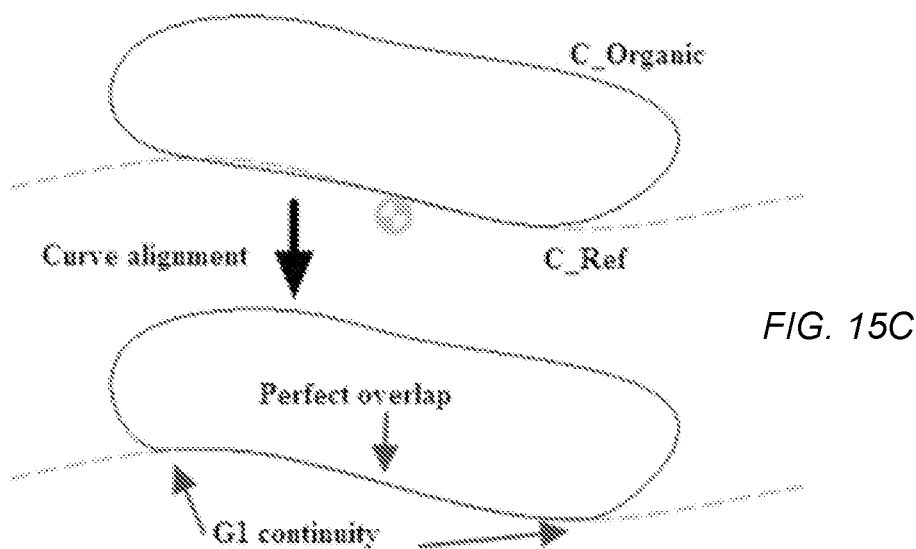

FIG. 15B shows an example of this process for the shared side walls 1502 from FIG. 15A. The child curve for the higher layer is split into two sub-pieces. Sub-piece 1504 is replaced with a copy from the parent curve, and sub-piece 1506 is re-fit with tangential constraints. Note that the tangent vectors are derived from the parent curve. The algorithm can use as input: (1) a curve C_Organic (or child curve) that is the approximation of an organic piece of polyline; (2) a reference profile, that is a chain of curves that comes from the previous layer (let these curves be called C_Ref(i), I=1 . . . n); (3) the curves C_Design adjacent to C_Organic that come from the section of the preserve bodies (they can be 0 (if C_Organic is closed), 1 or 2); and (4) a tolerance to decide when the curves overlap. FIG. 15C shows C_Organic and C_Ref, where curve alignment creates perfect overlap and G1 continuity at the points where the shared side walls diverge.

The algorithm can compare C_Organic with C_Ref(i), I=1 n and each time, perform the following operations:
1) Find a list of ranges where C_Organic and C_Ref(i) overlap; this can be implemented by finding the intersection points and marching from them using small steps until the curve diverges; in this way, it is possible to find suitable ranges, and the algorithm to extend the range can take into account both the distance between the curves and the angle between the tangents.
2) For each overlapping range, the curve C_Organic is split in 3 parts: C_before_range, C_inside_range, and C_after_range. Note that the before and after ranges can be empty.
3) C_inside_range is replaced with the corresponding piece of C_Ref(i).
4) C_before_range and C_after_range are modified in such a way to be G1 continuous with C_inside_range; these are NURBS curves that can be modified by moving the control points; note that in the special case where the curve is a NURBS of degree 1 (a line), the degree should be increased to be able to impose G1 conditions.

5) C_Organic is now replaced with a list of curves, and the process continues with each curve of the list.

After this process, C_Organic is replaced with a list of curves. It is possible that these curves are not connected. This usually happens if C_Organic is coincident with two successive curves from the previous layer. In this case, when attempting to avoid creating very small curves, small gaps may be created.

This happens if the coincident range to match the C_Ref (0) is a little shorter than C_Ref(0) length. FIG. 15D shows an example of a gap that has been created. To address this issue, the algorithm can fill such gaps using a variety of solutions, such as by using the reference profile, extending and intersecting the curves, or adding a segment. Another issue in curve alignment is the creation of self-intersecting profiles, i.e., when modifying a curve, it is possible to make it intersect itself or intersect other curves. FIG. 15E shows an example of this problem and the solution based on curve trim. A graphic 1520 shows the input C_Organic (solid line) and adjacent C_Preserves (dashed lines). A graphic 1522 shows the possible result after curve alignment. A graphic 1524 shows the result of the curve trim to fix the self-intersection. Note that with this approach, it is possible to lose G1 continuity.

Returning to FIG. 12, after the aligning 1245 of curves between layers, profiles are created 1250, e.g., by program(s) 116, 904, from the curves. This can be done using known techniques. Then, milling tool accessibility can be enforced 1255, e.g., by program(s) 116, 904, on the profiles. In some implementations, this involves, for each set of smooth curves within one of the discrete height layers, offsetting outward the set of smooth curves by an amount that is based on the curvature of the smallest milling tool available, and then offsetting inward the set of smooth curves by the amount, while closing any produced gaps using circular arcs. This is another example of how to enforce concave curvature compliance.

The aim of this stage of the algorithm is to ensure that the shape of the profiles allows a milling tool of a given radius to be able to access and cut the geometry without gouging remote regions undesirably. Geometrically, this means not exceeding the curvature determined by the tool radius for the given layer and ensuring gaps between surfaces are never too small for the tool to pass through. Different layers may be assigned different tool radii and hence different minimum radius of curvatures and gaps.

The strategy is to offset the profile, which is a closed planar loop of curves, outwards then inwards, trimming away any inverted or self-intersecting portions of the curves to remove regions of excess high curvature and narrow gaps. For each layer, there exists one or more profiles, each profile being a closed planar loop of curves, and a maximum allowed radius of curvature K. It is important that the profiles include the entire input geometry, including the preserve regions. Process each loop as follows:

1) Create a directed WIRE body from the loop. This simply adds topology to the curves so that we have vertices joining curves and we have a consistent direction going clockwise around the loop with the material to the left of the curves.
2) Apply a PLANAR_WIRE_OFFSET operation on the WIRE giving it an outward offset distance of 1/K. This is a common algorithm found in many geometric modelling kernels and CAD applications. This algorithm should perform the following:
   a. Given the plane normal N of the directed WIRE going around N in the right-hand screw sense, each point P on each curve is displaced by the given distance 1/K in the direction of the vector T×N, where T is the tangent vector at P, to a new point P'. The union of all P' forms a new curve.
   b. Any convex sharp corners in the WIRE will separate, leaving a gap. The algorithm should close the gap by at least one method (typically, by a circular arc or a natural extension of the curves).
   c. The new curves form a new, closed, offset WIRE.
   d. Self-intersections in the WIRE are detected and trimmed, discarding the inverted portion of the curve (inverted means the curve direction has reversed due to the offset) in the case of high curvature regions, and discarding the interior portion of the curve (the portion that is inside the loop) for global intersections.
3) The offset WIRE is then guaranteed to not contain any curve geometry with curvature exceeding K.
4) Offset the WIRE backwards by the same distance 1/K using the same algorithm, but this time ensuring that any gaps created by the offset between two adjacent curve end points are closed using circular arcs.
5) In the final WIRE, the excess high curvature regions in the original WIRE have been replaced with circular arcs with curvature K, and gaps that are too small (<2/K) have been closed and removed.

The final profile has thus replaced high curvature areas with arcs. The effect is that some material has been added to make the part machinable with a milling tool of a specific radius. Note that this offset out, offset in process will also eliminate small holes that cannot be accessed by the tool.

After the profiles have been modified to enforce 1255 milling tool accessibility, the profiles are extruded 1260, e.g., by program(s) 116, 904, to the correct height for their respective layers. The extruded bodies are Boolean joined 1270, e.g., by program(s) 116, 904, with the preserve bodies to form the 3D model 1272. A parametric editable model 1282 is constructed 1280, e.g., by program(s) 116, 904, and the B-Rep solid body and construction geometry to support a parametric recipe is output 1290, e.g., by program(s) 116, 904.

When presenting the result of the B-Rep conversion in a parametric CAD application, a highly editable form of output is possible using the construction geometry provided by the algorithm. Each layer of the 2.5D model can be represented by an extrusion of a set of profiles defined in a 2D sketch. FIG. 16 shows an example of a 2D sketch user interface element 1600 for a parametric editable model. When the final solid body is constructed as a union of the extrusions, if the user edits any one of the sketch curves, the parametric feature history will replay the construction of the entire modified solid body. The construction of the parametric feature recipe can include the following:

1) The set of planar faces that represent the profiles for each layer are transferred into the sketch environment of the target CAD application. Each curve of the profile boundary is converted into a corresponding curve type supported by the sketch environment.
2) Any simple curves (e.g., straight lines, circular arcs) are shown with the end points available in the UI for the user to select and move in the sketch plane. Spline curves are made editable by making the control points available in the UI for the user to move in the sketch plane.
3) Curves that originate from an intersection of the layer with the preserve bodies are "frozen" in the sketch so that the user cannot edit them. If they were to edit them, they will be in danger of creating small undesirable gaps between the organic and preserve regions that will create difficulties for the boolean operation or divide the body into multiple lumps.

4) The EXTRUDE feature of the CAD application is used to extrude each profile into a solid with the required extent for each layer. The extent is stored as a parameter in the extrude feature which affords a way for users to edit the extent of each layer if desired. Each of these EXTRUDE features are added to the feature recipe.

5) The solids from each extruded layer are Boolean united to form single solid representing the organic region. This COMBINE feature is added to the recipe.

6) The organic region is Boolean united with all preserve bodies to form the completed solid. This COMBINE feature is added to the recipe.

7) The obstacle bodies are Boolean subtracted from the completed solid to form the final solid. This SUBTRACT feature is added to the recipe. Note: If the preserve and obstacle regions overlap, whether the preserves are united first and the obstacles subtracted second, or vice versa, will affect which regions takes precedence in the result.

8) The parametric feature recipe: EXTRUDE (sketches), COMBINE (extrudes), COMBINE (preserves), SUBTRACT (obstacles) is then created in the CAD application and presented to the user, each feature being editable.

Editability is achieved by creating not only the final B-Rep solid body, but also the construction geometry that led to this final body. This includes the profile geometry that can be extruded to various extents to produce components that can then be Boolean joined to form the final required body. The profile geometry is in the form of spline curves that can be edited in a CAD application, giving users the ability to change the shape of the final body. The construction geometry returned can be assembled as a feature recipe in any modern parametric CAD application.

In addition, as the milling process relies on a cylindrical tool that cuts the material, the shape of the object should be such that the chosen tool can access all surfaces of the object without gouging. This amounts to the requirement that the surfaces should not have a radius of curvature smaller than the radius of the tool, and any gaps between surfaces are not too narrow for the tool to access. As detailed above, these issues are addressed, and the algorithm can ensure that, given a minimum tool radius, the B-Rep geometry does not exceed this curvature limit, and the tool can access all gaps between the surfaces, making the object suitable for manufacturing by a milling machine. Thus, the output geometry is editable in a parametric CAD application, the output geometry is easy and efficient to manufacture using a 2.5-axis milling, and the output geometry directly includes any existing B-Rep preserve bodies without loss of accuracy.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:

obtaining, by a computer aided design (CAD) program, a first model of an object to be manufactured using a 2.5-axis subtractive manufacturing process, wherein the first model comprises smooth curves fit to contours representing discrete height layers of the object to be manufactured using the 2.5-axis subtractive manufacturing process;

modifying, by the CAD program, at least one of the smooth curves to facilitate the 2.5-axis subtractive manufacturing process, wherein the modifying comprises
  detecting at least a portion of a first smooth curve for a first of the discrete height layers that is almost coincident with at least a portion of a second smooth curve for a second of the discrete height layers, and
  replacing the at least a portion of the first smooth curve for the first of the discrete height layers with the at least a portion of the second smooth curve for the second of the discrete height layers;

preparing, by the CAD program, an editable model of the object, the editable model comprising a series of construction steps represented in a parametric feature history, wherein the series of construction steps includes combining extruded versions of the smooth curves to form a solid three dimensional (3D) model of the object in a boundary representation format, and the parametric feature history includes a sketch feature associated with at least one of the discrete height layers;

rendering, by the CAD program, a user interface element showing the sketch feature in relation to the editable model;

receiving, by the CAD program, user input via the user interface element; and reshaping, by the CAD program responsive to the user input, a subset of the smooth curves in the at least one of the discrete height layers to change the solid 3D model; and replaying, by the CAD program, the series of construction steps represented in the parametric feature history to construct the solid 3D model of the object in the boundary representation format, as changed by the user input.

2. The method of claim 1, wherein the first model comprises one or more modelled solids, which are to be preserved in the solid 3D model of the object;

wherein the modifying comprises
  detecting at least a portion of another smooth curve for the first of the discrete height layers that is almost coincident with at least a portion of the one or more modelled solids, and aligning the at least a portion of the another smooth curve for the first of the discrete height layers with the at least a portion of the one or more modelled solids;
wherein the reshaping comprises constraining changes to the at least a portion of the another smooth curve to maintain tangency and contact with the at least a portion of the one or more modelled solids; and
wherein the series of construction steps includes combining the extruded versions of the smooth curves with the one or more modelled solids to form the solid 3D model of the object in the boundary representation format.

3. The method of claim 2, wherein the obtaining comprises:
receiving shape data corresponding to the object to be manufactured using the 2.5-axis subtractive manufacturing process;
processing the shape data to produce polylines matching the contours representing the discrete height layers of the object;
fitting the smooth curves to the polylines; and
replacing at least one segment of at least one of the smooth curves to reduce a curvature of the at least one segment to be less than or equal to a curvature of a smallest milling tool available for use in the 2.5-axis subtractive manufacturing process for at least one of the discrete height layers.

4. The method of claim 3, wherein replacing the at least one segment of the at least one of the smooth curves comprises, for each set of smooth curves within one of the discrete height layers:
offsetting outward the set of smooth curves by an amount that is based on the curvature of the smallest milling tool available; and
offsetting inward the set of smooth curves by the amount, while closing any produced gaps using circular arcs.

5. The method of claim 3, wherein the shape data comprises a level-set distance field output by a generative design process that employs a level-set based topology optimization method, and processing the shape data comprises, for each of the discrete height layers:
resampling the level-set distance field to produce a two dimensional (2D) level-set grid at a slice plane corresponding to a current one of the discrete height layers, the slice plane being perpendicular to a milling direction to be used in the 2.5-axis subtractive manufacturing process; and
extracting a current layer polyline from the 2D level-set grid, the current layer polyline matching a current layer contour of the object at the slice plane.

6. The method of claim 3, wherein receiving the shape data comprises receiving a mesh representation of the object, or receiving a level-set representation of the object from a generative design process and processing the shape data comprises converting the level-set representation of the object into a mesh representation of the object;
wherein processing the shape data to produce the polylines comprises slicing the mesh representation of the object with planes located within respective ones of the discrete height layers along a milling direction, each of the planes being perpendicular to the milling direction; and
wherein the obtaining comprises:
segmenting the polylines into a first set of segments assigned to the one or more modelled solids and a second set of segments not assigned to the one or more modelled solids, wherein the segmenting uses a tolerance value when assigning polyline vertices to segments that errs on assignment to the one or more modelled solids, and
extending one or more segments in the second set of segments that are connected with one or more segments in the first set of segments until the one or more segments in the second set of segments meet at an intersection point or at a tangent point of at least one of the one or more modelled solids, while also checking to align intersections of any extended segments that intersect a same at least one of the one or more modelled solids.

7. The method of claim 2, wherein the obtaining comprises:
receiving a level-set representation of the object, or receiving a mesh representation of the object and converting the mesh representation into a level-set representation of the object;
modifying one or more level-set values in the level-set representation of the object, in each of one or more milling directions specified for the 2.5-axis subtractive manufacturing process, to remove undercuts;
modifying one or more additional level-set values in the level-set representation of the object to move one or more planar faces of the object up to a height level of that planar face's corresponding one of the discrete height layers; and
converting the modified level-set representation of the object into an output mesh representation of the object;
wherein the first model comprises the output mesh representation of the object.

8. The method of claim 7, comprising, for each modelled solid of the one or more modelled solids:
for each layer of the discrete height layers along a milling direction,
intersecting the layer with the modelled solid to produce a portion of the modelled solid,
moving the portion of the modelled solid completely under the layer in the milling direction,
sweeping the portion of the modelled solid upward, opposite the milling direction, through the layer to produce a swept solid, and
intersecting the layer with the swept solid with to produce a replacement for the portion of the modelled solid; and
sweeping one or more upside faces of the modelled solid upward, opposite the milling direction, to a top most level of the discrete height layers along the milling direction to produce one or more upside swept solids;
sweeping any downside faces of the modelled solid downward, in the milling direction, to a bottom most level of the discrete height layers along the milling direction to produce one or more downside swept solids;
intersecting the one or more upside swept solids with the one or more downside swept solids to produce one or more undercut filling solids; and
combining the one or more undercut filling solids with the modelled solid.

9. A non-transitory computer-readable medium encoding a computer aided design program operable to cause one or more data processing apparatus to perform operations comprising:
obtaining a first model of an object to be manufactured using a 2.5-axis subtractive manufacturing process, wherein the first model comprises smooth curves fit to contours representing discrete height layers of the object to be manufactured using the 2.5-axis subtractive manufacturing process;

modifying at least one of the smooth curves to facilitate the 2.5-axis subtractive manufacturing process, wherein the modifying comprises detecting at least a portion of a first smooth curve for a first of the discrete height layers that is almost coincident with at least a portion of a second smooth curve for a second of the discrete height layers, and replacing the at least a portion of the first smooth curve for the first of the discrete height layers with the at least a portion of the second smooth curve for the second of the discrete height layers;

preparing an editable model of the object, the editable model comprising a series of construction steps represented in a parametric feature history, wherein the series of construction steps includes combining extruded versions of the smooth curves to form a solid three dimensional (3D) model of the object in a boundary representation format, and the parametric feature history includes a sketch feature associated with at least one of the discrete height layers;

rendering a user interface element showing the sketch feature in relation to the editable model;

receiving user input via the user interface element; and reshaping, responsive to the user input, a subset of the smooth curves in the at least one of the discrete height layers to change the solid 3D model; and replaying the series of construction steps represented in the parametric feature history to construct the solid 3D model of the object in the boundary representation format, as changed by the user input.

10. The non-transitory computer-readable medium of claim 9, wherein the first model comprises one or more modelled solids, which are to be preserved in the solid 3D model of the object;

wherein the modifying comprises detecting at least a portion of another smooth curve for the first of the discrete height layers that is almost coincident with at least a portion of the one or more modelled solids, and aligning the at least a portion of the another smooth curve for the first of the discrete height layers with the at least a portion of the one or more modelled solids;

wherein the reshaping comprises constraining changes to the at least a portion of the another smooth curve to maintain tangency and contact with the at least a portion of the one or more modelled solids; and wherein the series of construction steps includes combining the extruded versions of the smooth curves with the one or more modelled solids to form the solid 3D model of the object in the boundary representation format.

11. The non-transitory computer-readable medium of claim 10, wherein the obtaining comprises:

receiving shape data corresponding to the object to be manufactured using the 2.5-axis subtractive manufacturing process;

processing the shape data to produce polylines matching the contours representing the discrete height layers of the object;

fitting the smooth curves to the polylines; and replacing at least one segment of at least one of the smooth curves to reduce a curvature of the at least one segment to be less than or equal to a curvature of a smallest milling tool available for use in the 2.5-axis subtractive manufacturing process for at least one of the discrete height layers.

12. The non-transitory computer-readable medium of claim 11, wherein replacing the at least one segment of the at least one of the smooth curves comprises, for each set of smooth curves within one of the discrete height layers:

offsetting outward the set of smooth curves by an amount that is based on the curvature of the smallest milling tool available; and offsetting inward the set of smooth curves by the amount, while closing any produced gaps using circular arcs.

13. The non-transitory computer-readable medium of claim 12, wherein the shape data comprises a level-set distance field output by a generative design process that employs a level-set based topology optimization method, and processing the shape data comprises, for each of the discrete height layers:

resampling the level-set distance field to produce a two dimensional (2D) level-set grid at a slice plane corresponding to a current one of the discrete height layers, the slice plane being perpendicular to a milling direction to be used in the 2.5-axis subtractive manufacturing process; and extracting a current layer polyline from the 2D level-set grid, the current layer polyline matching a current layer contour of the object at the slice plane.

14. The non-transitory computer-readable medium of claim 12, wherein receiving the shape data comprises receiving a mesh representation of the object, or receiving a level-set representation of the object from a generative design process and processing the shape data comprises converting the level-set representation of the object into a mesh representation of the object;

wherein processing the shape data to produce the polylines comprises slicing the mesh representation of the object with planes located within respective ones of the discrete height layers along a milling direction, each of the planes being perpendicular to the milling direction; and wherein the obtaining comprises:

segmenting the polylines into a first set of segments assigned to the one or more modelled solids and a second set of segments not assigned to the one or more modelled solids, wherein the segmenting uses a tolerance value when assigning polyline vertices to segments that errs on assignment to the one or more modelled solids, and extending one or more segments in the second set of segments that are connected with one or more segments in the first set of segments until the one or more segments in the second set of segments meet at an intersection point or at a tangent point of at least one of the one or more modelled solids, while also checking to align intersections of any extended segments that intersect a same at least one of the one or more modelled solids.

15. The non-transitory computer-readable medium of claim 11, wherein the obtaining comprises:

receiving a level-set representation of the object, or receiving a mesh representation of the object and converting the mesh representation into a level-set representation of the object;

modifying one or more level-set values in the level-set representation of the object, in each of one or more milling directions specified for the 2.5-axis subtractive manufacturing process, to remove undercuts;

modifying one or more additional level-set values in the level-set representation of the object to move one or more planar faces of the object up to a height level of that planar face's corresponding one of the discrete height layers; and converting the modified level-set representation of the object into an output mesh representation of the object;

wherein the first model comprises the output mesh representation of the object.

16. The non-transitory computer-readable medium of claim 15, the operations comprising, for each modelled solid of the one or more modelled solids:

for each layer of the discrete height layers along a milling direction,
intersecting the layer with the modelled solid to produce a portion of the modelled solid,
moving the portion of the modelled solid completely under the layer in the milling direction,
sweeping the portion of the modelled solid upward, opposite the milling direction, through the layer to produce a swept solid, and
intersecting the layer with the swept solid with to produce a replacement for the portion of the modelled solid; and sweeping one or more upside faces of the modelled solid upward, opposite the milling direction, to a top most level of the discrete height layers along the milling direction to produce one or more upside swept solids;

sweeping any downside faces of the modelled solid downward, in the milling direction, to a bottom most level of the discrete height layers along the milling direction to produce one or more downside swept solids;

intersecting the one or more upside swept solids with the one or more downside swept solids to produce one or more undercut filling solids; and combining the one or more undercut filling solids with the modelled solid.

17. A system comprising:

a display device;

one or more data processing apparatus coupled with the display device; and a non-transitory storage medium coupled with the one or more data processing apparatus, the non-transitory storage medium encoding:

program code that causes the one or more data processing apparatus to obtain a first model of an object to be manufactured using a 2.5-axis subtractive manufacturing process, wherein the first model comprises smooth curves fit to contours representing discrete height layers of the object to be manufactured using the 2.5-axis subtractive manufacturing process;

program code that causes the one or more data processing apparatus to modify at least one of the smooth curves to facilitate the 2.5-axis subtractive manufacturing process, including program code to detect at least a portion of a first smooth curve for a first of the discrete height layers that is almost coincident with at least a portion of a second smooth curve for a second of the discrete height layers, and program code to replace the at least a portion of the first smooth curve for the first of the discrete height layers with the at least a portion of the second smooth curve for the second of the discrete height layers;

program code that causes the one or more data processing apparatus to prepare an editable model of the object, the editable model comprising a series of construction steps represented in a parametric feature history, wherein the series of construction steps includes combining extruded versions of the smooth curves to form a solid three dimensional (3D) model of the object in a boundary representation format, and the parametric feature history includes a sketch feature associated with at least one of the discrete height layers;

program code that causes the one or more data processing apparatus to render to the display screen a user interface element showing the sketch feature in relation to the editable model;

program code that causes the one or more data processing apparatus to receive user input via the user interface element;

program code that causes the one or more data processing apparatus to reshape, responsive to the user input, a subset of the smooth curves in the at least one of the discrete height layers to change the solid 3D model; and program code that causes the one or more data processing apparatus to replay the series of construction steps represented in the parametric feature history to construct the solid 3D model of the object in the boundary representation format, as changed by the user input.

18. The system of claim 17, wherein the non-transitory storage medium encodes program code that causes the one or more data processing apparatus to perform a boundary-based generative design process to produce a generative model for the object using one or more design criteria, wherein the at least one manufacturability constraint causes at least one shape derivative used during the boundary-based generative design process to guide shape changes for the generative model toward discrete height layers corresponding to the 2.5-axis subtractive manufacturing process.

19. The system of claim 17, further comprising a subtractive manufacturing machine, and the non-transitory storage medium encodes program code that causes the one or more data processing apparatus to generate one or more toolpath specifications for the solid 3D model and manufacture at least a portion of a physical structure using the one or more toolpath specifications with the subtractive manufacturing machine.

* * * * *